United States Patent
Narine et al.

(10) Patent No.: US 10,000,724 B2
(45) Date of Patent: *Jun. 19, 2018

(54) METATHESIZED TRIACYLGLYCEROL GREEN POLYOLS FROM PALM OIL FOR USE IN POLYURETHANE APPLICATIONS AND THEIR RELATED PROPERTIES

(71) Applicant: Trent University, Peterborough (CA)

(72) Inventors: Suresh Narine, Peterborough (CA); Prasanth Kumar Sasidharan Pillai, Peterborough (CA); Shaojun Li, Peterborough (CA); Laziz Bouzidi, Peterborough (CA); Ali Mahdevari, Peterborough (CA)

(73) Assignee: Trent University, Peterborough, Ontario (CA)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/670,080

(22) Filed: Mar. 26, 2015

(65) Prior Publication Data

US 2015/0307811 A1  Oct. 29, 2015

Related U.S. Application Data

(60) Provisional application No. 62/109,441, filed on Jan. 29, 2015, provisional application No. 61/971,475, filed on Mar. 27, 2014.

(51) Int. Cl.

| C08G 18/36 | (2006.01) |
|---|---|
| C07C 69/675 | (2006.01) |
| C07C 69/34 | (2006.01) |
| C11C 3/00 | (2006.01) |
| C11C 3/02 | (2006.01) |
| C08G 18/76 | (2006.01) |
| C08G 18/32 | (2006.01) |
| C08G 18/34 | (2006.01) |
| C08G 18/70 | (2006.01) |
| C08J 9/00 | (2006.01) |
| C08J 9/12 | (2006.01) |
| C08G 101/00 | (2006.01) |

(52) U.S. Cl.
CPC ............ *C11C 3/02* (2013.01); *C08G 18/3206* (2013.01); *C08G 18/345* (2013.01); *C08G 18/36* (2013.01); *C08G 18/70* (2013.01); *C08G 18/7671* (2013.01); *C08J 9/0014* (2013.01); *C08J 9/12* (2013.01); *C11C 3/00* (2013.01); *C08G 2101/0008* (2013.01); *C08G 2101/0025* (2013.01); *C08G 2101/0083* (2013.01); *C08J 2205/06* (2013.01); *C08J 2205/10* (2013.01); *C08J 2375/04* (2013.01); *C11C 3/006* (2013.01)

(58) Field of Classification Search
CPC .................... C08G 18/36; C11C 3/006; B01J 2231/54–2231/543; B01J 2231/70–2231/72

See application file for complete search history.

(56) References Cited

U.S. PATENT DOCUMENTS

| 4,545,941 A | 10/1985 | Rosenburg |
| 4,997,858 A * | 3/1991 | Jourquin .................. C08J 9/142 |
| | | 521/118 |
| 5,312,940 A | 5/1994 | Grubbs et al. |
| 5,342,909 A | 8/1994 | Grubbs et al. |
| 5,710,298 A | 1/1998 | Grubbs et al. |
| 5,728,785 A | 3/1998 | Grubbs et al. |
| 5,728,917 A | 3/1998 | Grubbs et al. |
| 5,750,815 A | 5/1998 | Grubbs et al. |
| 5,831,108 A | 11/1998 | Grubbs et al. |
| 5,922,863 A | 7/1999 | Grubbs et al. |
| 6,306,988 B1 | 10/2001 | Grubbs et al. |
| 6,414,097 B1 | 7/2002 | Grubbs et al. |
| 6,696,597 B2 | 2/2004 | Pederson et al. |
| 6,794,534 B2 | 9/2004 | Grubbs et al. |
| 7,102,047 B2 | 9/2006 | Grubbs et al. |
| 7,378,528 B2 | 5/2008 | Hermann et al. |
| 7,745,652 B2 | 6/2010 | Lysenko et al. |
| 2009/0264672 A1 | 10/2009 | Abraham et al. |
| 2010/0160506 A1 | 6/2010 | Wu et al. |
| 2011/0313124 A1* | 12/2011 | Yalamanchili ......... C08G 18/36 |
| | | 528/85 |
| 2013/0344012 A1 | 12/2013 | Cohen et al. |

FOREIGN PATENT DOCUMENTS

| CA | 2531977 | 7/2007 |
| CA | 2806105 | 1/2012 |
| WO | WO2007/103398 | 9/2007 |
| WO | WO2008/46106 | 4/2008 |
| WO | WO2009020667 | 2/2009 |

(Continued)

OTHER PUBLICATIONS

Zlatanic, A.; Petrovic, Z. S.; Dusek, K. Structure and properties of triolein-based polyurethane networks. Biomacromolecules, 2002, vol. 3, pp. 1048-1056.*

(Continued)

*Primary Examiner* — Stephen E Rieth
(74) *Attorney, Agent, or Firm* — Bereskin & Parr LLP/S.E.N.C.R.L., s.r.l.; Michael Fenwick

(57) ABSTRACT

Metathesized triacylglycerol green polyols and their related physical and thermal properties are disclosed. Such metathesized triacylglycerol green polyols are also used as a component of polyurethane applications, including polyurethane foams.

17 Claims, 29 Drawing Sheets

(56) References Cited

FOREIGN PATENT DOCUMENTS

WO     WO2014052382     4/2014

OTHER PUBLICATIONS

Luong, T. M.; Schriftman, H.; Swern, D. Direct hydroxylation of fats and derivatives with a hydrogen peroxide tungstic acid system. Journal of the American Oil Chemists' Society, 1967, vol. 44, pp. 316-320.*

Damiani, P.; Burini, G. Determination of the triglyceride composition of olive oil by a multistep procedure. Journal of Agricultural and Food Chemistry, 1980, vol. 28, pp. 1232-1236.*

Scholnick, F.; Saggese, E. J.; Wrigley, A. N.; Ault, W. C.; Monroe Jr., H. A.; Zubillaga, M. Urethane foams from animal fats. IV. Rigid foams from epoxidized glycerides. Journal of the American Oil Chemists' Society, 1968, pp. 76-77.*

Dunkle, M. N.; David, F.; Sandra, P.; Vollmer, M. Analysis of triglycerides in vegetable oils using the Agilent 1260 Infinity Analytical SFC System with evaporative light scattering detection. Agilent Technologies. Aug. 1, 2015.*

Rouhi, A. M. Olefin Metathesis: Big-Deal Reaction. Chemical & Engineering News, 2002, vol. 80, No. 51, pp. 29-33.*

J.C. Mol. Application of olefin metathesis in oleochemistry: an example of green chemistry. Green Chem. 4:5-13, 2002.

T. Gibson and L.Tulich. Novel Synthesis of Long-chain Primary Alkyl Compounds. J. Org. Chem. 46:1821-1823, 1981.

G. Doyle. Olefin Metatheesis Catalyzed by Zero-Valent, Anionic Group VI Metal Comounds. J. Catal. 30:118-127, 1973.

R. Spronk and J.C. Mol. Metathesis of 1-alkenes in the liquid phase over a Re2O7/gamma-Al2O3 caatalyst. Applied catalysis 70:295-306, 1991.

Harold H. Fox, Richard R. Schrock,. and Rick O'Dell. Coupling of Terminal Olefins by Molybdenum(VI) Imido Alkylidene Complexes. Organometallics 13:635-639, 1994.

K.J. Ivin and J.C. Mol. Olefin Metathesis and Metathesis Polyermization. Survey of Catalyst Systems, Chapter 2, pp. 12-49, 1997.

R. Spronk and J.C. Mol. Metathesis of 1-alkenes in the liquid phase over a Re207/gamma-Al2O3 caatalyst. Applied Catalysis 70:295-306, 1991.

\* cited by examiner

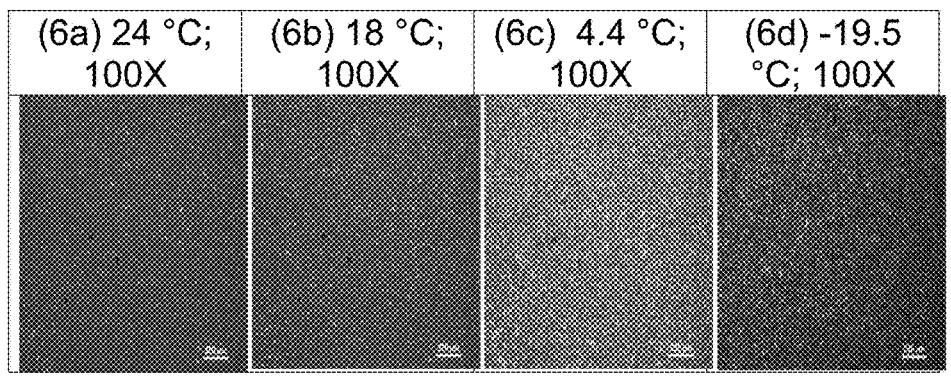
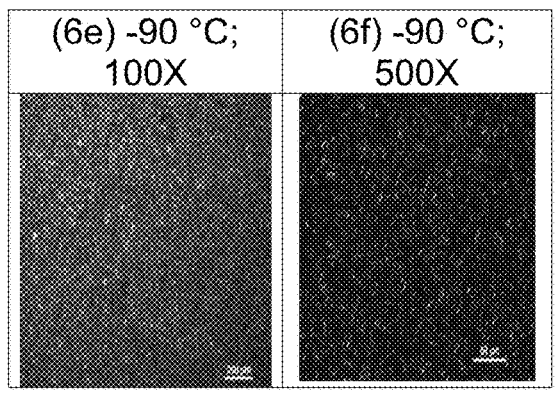
Figures 6a-f

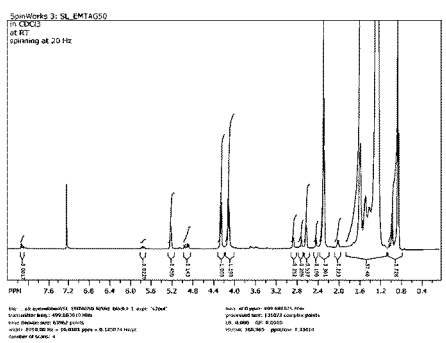
FIG. 9A: Epoxy B1-PMTAG
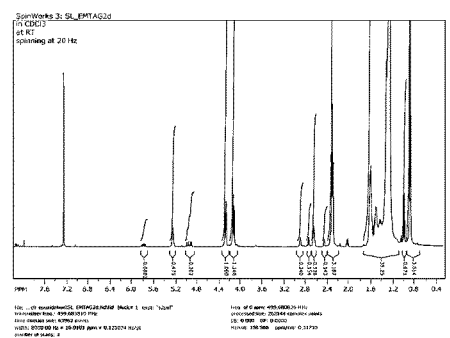
FIG. 9B: Epoxy B2-PMTAG
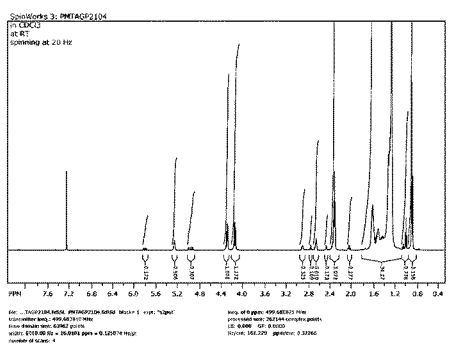
FIG. 9C: Epoxy B3-PMTAG
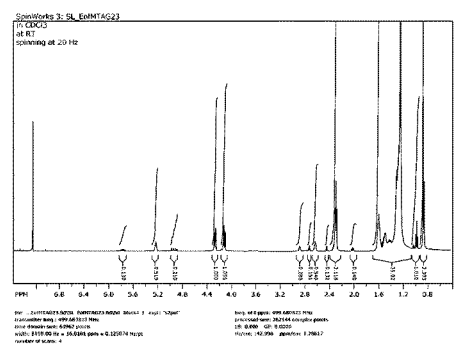
FIG. 9D: Epoxy B4-PMTAG

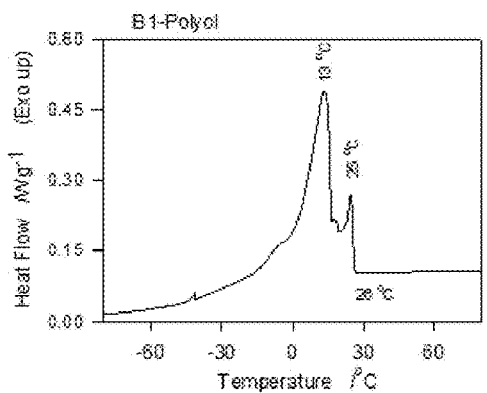
FIG. 14A
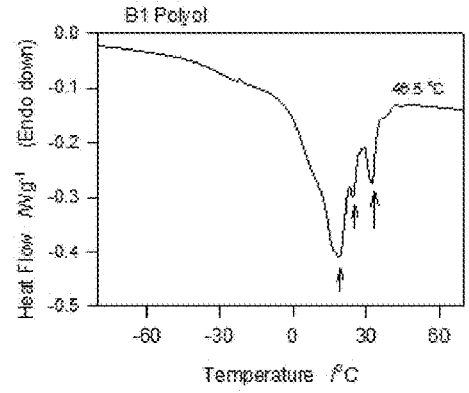
FIG. 14B
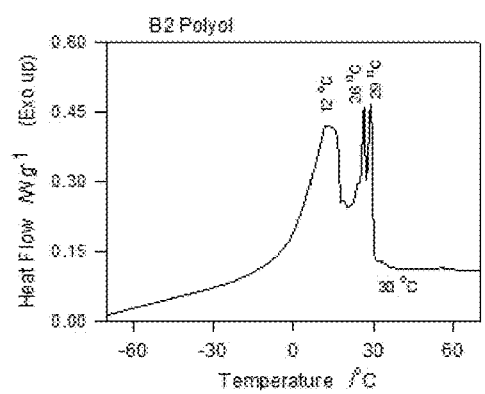
FIG. 14A2
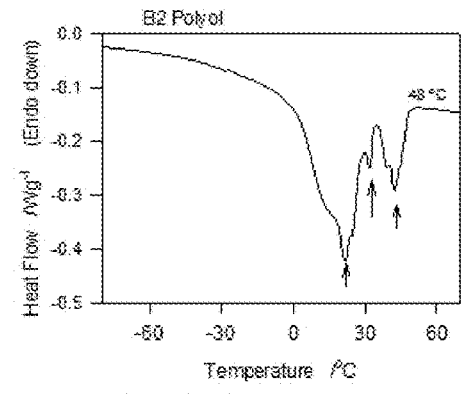
FIG. 14B2
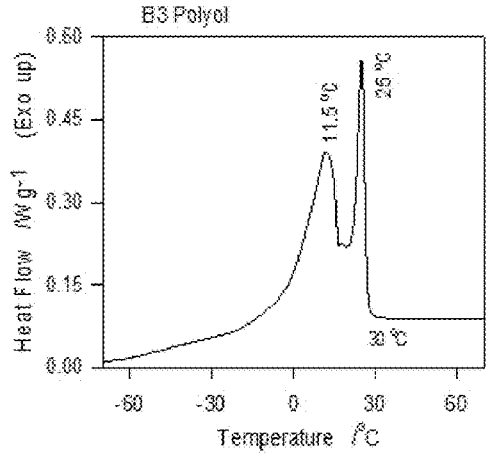
FIG. 14A3
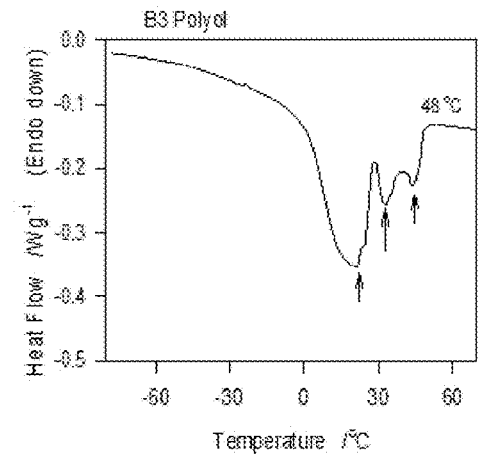
FIG. 14B3

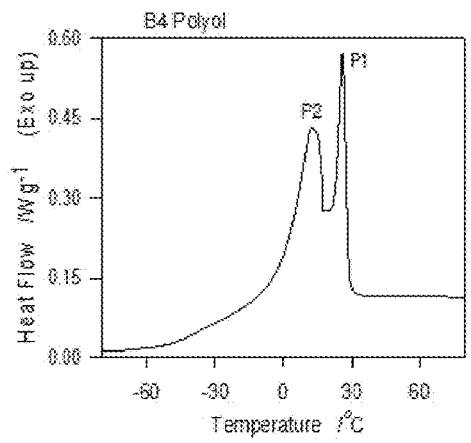
FIG. 14A4
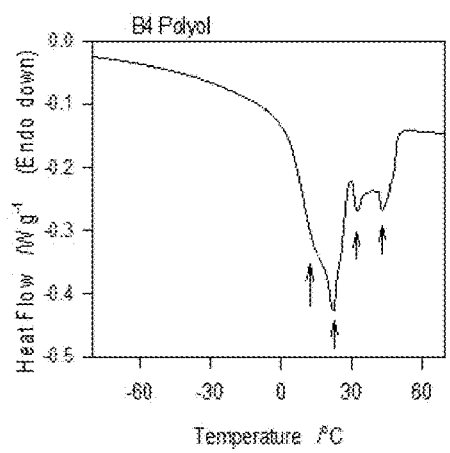
FIG. 14B4
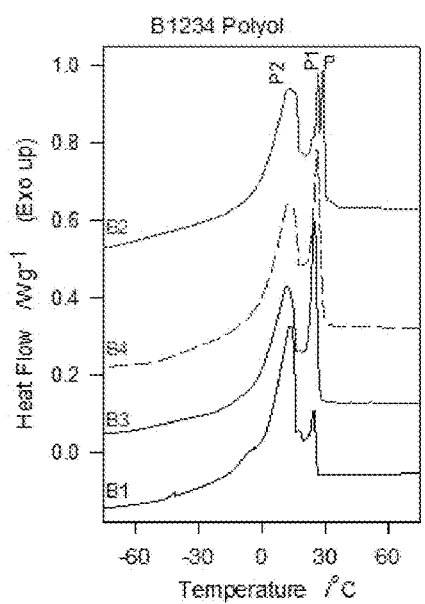
FIG. 14A5
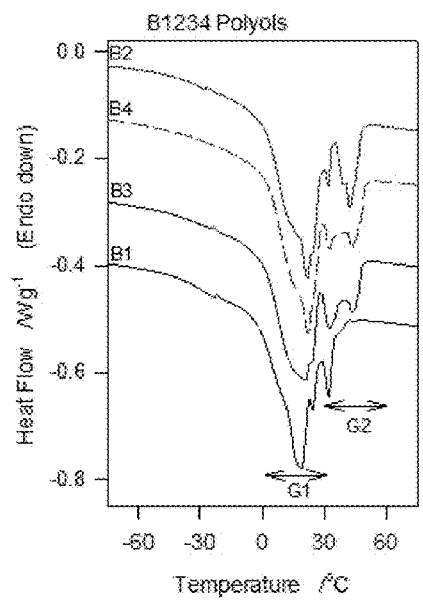
FIG. 14B5

FIG. 18A: SEM magnification 51X
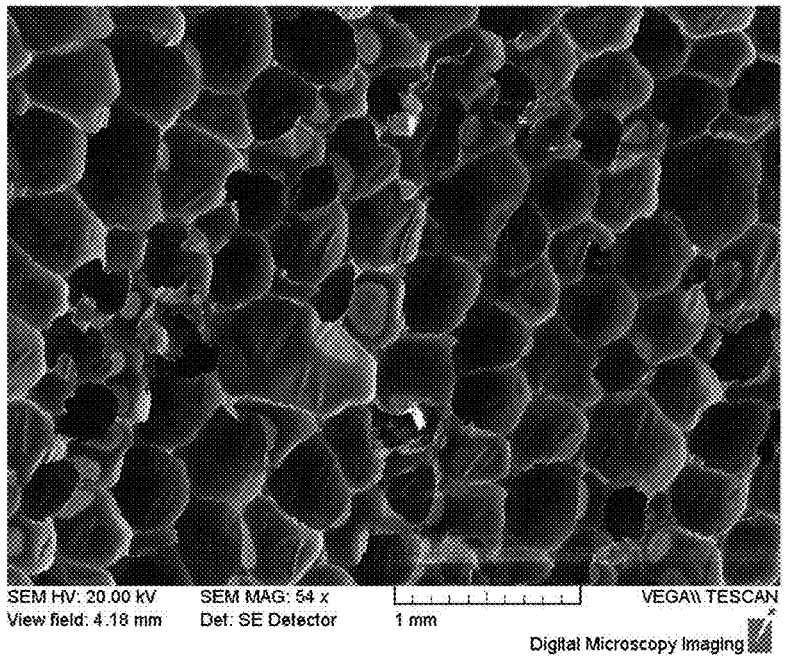
FIG. 18B: SEM magnification 102X
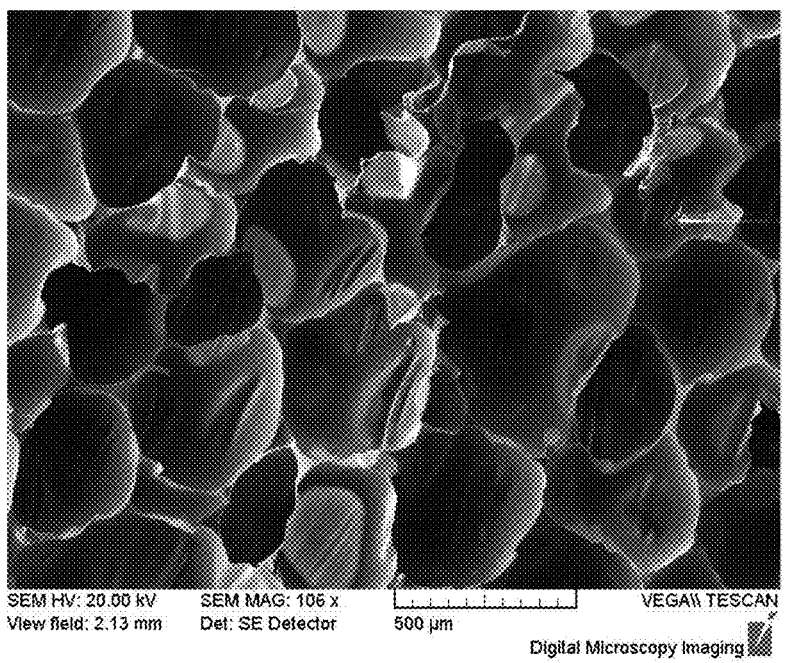

FIG. 19A: SEM magnification 51X
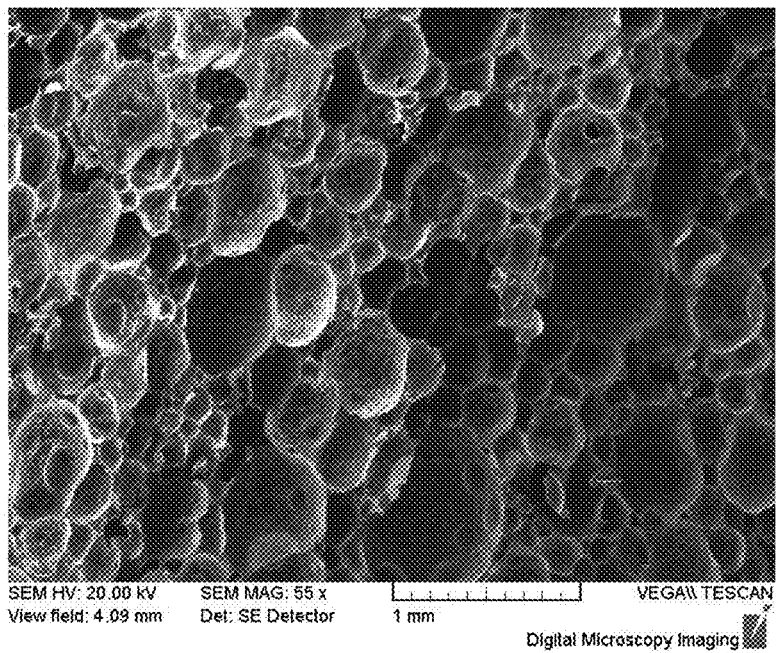
FIG. 19B: SEM magnification 102X
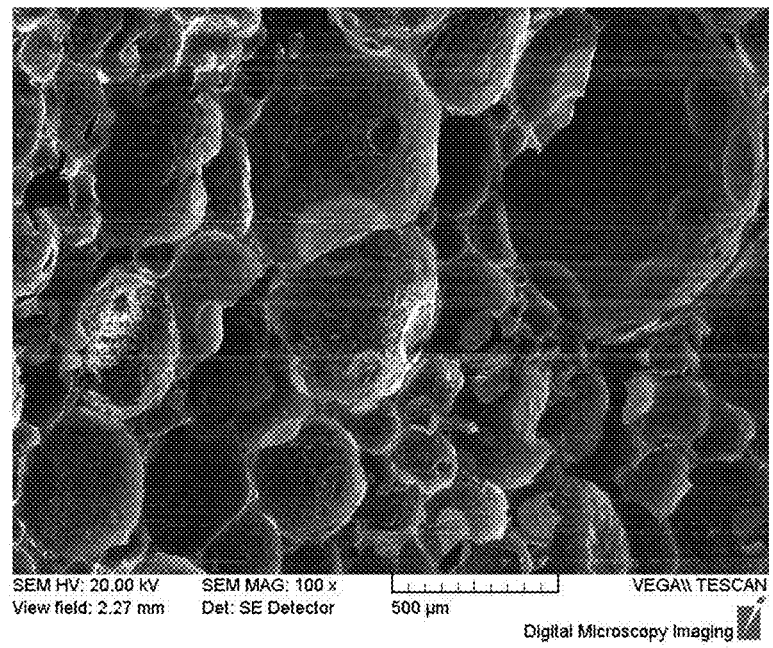

METATHESIZED TRIACYLGLYCEROL GREEN POLYOLS FROM PALM OIL FOR USE IN POLYURETHANE APPLICATIONS AND THEIR RELATED PROPERTIES

CROSS REFERENCE TO RELATED APPLICATIONS

A claim of priority for this application under 35 U.S.C. § 119(e) is hereby made to the following U.S. Provisional Patent Applications: U.S. Ser. No. 62/109,441 filed Jan. 29, 2015; and U.S. Ser. No. 61/971,475 filed Mar. 27, 2014; and these applications are incorporated herein by reference in their entireties.

TECHNICAL FIELD

This application relates to metathesized triacylglycerol green polyols and their related physical and thermal properties. Such metathesized triacylglycerol green polyols are also used as a component of polyurethane applications, including polyurethane foams.

BACKGROUND

Polyurethanes are one of the most versatile polymeric materials with regards to both processing methods and mechanical properties. Polyurethanes are formed either based on the reaction of NCO groups and hydroxyl groups, or via non-isocyanate pathways, such as the reaction of cyclic carbonates with amines, self-polycondensation of hydroxyl-acyl azides or melt transurethane methods. The most common method of urethane production is via the reaction of a polyol and an isocyanate that forms the backbone urethane group. Cross-linking agents, chain extenders, blowing agents and other additives may also be added as needed. The proper selection of reactants enables a wide range of polyurethane elastomers, sheets, foams, and the like.

Petroleum-derived polyols have been used in the manufacturing of polyurethane foams. There has been an increased interest in the use of renewable resources in the manufacturing of polyurethane foams, however. This has led to research into developing natural oil-based polyols for use in the manufacturing of foams. The present effort details the synthesis of natural oil based metathesized triacylglycerols (MTAG), and in particular, palm oil based metathesized triacylglycerols (PMTAG), and Green (e.g., solvent free) polyols thereof. Any polyols derived from such metathesized triacylglycerols may be utilized in polyurethane applications, such as rigid and flexible polyurethane foams. The present effort also discloses physical and thermal properties of such polyols, and the formulation of polyurethane foams using such polyols as a component.

Figure 4A:
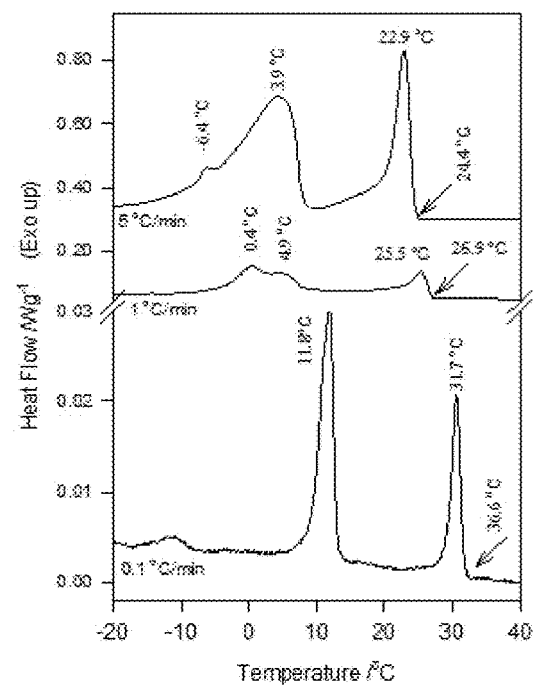
FIG. 4a depicts a DSC cooling (5.0, 1.0 and 0.1° C./min) thermogram of PMTAG.
Figure 4B:
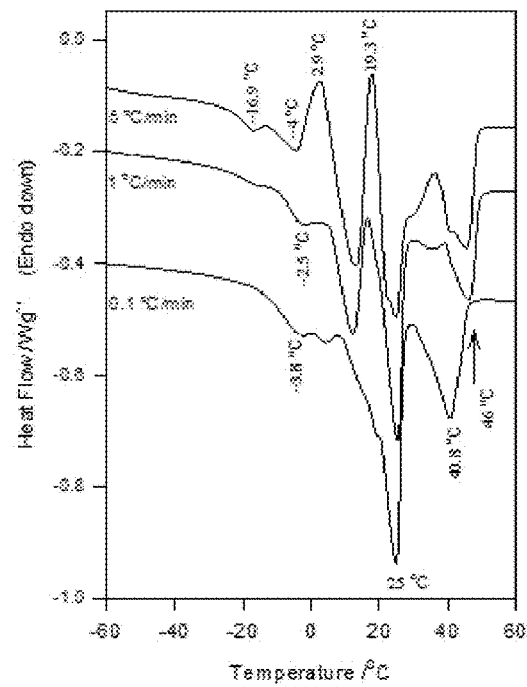
FIG. 4b depicts a subsequent DSC heating (5° C./min) thermograms of PMTAG.

(For FIGS. 4a and 4b, cooling rates are reported at the left hand side above each curve and Peak temperatures are reported on the signal maximums.)

Figure 5A:
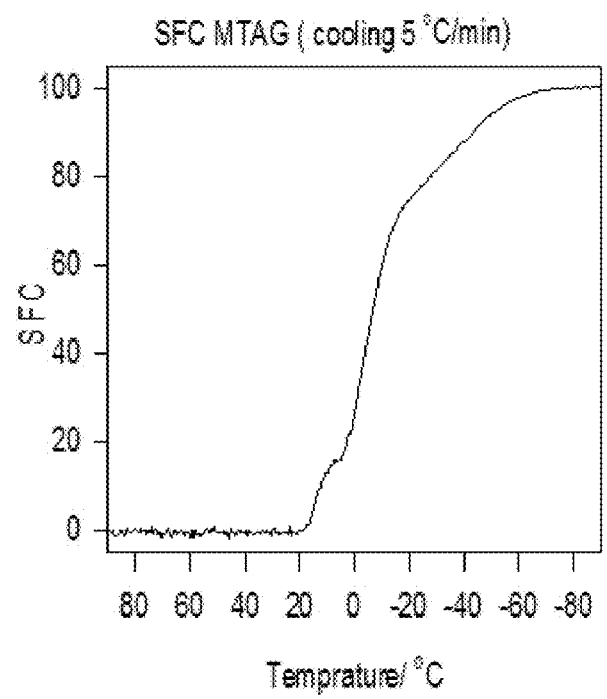
Figure 5B:
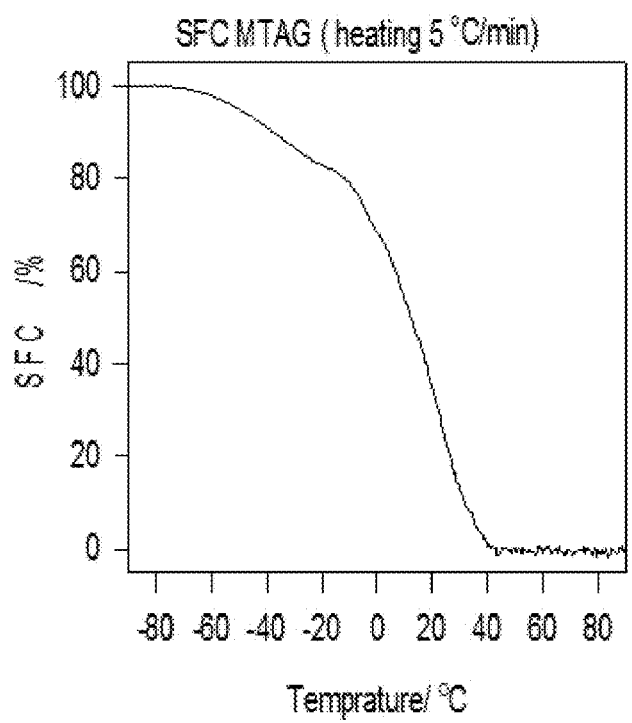

FIG. 5a depicts SFC versus temperature of PMTAG obtained during cooling at 5° C./min and FIG. 5b depicts the subsequent heating at 5° C./min.

FIGS. 6a, 6b, 6c, and 6d depict a microstructure (100×) development of the PMTAG during cooling (5° C.) from the melt.

FIGS. 6e and 6f depict a final microstructure of the PMTAG at −90° C. obtained at 100× and 500× magnification, respectively.

Figure 7A:
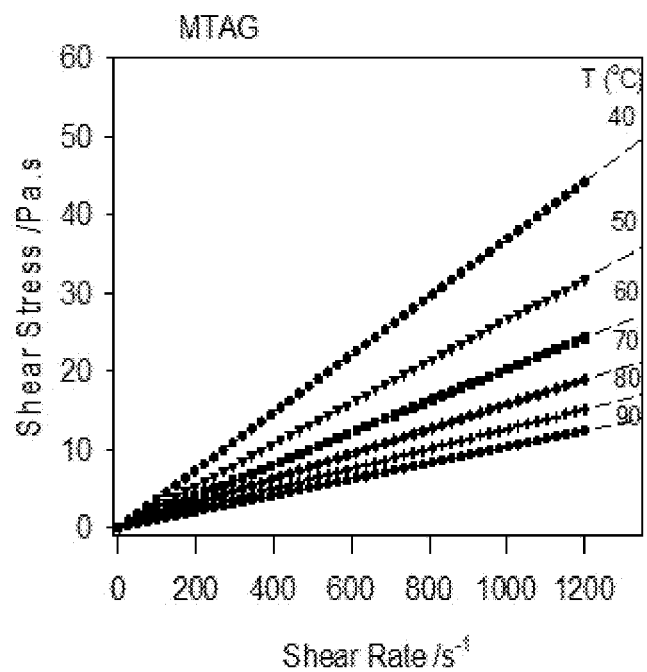

FIG. 7a depicts a heat rate versus shear stress curve of PMTAG showing Newtonian behavior.

Figure 7B:
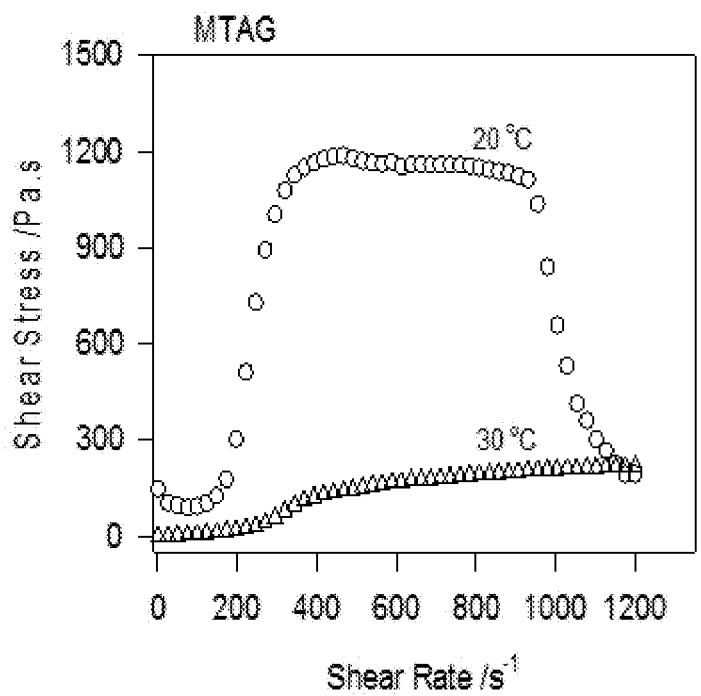

FIG. 7b depicts a heat rate versus shear stress curve of PMTAG showing non-Newtonian behavior.

Figure 8:
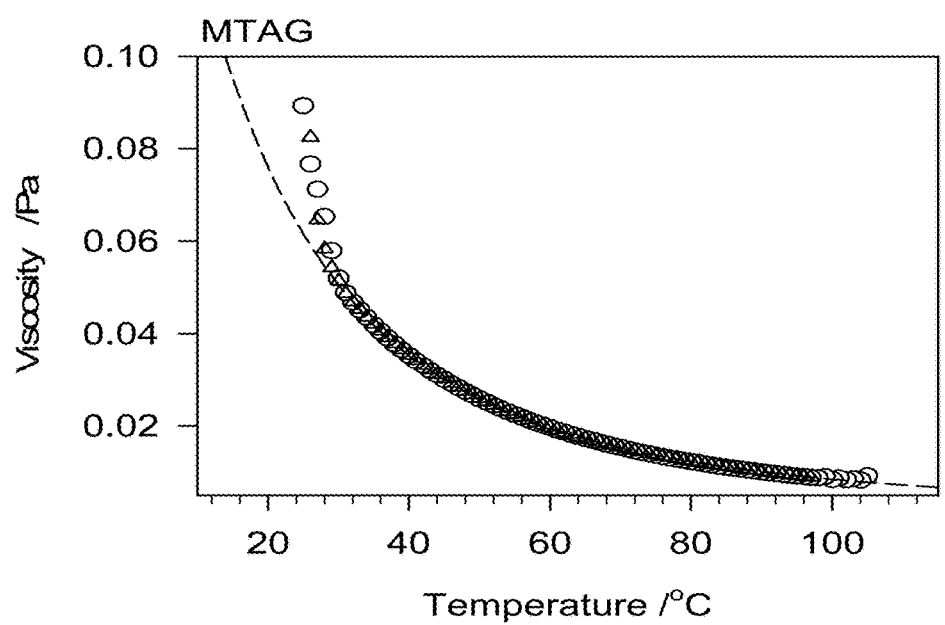

FIG. 8 depicts a viscosity versus temperature curve obtained during cooling of PMTAG at (○) 3° C./min and (Δ) 1° C./min. Dashed lines are a guide for the eye.

FIG. 9a depicts a $^1$H-NMR spectrum of Epoxy B1-PMTAG.

FIG. 9b depicts a $^1$H-NMR spectrum of Epoxy B2-PMTAG.

FIG. 9c depicts a $^1$H-NMR spectrum of Epoxy B3-PMTAG.

FIG. 9d depicts a $^1$H-NMR spectrum of Epoxy B4-PMTAG.

Figure 10A:
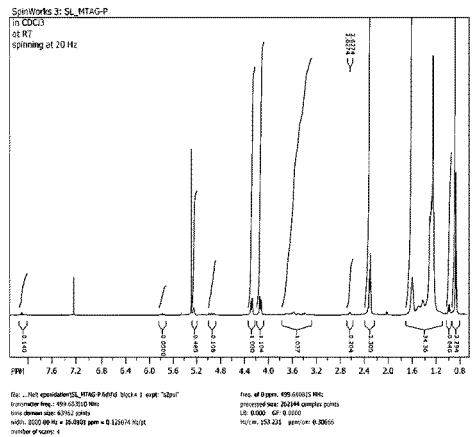

FIG. 10a depicts a $^1$H-NMR spectrum of B1-PMTAG Green Polyols.

Figure 10B:
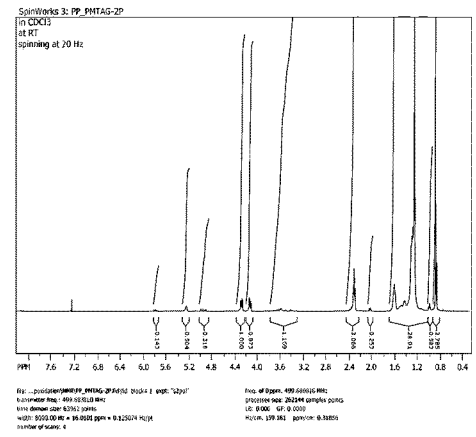

FIG. 10b depicts a $^1$H-NMR spectrum of B2-PMTAG Green Polyols.

Figure 10C:
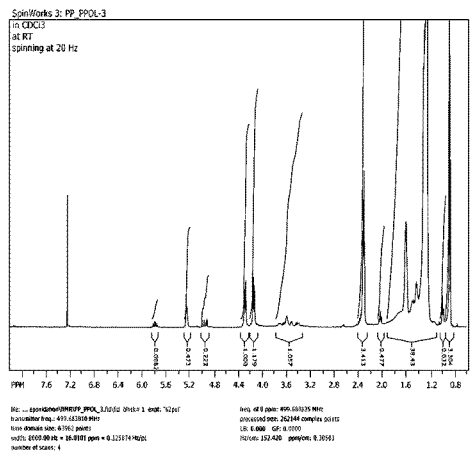

FIG. 10c depicts a $^1$H-NMR spectrum of B3-PMTAG Green Polyols.

Figure 10D:
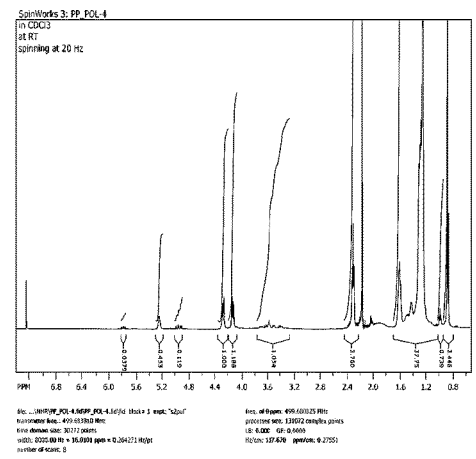

FIG. 10d depicts a $^1$H-NMR spectrum of B4-PMTAG Green Polyols.

Figure 11A:
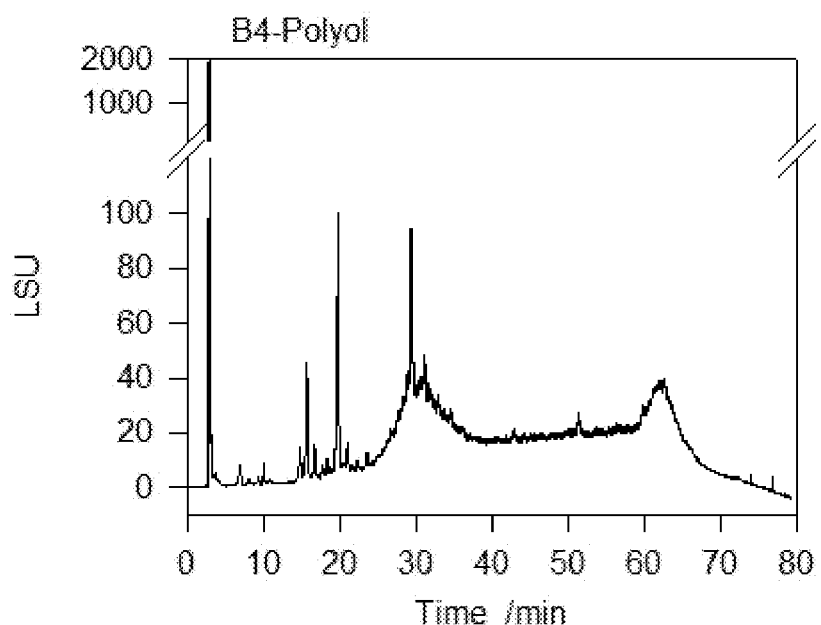

FIG. 11a depicts a HPLC of PMTAG Green Polyol (B4-Polyol).

Figure 11B:
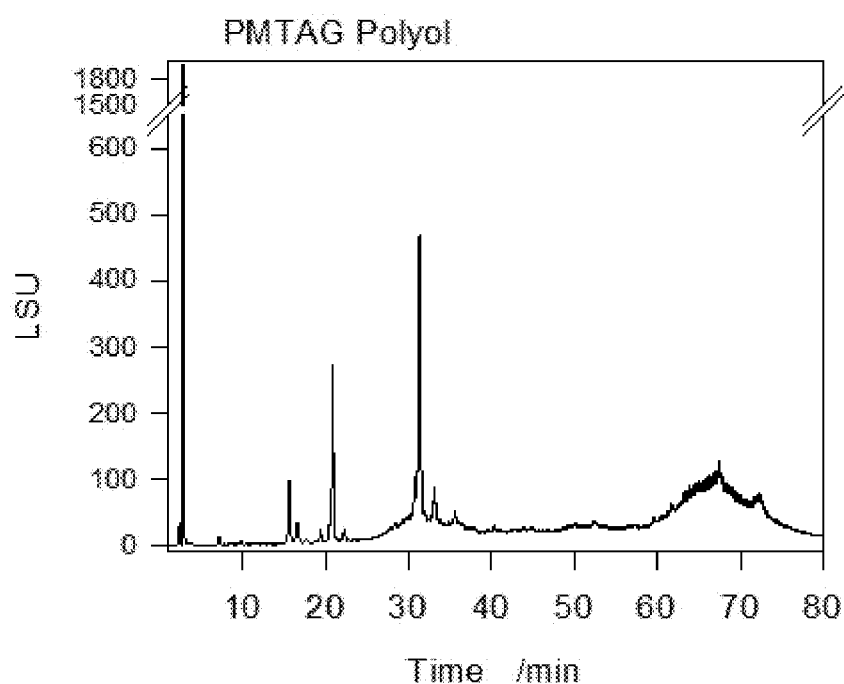

FIG. 11b depicts a HPLC of PMTAG Polyol.

FIGS. 12A, 12B, 12C, 12D, 12E, 12F, 12G, 12H, and 12I depict $^1$H NMR spectra of the column chromatography fractions F1 to F9.

Figure 13A:
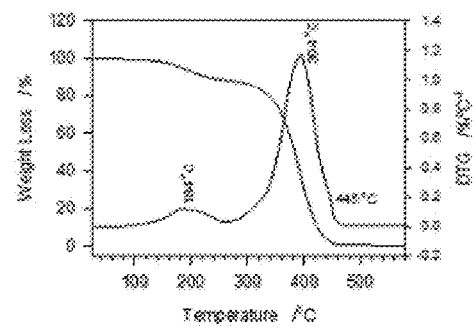

FIG. 13a depicts a TGA and DTG profile of B1-PMTAG Green Polyol.

Figure 13B:
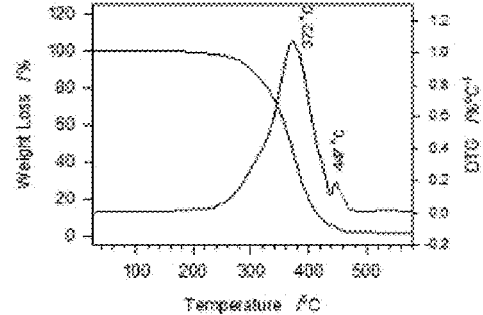

FIG. 13b depicts a TGA and DTG profile of B2-PMTAG Green Polyol.

Figure 13C:
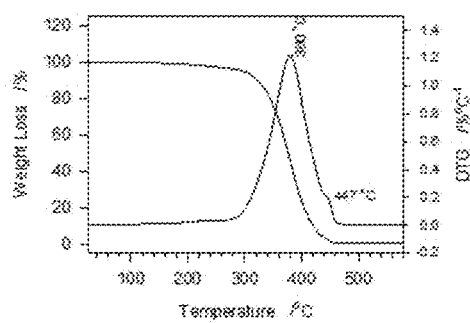

FIG. 13c depicts a TGA and DTG profile of B3-PMTAG Green Polyol.

Figure 13D:
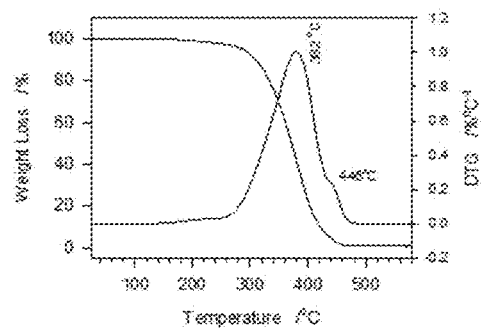

FIG. 13d depicts a TGA and DTG profile of B4-PMTAG Green Polyol.

Figure 13E:
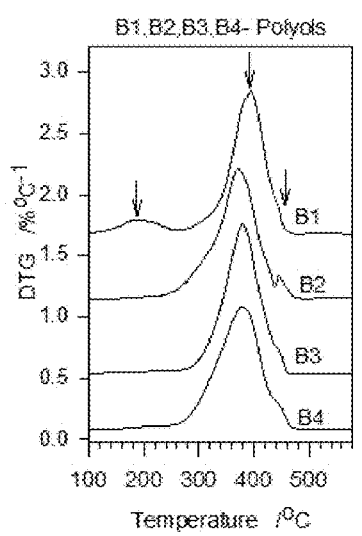

FIG. 13e depicts a stacked DTG profiles of B1-, B2-, B3- and B4-PMTAG Green Polyols.

FIGS. 14A, 14A2, 14A3, 14A4, and 14A5 depict DSC thermograms of PMTAG Green Polyols during cooling (5.0° C./min).

FIGS. 14B, 14B2, 14B3, 14B4, and 14B5 depict DSC thermograms of PMTAG Green Polyols during subsequent heating (5° C./min).

(Note: In FIGS. 14A-14A5 and 14B-14B5, Curves B1-4: B1 to B4-PMTAG Green Polyol, respectively)

Figure 15A:
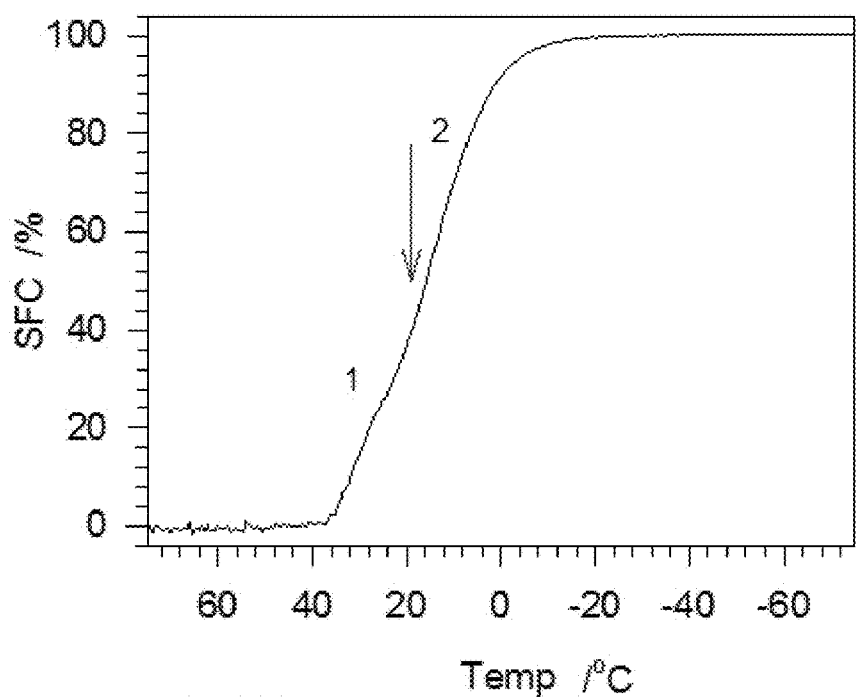

FIG. 15a depicts a SFC versus temperature of PMTAG Green Polyol (B4-Polyol) during cooling at 5.0° C./min.

Figure 15B:
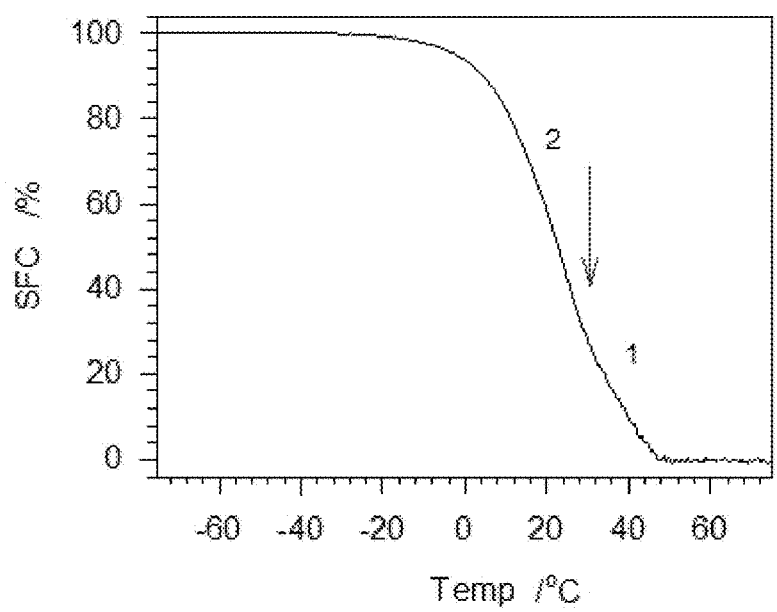

FIG. 15b depicts a SFC versus temperature of PMTAG Green Polyol (B4-Polyol) during heating at 5.0° C./min.

Figure 16A:
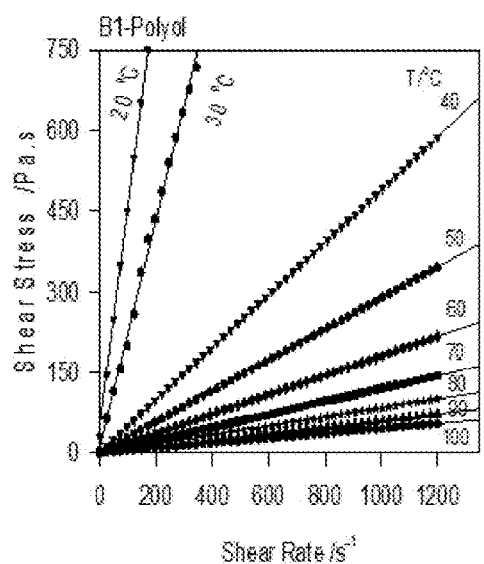

FIG. 16a depicts a shear rate-shear stress of B1-PMTAG Green Polyols.

Figure 16B:
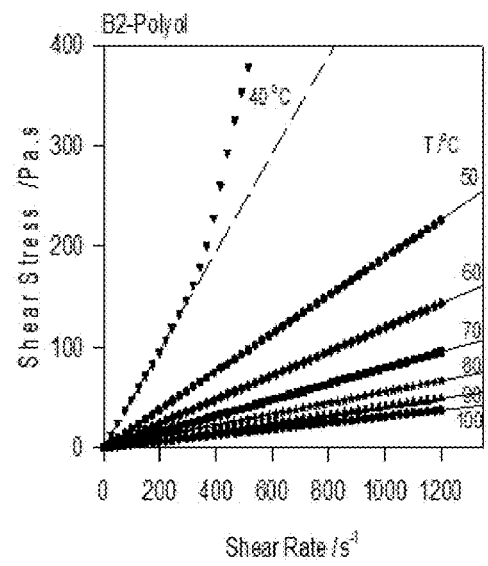

FIG. 16b depicts a shear rate-shear stress of B2-PMTAG Green Polyols.

Figure 16C:
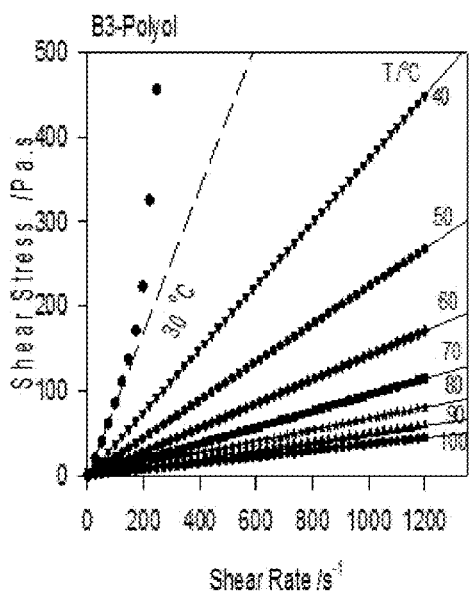

FIG. 16c depicts a shear rate-shear stress of B3-PMTAG Green Polyols.

Figure 16D:
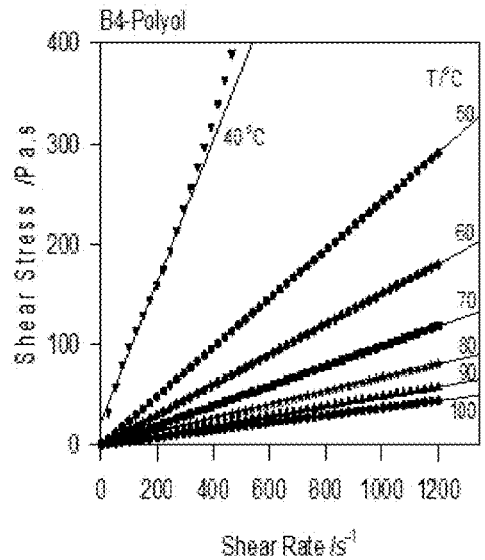
Figure 17A:
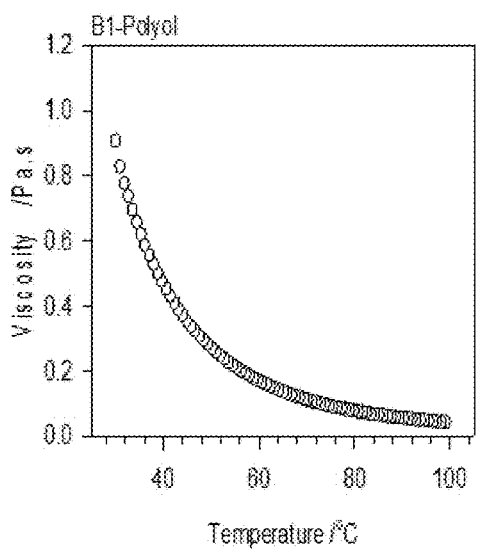
Figure 17B:
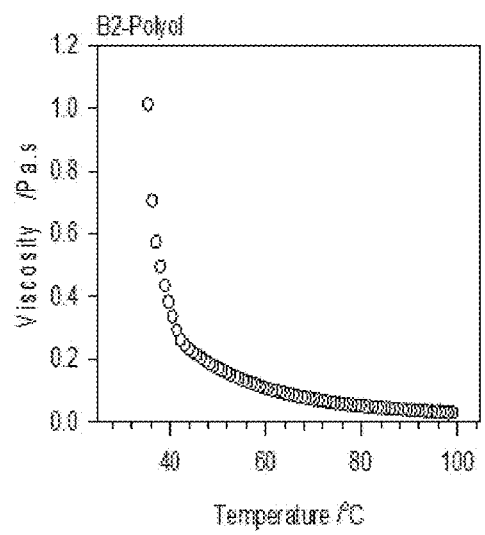
Figure 17C:
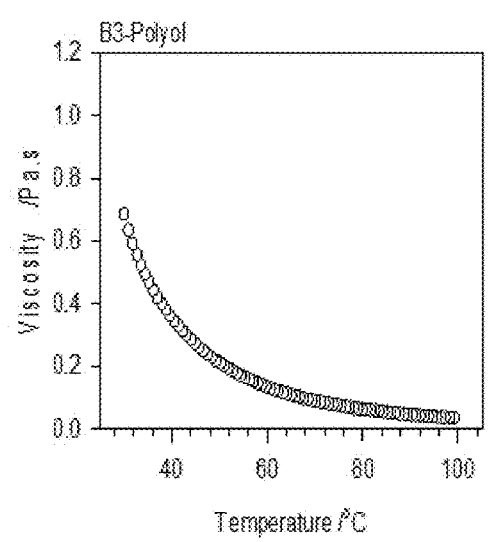
Figure 17D:
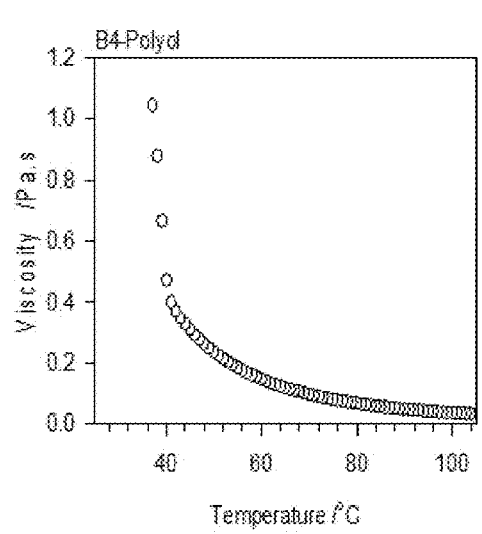

FIG. 16d depicts a shear rate-shear stress of B4-PMTAG Green Polyols.

FIGS. 17a-d depict viscosity versus temperature curves obtained during cooling (1° C./min) of B1-, B2-, B-3, B-4 PMTAG Green Polyols, respectively.

FIGS. 18a-b depict SEM micrographs of rigid B1234-Foam at SEM magnifications 51× and 102×, respectively.

FIGS. 19a-b depict SEM micrographs of flexible B1234-Foam at SEM magnifications 51× and 102×, respectively.

Figure 20A:
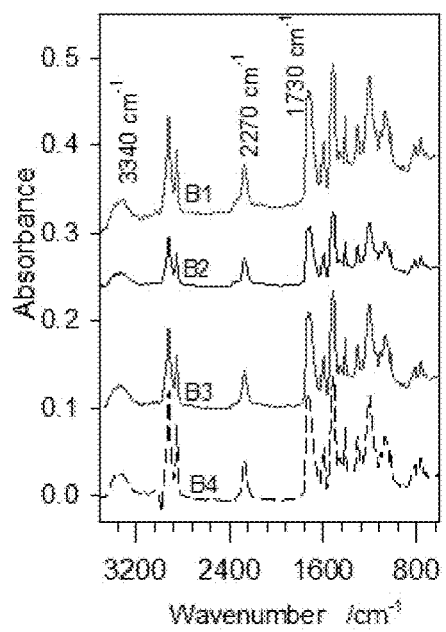

FIG. 20a depicts a FTIR spectra of rigid B1234 Foam.

Figure 20B:
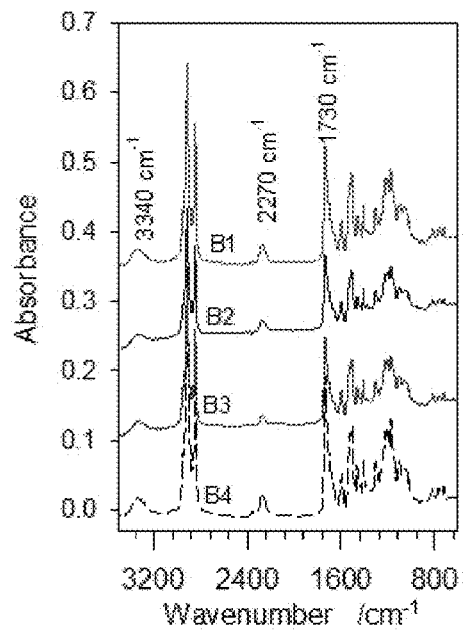

FIG. 20b depicts a FTIR spectra of flexible B1234 Foam.

Figure 21A:
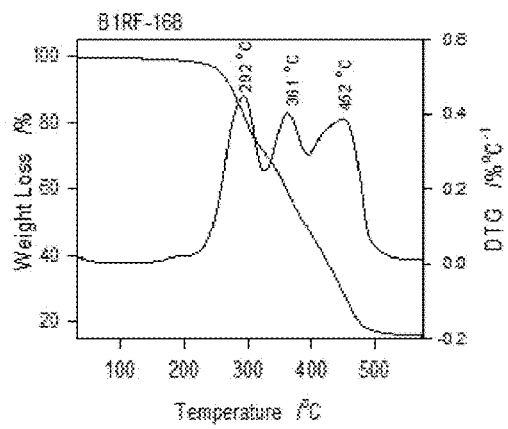

FIG. 21a depicts a TGA and DTG curve of rigid PMTAG Green Polyol foam, B1-RF168.

Figure 21B:
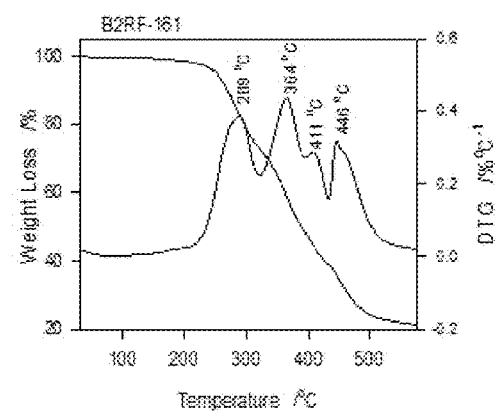

FIG. 21b depicts a TGA and DTG curve of rigid PMTAG Green Polyol foam, B2-RF161.

Figure 21C:
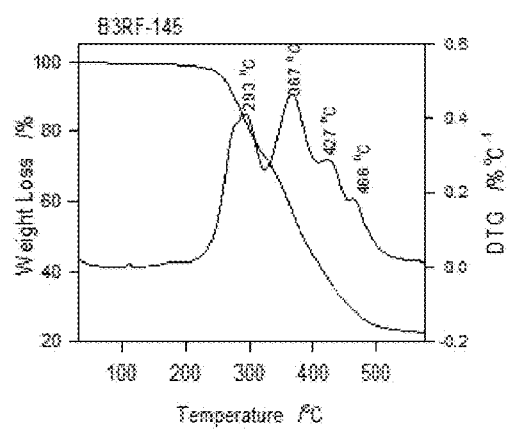

FIG. 21c depicts a TGA and DTG curve of rigid PMTAG Green Polyol foam, B3-RF145.

Figure 21D:
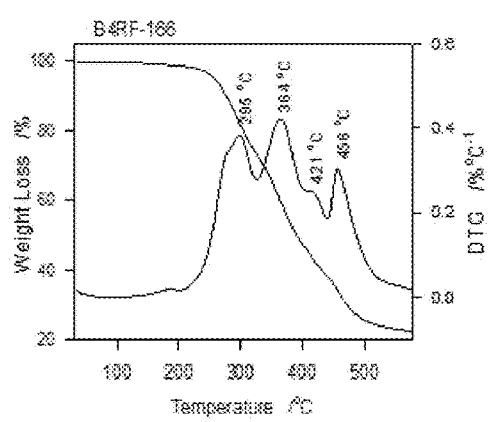

FIG. 21d depicts a TGA and DTG curve of rigid PMTAG Green Polyol foam, B4-RF166.

Figure 22A:
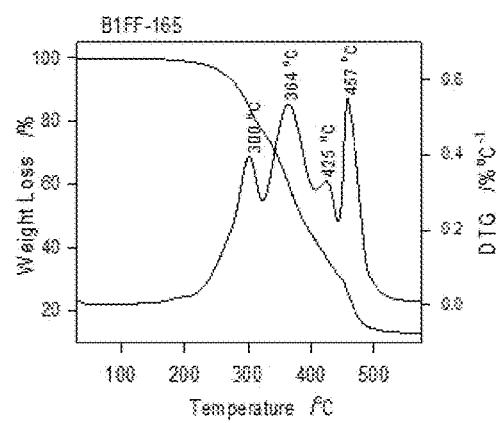

FIG. 22a depicts a TGA and DTG curve of rigid PMTAG Green Polyol foams, B1-FF165.

Figure 22B:
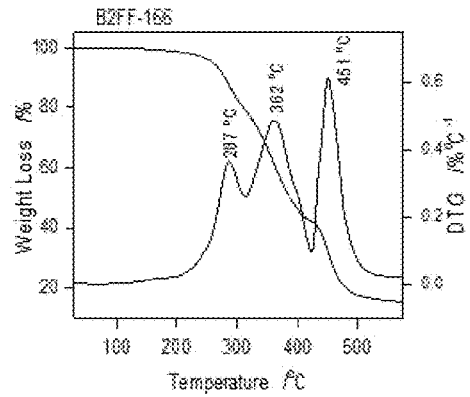

FIG. 22b depicts a TGA and DTG curve of rigid PMTAG Green Polyol foams, B2-FF166.

Figure 22C:
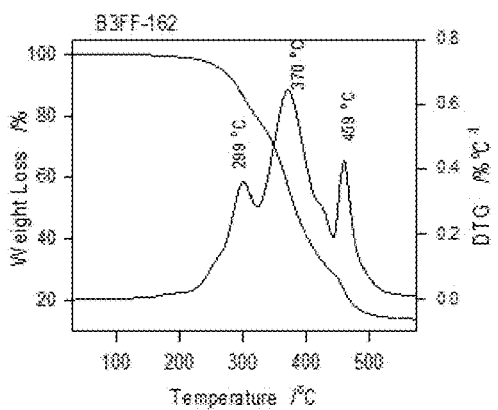

FIG. 22c depicts a TGA and DTG curve of rigid PMTAG Green Polyol foams, B3-FF162.

Figure 22D:
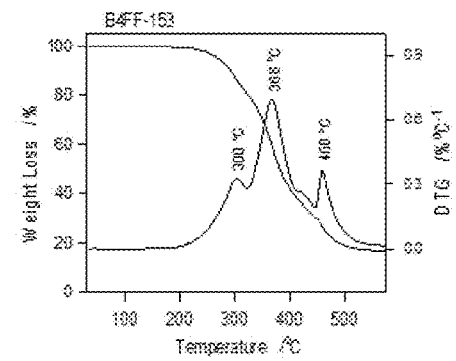

FIG. 22d depicts a TGA and DTG curve of rigid PMTAG Green Polyol foams, B4-FF153.

Figure 23A:
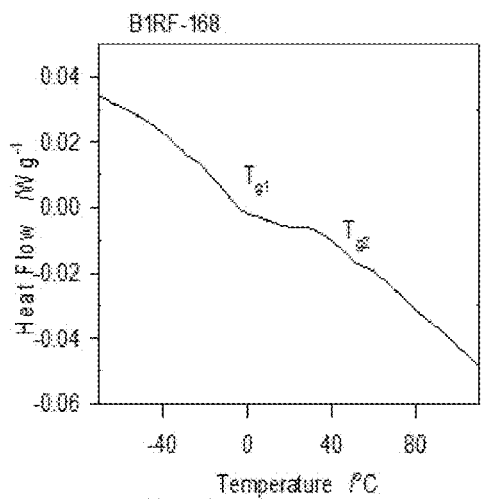

FIG. 23a depicts a second DSC thermogram of rigid PMTAG Green Polyol foams, B1-RF168.

Figure 23B:
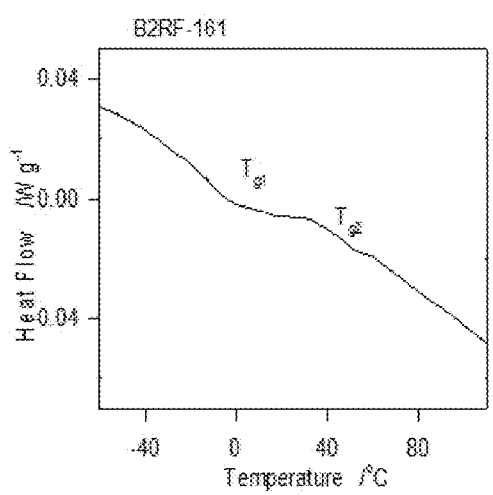

FIG. 23b depicts a second DSC thermogram of rigid PMTAG Green Polyol foams, B2-RF161.

Figure 23C:
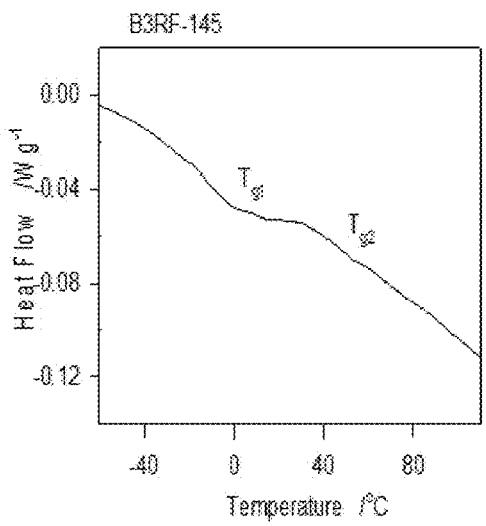

FIG. 23c depicts a second DSC thermogram of rigid PMTAG Green Polyol foams, B3-RF145.

Figure 23D:
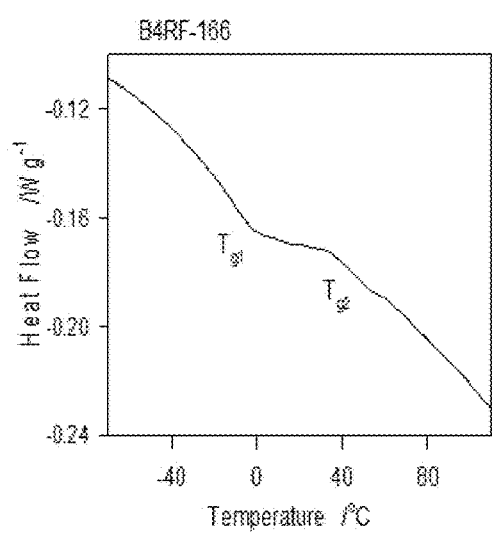

FIG. 23d depicts a second DSC thermogram of rigid PMTAG Green Polyol foams, B4-FF166.

Figure 24A:
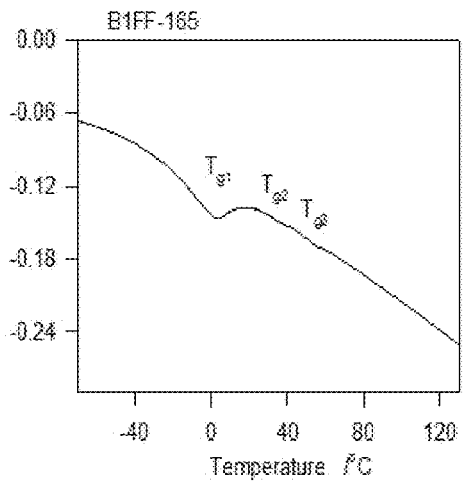

FIG. 24a depicts a second heating DSC thermogram of flexible PMTAG Green Polyol foam, B1-FF165.

Figure 24B:
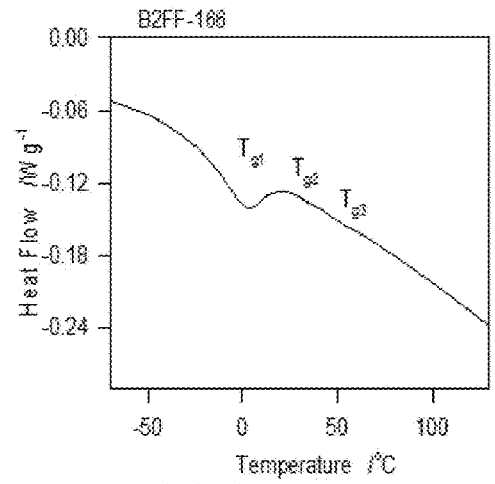

FIG. 24b depicts a second heating DSC thermogram of flexible PMTAG Green Polyol foam, B2-FF166.

Figure 24C:
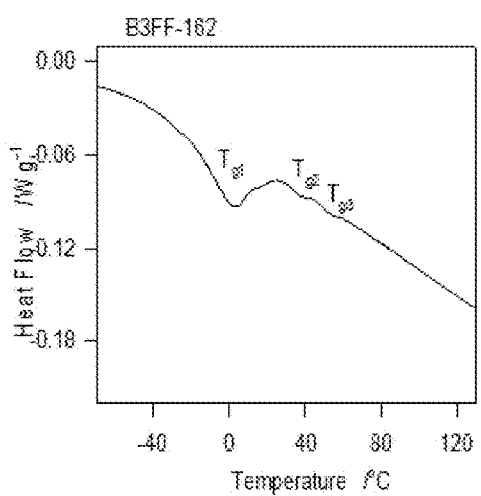

FIG. 24c depicts a second heating DSC thermogram of flexible PMTAG Green Polyol foam, B3-FF162.

Figure 24D:
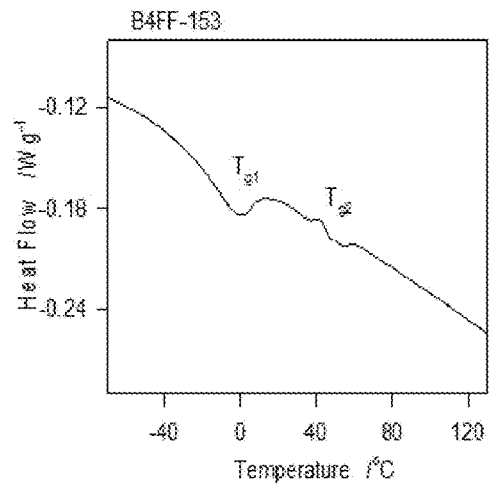

FIG. 24d depicts a second heating DSC thermogram of flexible PMTAG Green Polyol foam, B4-FF153.

Figure 25A:
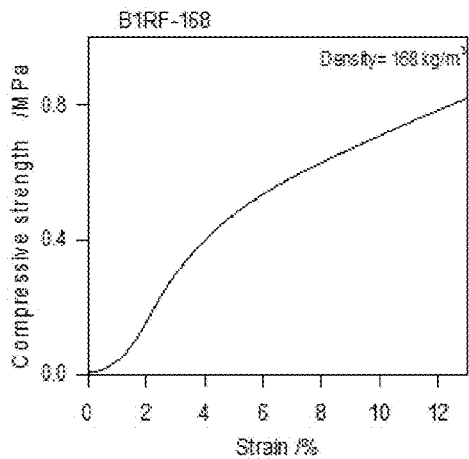

FIG. 25a depicts a compressive strength versus strain curve of rigid foam, B1-RF168.

Figure 25B:
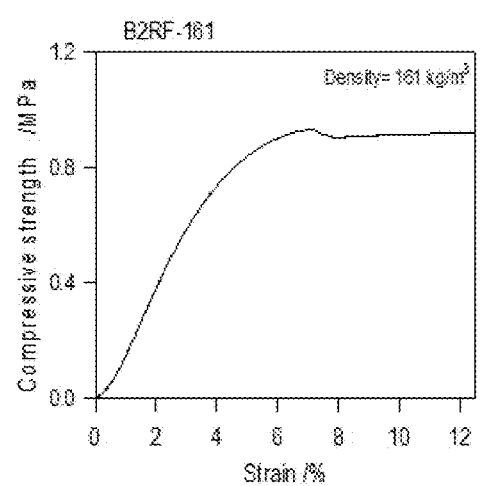

FIG. 25b depicts a compressive strength versus strain curve of rigid foam, B2-RF161.

Figure 25C:
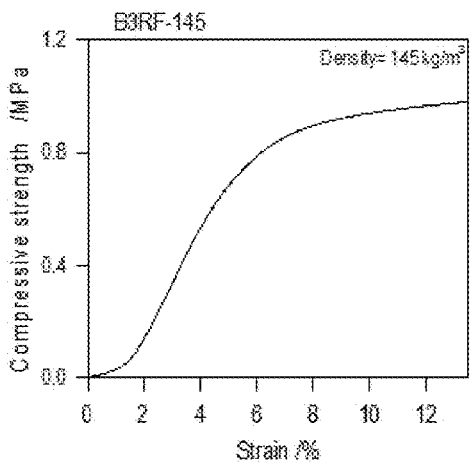

FIG. 25c depicts a compressive strength versus strain curve of rigid foam, B3-RF145.

Figure 25D:
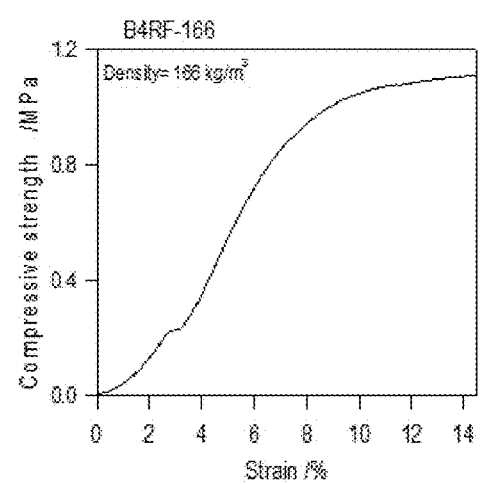

FIG. 25d depicts a compressive strength versus strain curve of rigid foam, B4-RF166.

Figure 26A:
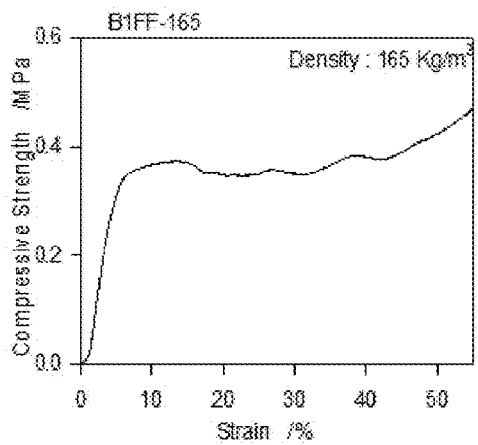

FIG. 26a depicts a stress versus strain curve of flexible foam, B1-FF165.

Figure 26B:
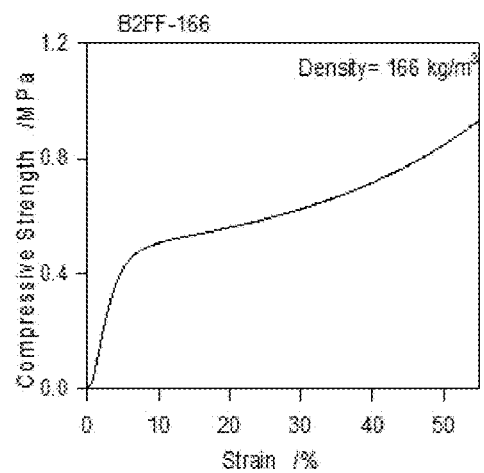

FIG. 26b depicts a stress versus strain curve of flexible foam, B2-FF166.

Figure 26C:
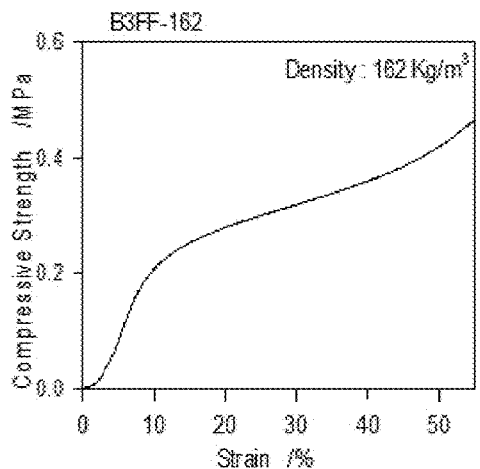

FIG. 26c depicts a stress versus strain curve of flexible foam, B3-FF162.

Figure 26D:
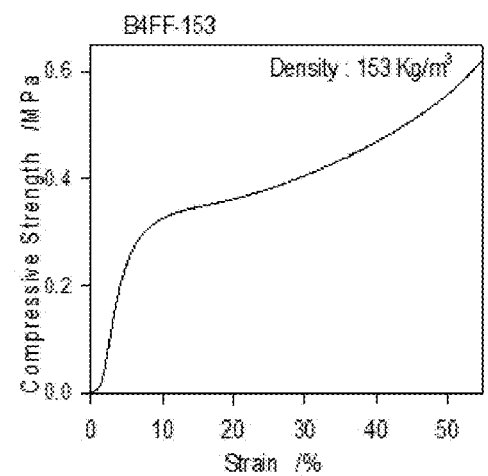

FIG. 26d depicts a stress versus strain curve of flexible foam, B4-FF153.

Figures 27A, 27B, 27C, 27D:
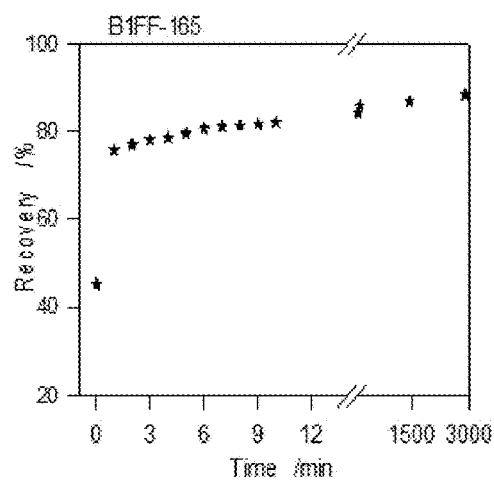

FIG. 27a depicts a % Recovery of flexible PMTAG Green Polyol foam as a function of time, B1-FF165.

FIG. 27b depicts a % Recovery of flexible PMTAG Green Polyol foam as a function of time, B2-FF166.

FIG. 27c depicts a % Recovery of flexible PMTAG Green Polyol foam as a function of time, B3-FF162.

FIG. 27d depicts a % Recovery of flexible PMTAG Green Polyol foam as a function of time, B4-FF153.

DETAILED DESCRIPTION

In order to simplify the presentation and discussion of the data of the present patent application, a comprehensive nomenclature of the different compounds, and acronyms used is presented in Table A.

TABLE A

| Nomenclature and acronyms | |
|---|---|
| Name | Acronym |
| Metathesized Triacylglycerol | |
| Metathesized Triacylglycerol | MTAG |
| MTAG of Palm Oil | PMTAG |
| PMTAG Green Polyols | |
| Epoxy of PMTAG from Batch 1 | Epoxy B1-PMTAG |
| Epoxy of PMTAG from Batch 2 | Epoxy B2-PMTAG |
| Epoxy of PMTAG from Batch 3 | Epoxy B3-PMTAG |
| Epoxy of PMTAG from Batch 4 | Epoxy B4-PMTAG |
| Green Polyol from PMTAG from Batch 1 | B1-PMTAG Green Polyol |
| Green Polyol from PMTAG from Batch 2 | B2-PMTAG Green Polyol |
| Green Polyol from PMTAG from Batch 3 | B3-PMTAG Green Polyol |
| Green Polyol from PMTAG from Batch 4 | B4-PMTAG Green Polyol |
| Foams | |
| Rigid Foam | RF |
| Flexible Foam | FF |
| Foam from Green Polyol from Batch 1 | B1-PMTAG Polyol Foam |
| Foam from Green Polyol from Batch 2 | B2-PMTAG Polyol Foam |
| Foam from Green Polyol from Batch 3 | B3-PMTAG Polyol Foam |
| Foam from Green Polyol from Batch 4 | B4-PMTAG Polyol Foam |
| Rigid Foam having a density of xxx kg/m$^3$ from Green Polyol from Batch 1 | B1-RFxxx |
| Rigid Foam having a density of xxx kg/m$^3$ from Green Polyol from Batch 2 | B2-RFxxx |
| Rigid Foam having a density of xxx kg/m$^3$ from Green Polyol from Batch 3 | B3-RFxxx |
| Rigid Foam having a density of xxx kg/m$^3$ from Green Polyol from Batch 4 | B4-RFxxx |
| Flexible Foam having a density of xxx kg/m$^3$ from Green Polyol from Batch 1 | B1-FFxxx |
| Flexible Foam having a density of xxx kg/m$^3$ from Green Polyol from Batch 2 | B2-FFxxx |
| Flexible Foam having a density of xxx kg/m$^3$ from Green Polyol from Batch 3 | B3-FFxxx |
| Flexible Foam having a density of xxx kg/m$^3$ from Green Polyol from Batch 4 | B4-FFxxx |

Metathesized Triacylglycerols of Natural Oils

Synthesis of Metathesized Triacylglycerols for Production of Polyols

The synthesis of rigid and flexible polyurethane foams, and other polyurethanes, from natural oil based metathesized triacylglycerol (MTAG), including palm oil MTAG or PMTAG, and polyols thereof, begins with the initial synthesis of the MTAGs themselves. A general definition of a metathesized triacylglycerol is the product formed from the metathesis reaction (self-metathesis or cross-metathesis) of an unsaturated triglyceride in the presence of a metathesis catalyst to form a product including one or more metathesis monomers, oligomers or polymers.

Metathesis is a catalytic reaction that involves the interchange of alkylidene units among compounds containing one or more double bonds (i.e., olefinic compounds) via the formation and cleavage of the carbon-carbon double bonds. The metathesis catalyst in this reaction may include any catalyst or catalyst system that catalyzes a metathesis reaction. Generally, cross metathesis may be represented schematically as shown in Scheme 1 below:

Scheme 1. Representation of cross-metathesis reaction.
Wherein $R^1$, $R^2$, $R^3$, and $R^4$ are organic compounds.

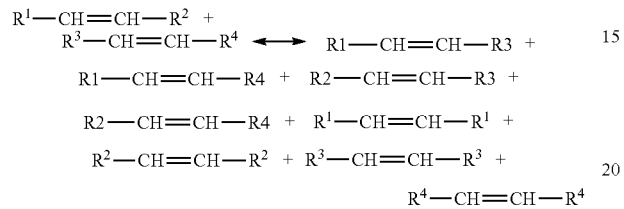

Suitable homogeneous metathesis catalysts include combinations of a transition metal halide or oxo-halide (e.g., $WOCl_4$ or $WCl_6$) with an alkylating cocatalyst (e.g., $Me_4Sn$). Homogeneous catalysts are well-defined alkylidene (or carbene) complexes of transition metals, particularly Ru, Mo, or W. These include first and second-generation Grubbs catalysts, Grubbs-Hoveyda catalysts, and the like. Suitable alkylidene catalysts have the general structure:

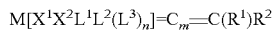

where M is a Group 8 transition metal, $L^1$, $L^2$, and $L^3$ are neutral electron donor ligands, n is 0 (such that $L^3$ may not be present) or 1, m is 0, 1, or 2, $X^1$ and $X^2$ are anionic ligands, and $R^1$ and $R^2$ are independently selected from H, hydrocarbyl, substituted hydrocarbyl, heteroatom-containing hydrocarbyl, substituted heteroatom-containing hydrocarbyl, and functional groups. Any two or more of $X^1$, $X^2$, $L^1$, $L^2$, $L^3$, $R^1$ and $R^2$ can form a cyclic group and any one of those groups can be attached to a support.

First-generation Grubbs catalysts fall into this category where m=n=0 and particular selections are made for n, $X^1$, $X^2$, $L^1$, $L^2$, $L^3$, $R^1$ and $R^2$ as described in U.S. Pat. Appl. Publ. No. 2010/0145086 ("the '086 publication"), the teachings of which related to all metathesis catalysts are incorporated herein by reference. Second-generation Grubbs catalysts also have the general formula described above, but $L^1$ is a carbene ligand where the carbene carbon is flanked by N, O, S, or P atoms, (e.g., by two N atoms). The carbene ligand may be part of a cyclic group. Examples of suitable second-generation Grubbs catalysts also appear in the '086 publication.

In another class of suitable alkylidene catalysts, $L^1$ is a strongly coordinating neutral electron donor as in first- and second-generation Grubbs catalysts, and $L^2$ and $L^3$ are weakly coordinating neutral electron donor ligands in the form of optionally substituted heterocyclic groups. Thus, $L^2$ and $L^3$ are pyridine, pyrimidine, pyrrole, quinoline, thiophene, or the like. In yet another class of suitable alkylidene catalysts, a pair of substituents is used to form a bi- or tridentate ligand, such as a biphosphine, dialkoxide, or alkyldiketonate. Grubbs-Hoveyda catalysts are a subset of this type of catalyst in which $L^2$ and $R^2$ are linked. A neutral oxygen or nitrogen may coordinate to the metal while also being bonded to a carbon that is α-, β-, or γ- with respect to the carbene carbon to provide the bidentate ligand. Examples of suitable Grubbs-Hoveyda catalysts appear in the '086 publication.

The structures below (Scheme 2) provide just a few illustrations of suitable catalysts that may be used:

Scheme 2. Structures of few metathesis catalysts.

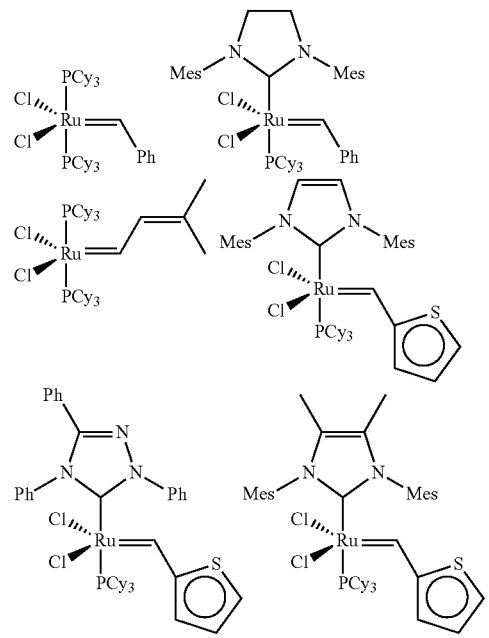

Heterogeneous catalysts suitable for use in the self- or cross-metathesis reactions include certain rhenium and molybdenum compounds as described, e.g., by J. C. Mol in *Green Chem.* 4 (2002) 5 at pp. 11-12. Particular examples are catalyst systems that include $Re_2O_7$ on alumina promoted by an alkylating cocatalyst such as a tetraalkyl tin lead, germanium, or silicon compound. Others include $MoCl_3$ or $MoCl_5$ on silica activated by tetraalkyltins. For additional examples of suitable catalysts for self- or cross-metathesis, see U.S. Pat. No. 4,545,941, the teachings of which are incorporated herein by reference, and references cited therein. See also *J. Org. Chem.* 46 (1981) 1821; *J. Catal.* 30 (1973) 118; *Appl. Catal.* 70 (1991) 295; *Organometallics* 13 (1994) 635; *Olefin Metathesis and Metathesis Polymerization* by Ivin and Mol (1997), and *Chem. & Eng. News* 80(51), Dec. 23, 2002, p. 29, which also disclose useful metathesis catalysts. Illustrative examples of suitable catalysts include ruthenium and osmium carbene catalysts as disclosed in U.S. Pat. Nos. 5,312,940, 5,342,909, 5,710,298, 5,728,785, 5,728,917, 5,750,815, 5,831,108, 5,922,863, 6,306,988, 6,414,097, 6,696,597, 6,794,534, 7,102,047, 7,378,528, and U.S. Pat. Appl. Publ. No. 2009/0264672 A1, and PCT/US2008/009635, pp. 18-47, all of which are incorporated herein by reference. A number of metathesis catalysts that may be advantageously employed in metathesis reactions are manufactured and sold by Materia, Inc. (Pasadena, Calif.).

As a non-limiting aspect, a route to obtain MTAG may be via the cross metathesis of a natural oil with a lower weight olefin. As a non-limiting aspect, reaction routes using triolein with 1,2-butene and triolein with ethylene are shown below in Scheme 3a and 3b, respectively.

Scheme 3a. Metathesis reaction of triolein with 1,2-butylene.

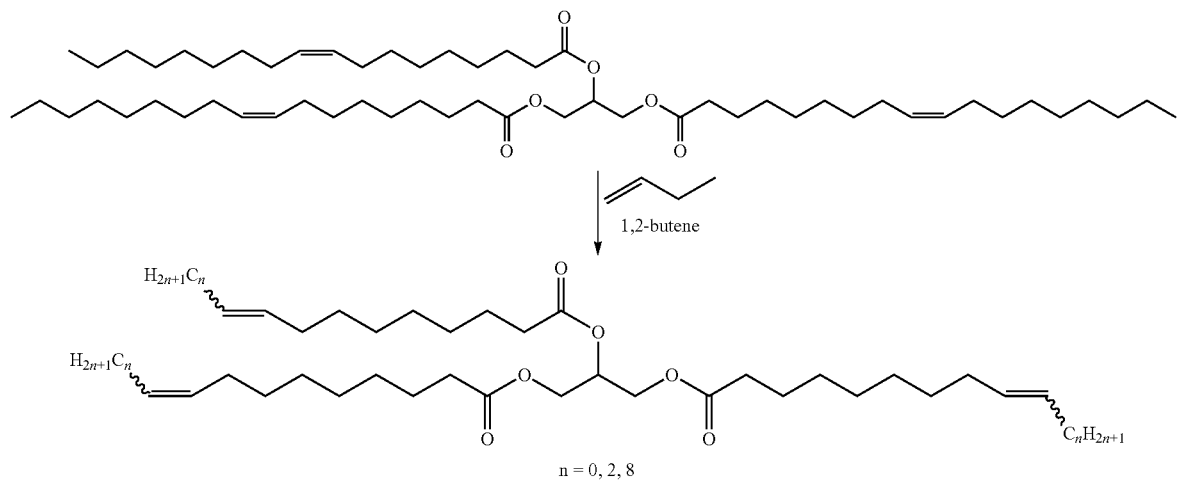

n = 0, 2, 8 n = 0, fatty acid is 9-denenoic acid (D), n = 2, the fatty acid is 9-dodecenoic acid (Dd) and n = 8, the fatty acid is oleic acid (O).

Scheme 3b.
Methathesis reaction of triolein with ethylene.

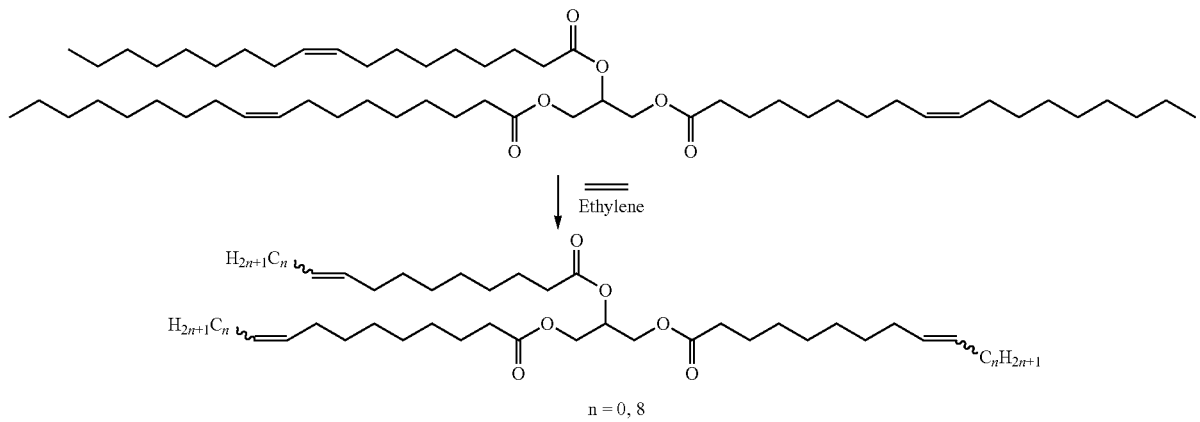

n = 0, 8 n = 0, the fatty acid is 9-denenoic acid (D), and n = 8, the fatty acid is oleic acid (O).

As used herein, the term "lower weight olefin" may refer to any one or a combination of unsaturated straight, branched, or cyclic hydrocarbons in the $C_2$ to $C_{14}$ range. Lower weight olefins include "alpha-olefins" or "terminal olefins," wherein the unsaturated carbon-carbon bond is present at one end of the compound. Lower weight olefins may also include dienes or trienes. Examples of low weight olefins in the $C_2$ to $C_6$ range include, but are not limited to: ethylene, propylene, 1-butene, 2-butene, isobutene, 1-pentene, 2-pentene, 3-pentene, 2-methyl-1-butene, 2-methyl-2-butene, 3-methyl-1-butene, cyclopentene, 1-hexene, 2-hexene, 3-hexene, 4-hexene, 2-methyl-1-pentene, 3-methyl-1-pentene, 4-methyl-1-pentene, 2-methyl-2-pentene, 3-methyl-2-pentene, 4-methyl-2-pentene, 2-methyl-3-pentene, and cyclohexene. Other possible low weight olefins include styrene and vinyl cyclohexane. In certain embodiments, a mixture of olefins may be used, the mixture including linear and branched low weight olefins in the $C_4$-$C_{10}$ range. In one embodiment, a mixture of linear and branched $C_4$ olefins may be used (e.g., combinations of: 1-butene, 2-butene, and/or isobutene). In other embodiments, a higher range of $C_{11}$-$C_{14}$ may be used.

As used herein, the term "natural oil" may refer to oil derived from plants or animal sources. The term "natural oil" includes natural oil derivatives, unless otherwise indicated. Examples of natural oils include, but are not limited to, vegetable oils, algal oils, animal fats, tall oils, derivatives of these oils, combinations of any of these oils, and the like. Representative non-limiting examples of vegetable oils include canola oil, rapeseed oil, coconut oil, corn oil, cottonseed oil, jojoba oil, olive oil, palm oil, peanut oil, safflower oil, sesame oil, soybean oil, sunflower oil, linseed oil, palm kernel oil, tung oil, jatropha oil, mustard oil, camelina oil, pennycress oil, hemp oil, algal oil, and castor oil. Representative non-limiting examples of animal fats include lard, tallow, poultry fat, yellow grease, and fish oil. Tall oils are by-products of wood pulp manufacture. In certain embodiments, the natural oil may be refined, bleached, and/or deodorized. In some embodiments, the natural oil may be partially or fully hydrogenated. In some embodiments, the natural oil is present individually or as mixtures thereof.

Natural oils may include triacylglycerols of saturated and unsaturated fatty acids. Suitable fatty acids may be saturated or unsaturated (monounsaturated or polyunsaturated) fatty acids, and may have carbon chain lengths of 3 to 36 carbon atoms. Such saturated or unsaturated fatty acids may be aliphatic, aromatic, saturated, unsaturated, straight chain or branched, substituted or unsubstituted and mono-, di-, tri-, and/or poly-acid variants, hydroxy-substituted variants, aliphatic, cyclic, alicyclic, aromatic, branched, aliphatic- and alicyclic-substituted aromatic, aromatic-substituted aliphatic and alicyclic groups, and heteroatom substituted variants thereof. Any unsaturation may be present at any suitable isomer position along the carbon chain as would be noted to a person skilled in the art.

Some non-limiting examples of saturated fatty acids include propionic, butyric, valeric, caproic, enanthic, caprylic, pelargonic, capric, undecylic, lauric, tridecylic, myristic, pentadecanoic, palmitic, margaric, stearic, nonadecyclic, arachidic, heneicosylic, behenic, tricosylic, lignoceric, pentacoyslic, cerotic, heptacosylic, carboceric, montanic, nonacosylic, melissic, lacceroic, psyllic, geddic, ceroplastic acids.

Some non-limiting examples of unsaturated fatty acids include butenoic, pentenoic, hexenoic, pentenoic, octenoic, nonenoic acid, decenoic acid, undecenoic acid, dodecenoic acid, tridecenoic, tetradecenoic, pentadecenoic, palmitoleic, palmitelaidic, oleic, ricinoleic, vaccenic, linoleic, linolenic, elaidic, eicosapentaenoic, behenic and erucic acids. Some unsaturated fatty acids may be monounsaturated, diunsaturated, triunsaturated, tetraunsaturated or otherwise polyunsaturated, including any omega unsaturated fatty acids.

In a triacylglycerol, each of the carbons in the triacylglycerol molecule may be numbered using the stereospecific numbering (sn) system. Thus one fatty acyl chain group is attached to the first carbon (the sn-1 position), another fatty acyl chain is attached to the second, or middle carbon (the sn-2 position), and the final fatty acyl chain is attached to the third carbon (the sn-3 position). The triacylglycerols described herein may include saturated and/or unsaturated fatty acids present at the sn-1, sn-2, and/or sn-3 position In some embodiments, the natural oil is palm oil. Palm oil may be semi-solid at room temperature and include approximately 50% saturated fatty acids and approximately 50% unsaturated fatty acids. Palm oil may include predominately fatty acid triacylglycerols, although monoacylglycerols and diacylglycerols may also be present in small amounts. The fatty acids may have chain lengths ranging from about C12 to about C20. Representative saturated fatty acids include, for example, C12:0, C14:0, C16:0, C18:0, and C20:0 saturated fatty acids. Representative unsaturated fatty acids include, for example, C16:1, C18:1, C18:2, and C18:3 unsaturated fatty acids. As used herein, metathesized triacylglycerols derived from palm oil may be referred to interchangeably as "palm oil MTAG" or "PMTAG" or "MTAG of/from palm oil."

Palm oil is constituted mainly of palmitic acid and oleic acid with ~43% and ~41%, respectively. The fatty acid and triglyceride (TAG) profiles of palm oil are listed in Table 1 and Table 2, respectively.

TABLE 1

Fatty acid profile of palm oil

| Fatty acid | C12:0 | C14:0 | C16:0 | C18:0 | C18:1 | C18:2 | Others |
|---|---|---|---|---|---|---|---|
| Content (%) | 0.2 | 1.0 | 42.9 | 4.4 | 40.8 | 10.2 | 0.5 |

TABLE 2

TAG profiles of palm oil. (M, myristic acid; O, oleic acid; P, palmitic acid; L, linoleic acid; S, stearic acid)

| Unsaturated TAGs | OLL | PLL | OLO | POL | PLP | OOO | POO | POP | SOO | POS |
|---|---|---|---|---|---|---|---|---|---|---|
| Content (%) | 0.4 | 1.2 | 1.5 | 8.9 | 9.2 | 3.9 | 23.2 | 30.2 | 2.9 | 6.7 |
| Saturated TAGs | PPM | PPP | PPS | Others | | | | | | |
| Content (%) | 0.2 | 6.7 | 1.1 | 3.8 | | | | | | |

Analytical Methods for PMTAG

The PMTAG, as represented by the non-limiting synthesis procedure, was analyzed using different techniques. These techniques can be broken down into: (i) chemistry characterization techniques, including iodine value, acid value, nuclear magnetic resonance (NMR), gas chromatography (GC), and high pressure liquid chromatography (HPLC), including fast and slow methods of the HPLC; and (ii) physical characterization methods, including thermogravimetric analysis (TGA), differential scanning calorimetry (DSC), rheology, solid fat content (SFC), and polarized light microscopy (PLM).

Chemistry Characterization Techniques

Iodine and acid values of the PMTAG was determined according to ASTM D5554-95 and ASTM D4662-03, respectively.

$^1$H-NMR spectra were recorded on a Varian Unity-INOVA at 499.695 MHz. $^1$H chemical shifts are internally referenced to CDCl$_3$ (7.26 ppm) for spectra recorded in CDCl$_3$. All spectra were obtained using an 8.6 μs pulse with 4 transients collected in 16 202 points. Datasets were zero-filled to 64 000 points, and a line broadening of 0.4 Hz was applied prior to Fourier transforming the sets. The spectra were processed using ACD Labs NMR Processor, version 12.01.

HPLC analysis was performed on a Waters Alliance (Milford, Mass.) e2695 HPLC system fitted with a Waters ELSD 2424 evaporative light scattering detector. The HPLC system was equipped with an inline degasser, a pump, and an autosampler. The ELSD nitrogen flow was set at 25 psi with nebulization and drifting tube maintained at 12° C. and 55° C., respectively. Gain was set at 500. All solvents were HPLC grade and obtained from VWR International, Mississauga, ON. Waters Empower Version 2 software was used for data collection and data analysis. Purity of eluted samples was determined using the relative peak area. For a fast method of PMTAG analysis, the analysis was performed on a C18 column (150 mm×4.6 mm, 5.0 µm, X-Bridge column, Waters Corporation, MA) maintained at 30° C. by column oven (Waters Alliance). The mobile phase was chloroform:acetonitrile (40:60)v run for 10 min at a flow rate of 1 ml/min. 1 mg/ml (w/v) solution of crude sample in chloroform was filtered through single step filter vial (Thomson Instrument Company, 35540, CA) and 10 µL of sample was passed through the C18 column by reversed-phase in isocratic mode. For a slower method of PMTAG analysis, the analysis was performed using two columns (C18, 150 mm×4.6 mm, 5.0 µm, X-Bridge column, Waters Corporation, MA, and Superspher 100 RP-18, 250 mm×4.0 mm, Thermo Science) set up in series at 30° C. The mobile phase was 2-Propanol:acetonitrile:Heptane (38:57:5)v run for 120 min at a flow rate of 0.5 ml/min. 5 mg/ml (w/v) solution of crude sample in Heptane was filtered through single step filter vial (Thomson Instrument Company, CA) and 4 µL of sample was passed through the columns by reversed-phase in isocratic mode. This method achieved a better separation than the fast method.

Gas chromatography (GC) was performed on an Agilent 7890 Gas Chromatograph equipped with a split/splitless inlet. The column effluent was split using an Agilent splitter assembly with makeup gas. The splitter was connected the two detectors via deactivated guard columns. The length of the guard column was 0.5 m to the Flame Ionization Detector and 5.0 m to the Agilent 5975C Mass Selective detector. The column used for the analysis was a Restek Rtx-65TG capillary column (Crossbond 65% diphenyl/35% dimethyl polysiloxane; 30 m×0.25 mm×0.1 µm df). One microliter of the sample was injected using a LEAP Technologies Combi-PAL autosampler equipped with a 10 µL syringe.

| Instrument Parameters - Agilent GC/MS - FID | |
|---|---|
| Injection Volume | 1 µL |
| Syringe Size | 10 µL |
| Septum Purge Flow | 3 mL/minute |
| Split Ratio | 20:1 |
| Split Flow | 40 mL/minute |
| Column Flow (Helium) | 2 mL/minute (constant flow) |
| Initial Column Pressure | 16.0 psig |
| Inlet Temperature | 275° C. |
| MSD Transfer Line | 300° C. |
| Oven Parameters | |
| Equilibration Time | 0.5 minutes |
| Initial Temperature | 40° C. |
| Initial Time | 5 minutes |
| Temperature Ramp 1 | 10° C./minute |
| Final Temperature 1 | 200° C. |
| Time 1 | 0 minutes |
| Temperature Ramp 2 | 20° C./minute |
| Final Temperature 2 | 350° C. |
| Time 2 | 11.5 minutes |
| Total Run Time | 40 minutes |
| MSD Parameters | |
| Solvent Delay | 2 minutes |
| EMV Mode | Relative |
| Relative Voltage | 0 |
| Resulting EM Voltage | 1765 |
| Low Mass | 35.0 amu |
| High Mass | 550 amu |
| MS Source Temperature | 230° C. |
| MS Quad Temperature | 150° C. |
| FID Parameters | |
| Detector Temperature | 375° C. |
| Hydrogen Flow | 30 mL/minute |
| Air Flow | 400 mL/minute |
| Makeup Flow (Nitrogen) | 25 mL/minute |

Physical Characterization Techniques

TGA was carried out on a TGA Q500 (TA Instruments, DE, USA) equipped with a TGA heat exchanger (P/N 953160.901). Approximately 8.0-15.0 mg of sample was loaded in the open TGA platinum pan. The sample was heated from 25 to 600° C. under dry nitrogen at a constant rate of 10° C./min.

DSC measurements were run on a Q200 model (TA Instruments, New Castle, Del.) under a nitrogen flow of 50 mL/min. TAG samples between 3.5 and 6.5 (±0.1) mg were run in hermetically sealed aluminum DSC pans. Crystallization and melting behavior of PMTAG was investigated using standard DSC. The samples were equilibrated at 90° C. for 10 min to erase thermal memory, and then cooled at a constant rate of 5.0, 1.0 or 0.1° C./min to −90° C. where they were held isothermally for 5 min, and subsequently reheated at a constant rate of 5.0° C./min to 90° C. The "TA Universal Analysis" software was used to analyze the DSC thermograms and extract the peak characteristics. Characteristics of non-resolved peaks were obtained using the first and second derivatives of the differential heat flow.

SFC measurements were performed on a Bruker Minispec mq 20 pNMR spectrometer (Milton, ON, Canada) equipped with a combined high and low temperature probe supplied with N2. The temperature was controlled with Bruker's BVT3000 temperature controller with an accuracy of ±0.1° C. The temperature was calibrated with commercial canola oil using a type K probe (TRP-K, Omega, Stamford, Conn.) immersed in the oil and an external data logger (Oakton, Eutech Instruments, Singapore). Approximately 0.57±0.05 ml of fully melted sample was quickly pipetted into the bottom portion of the NMR tube. The thermal protocol used in the DSC were also used in the NMR. Bruker's minispec V2.58 Rev. 12 and minispec plus V1.1 Rev. 05 software were used to collect SFC data as a function of time and temperature. The SFC values are reported as the ratio of the intensity of the NMR signal of the solid part to the total detected NMR signal in percent (labelled as SFC %).

A Leica DM2500P polarized light microscope (PLM) fitted with a Leica DFC420C digital camera (Leica Microsystems, Wetzlar, Germany) was used for image capture of the microstructure of the PMTAG. The samples were processed in a temperature-controlled stage (Linkam LTS 350) fitted to the PLM. The formation of the fat crystal network from the early crystallites through their growth and aggregation were observed in-situ under the PLM. The micrographs presented (100× and 500×) were captured at −90° C.

A temperature-controlled Rheometer (AR2000ex, TA Instruments, DE, USA) was used to measure the viscosity and flow property of PMTAG using a 40 mm 2° steel geometry. Temperature control was achieved by a Peltier attachment with an accuracy of 0.1° C. Shear Stress was measured at each temperature by varying the shear rate from 1 to 1200 s$^{-1}$. Measurements were taken at 10° C. intervals from high temperature (100° C.) to 10° C. below the DSC onset of crystallization temperature of each sample. Viscosities of samples were measured from each sample's melting point up to 110° C. at constant temperature rate (1.0 and 3.0° C./min) with constant shear rate (200 s$^{-1}$). Data points were collected at intervals of 1° C. The viscosity obtained in this manner was in very good agreement with the measured viscosity using the shear rate/share stress. The shear rate range was optimized for torque (lowest possible is 10 µNm) and velocity (maximum suggested of 40 rad/s).

The shear rate-shear stress curves were fitted with the Herschel-Bulkley equation (Eq 1), a model commonly used to describe the behavior of materials characterized by a yield stress.

$$\tau = \tau_0 + K\dot{\gamma}^n \quad \text{Eq. 1}$$

where $\dot{\gamma}$ denotes the shear stress, $\tau_0$ is the yield stress below which there is no flow, K the consistency index and n the power index. n depends on constitutive properties of the material. For Newtonian fluids n=1, shear thickening fluids, n>1 and for shear thinning fluids, n<1.

Palm Oil MTAG Compositional Analysis

The natural oil composition, and in particular, the palm oil composition, was described previously in commonly assigned U.S. Provisional Patent Application Ser. No. 61/971,475, and the TAG profiles of palm oil were also described previously. The TAGs that can potentially compose PMTAG based on palm oil composition and the possible products of cross-metathesis of palm oil are listed in Table 3a. The potential structures of TAGs in PMTAG are listed in Table 3b.

TABLE 3A

Potential TAG composition in PMTAG. D: 9-decenoic acid; Dd: 9-dodecenioc acid; M, myristic acid; O, oleic acid; P, palmitic acid; L, linoleic acid; S, stearic acid. There are both trans- and cis-double bonds in the TAG

| TAGs in Palm oil | Potential TAG composition of PMTAG |
|---|---|
| OLL, OLO, OOO | ODD, DDD, DDdDd, DDdDd, OLL, OLO, OOO, OLD, OLDd, OOD, ODD, ODDd, ODdDd, LDD, LDDd, LDdDd, DdDdDd, and their isomers |
| PLL | PLL, PDD, PLD, PDDd, PLDd, PDdDd and their isomers |
| POL, POO | POL, POO, PDD, POD, PDDd, PODd, PDdDd and their isomers |
| SOO | SOO, SDD, SOD, SDDd, SODd, SDdDd and their isomers |
| PLP, | PLP, PDP, PDdP |
| POP | POP, PDP, PDdP |
| POS | POS, PDS, PDdS |
| PPM, PPP, PPS | PPM, PPP, PPS |

TABLE 3b

Structures of potential TAGs in PMTAG

| Compound | Structure |
|---|---|
| OLL | |
| OLO | |
| OOO | |

TABLE 3b-continued

Structures of potential TAGs in PMTAG

| Compound | Structure |
|---|---|
| ODD | |
| DDD | |
| DDDd | |
| DDdDd | |
| OLD | |

TABLE 3b-continued

Structures of potential TAGs in PMTAG

| Compound | Structure |
|---|---|
| OLDd | |
| OOD | |
| ODD | |
| ODDd | |
| ODdDd | |

TABLE 3b-continued
Structures of potential TAGs in PMTAG
| Compound | Structure |
| --- | --- |
| LDD | 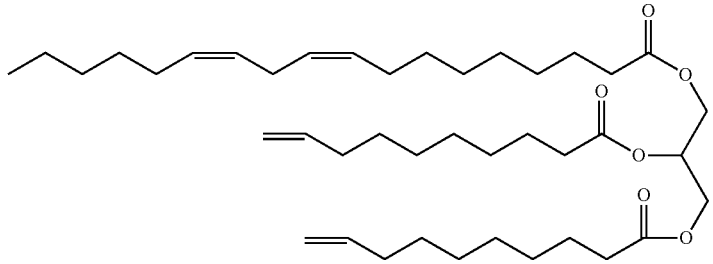 [SMILES: C=CCCCCCCCC(=O)OCC(COC(=O)CCCCCCC/C=C\C/C=C\CCCCC)OC(=O)CCCCCCCC=C] |
| LDDd | 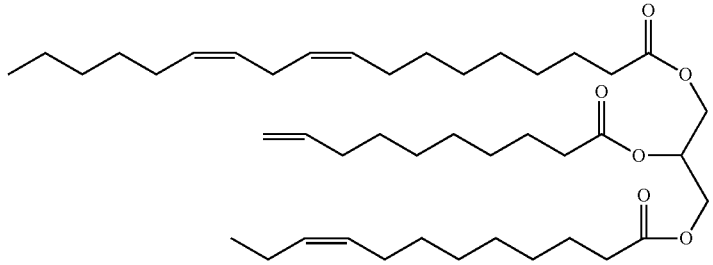 [SMILES: C=CCCCCCCCC(=O)OC(COC(=O)CCCCCCC/C=C\CC)COC(=O)CCCCCCC/C=C\C/C=C\CCCCC] |
| LDdDd | 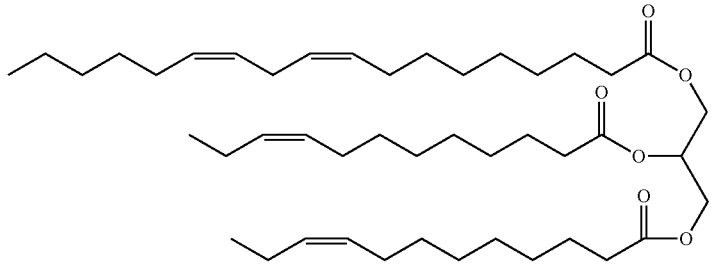 [SMILES: CC/C=C\CCCCCCCC(=O)OCC(COC(=O)CCCCCCC/C=C\C/C=C\CCCCC)OC(=O)CCCCCCC/C=C\CC] |
| DdDdDd | 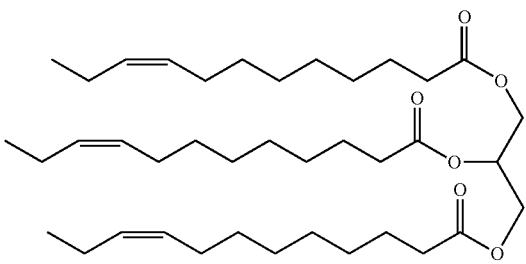 [SMILES: CC/C=C\CCCCCCCC(=O)OCC(COC(=O)CCCCCCC/C=C\CC)OC(=O)CCCCCCC/C=C\CC] |
| PLL | 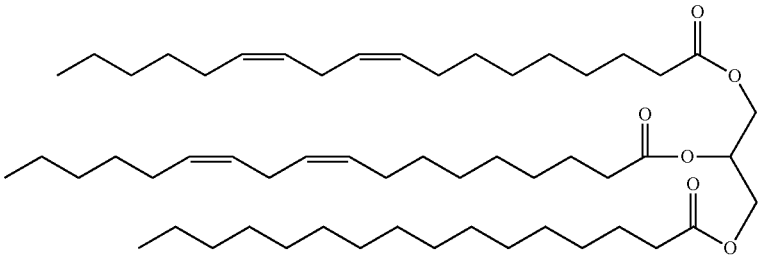 [SMILES: CCCCC/C=C\C/C=C\CCCCCCCC(=O)OCC(COC(=O)CCCCCCCCCCCCCCC)OC(=O)CCCCCCC/C=C\C/C=C\CCCCC] |

TABLE 3b-continued
Structures of potential TAGs in PMTAG
| Compound | Structure |
|---|---|
| PDD | 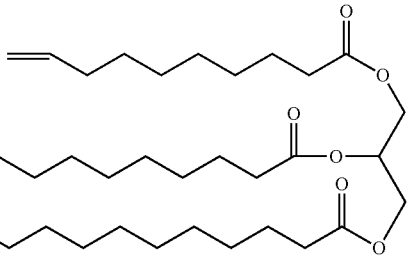 |
| PLD | 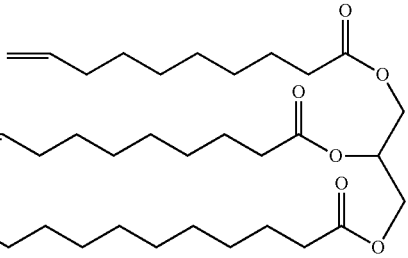 |
| PDDd | 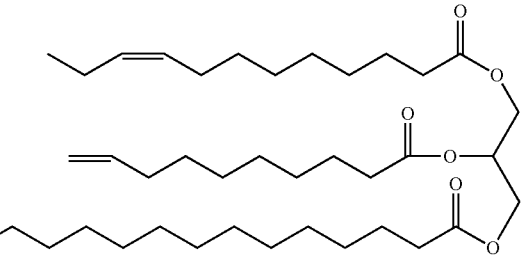 |
| PLDd | 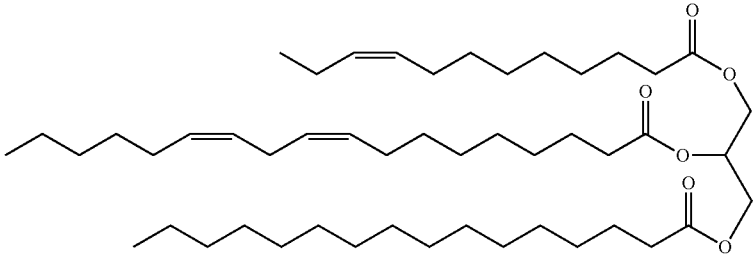 [SMILES: CC/C=C\CCCCCCCC(=O)OCC(COC(=O)CCCCCCCCCCCCCCC)OC(=O)CCCCCCC/C=C\C/C=C\CCCCC] |
| PDdDd | 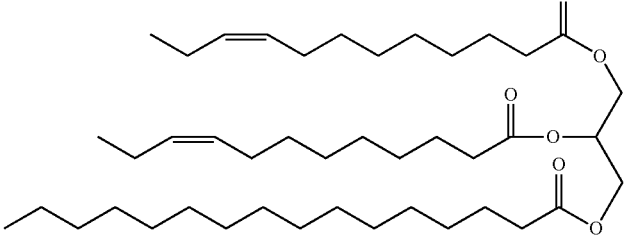 |

TABLE 3b-continued
Structures of potential TAGs in PMTAG
| Compound | Structure |
| --- | --- |
| POL | 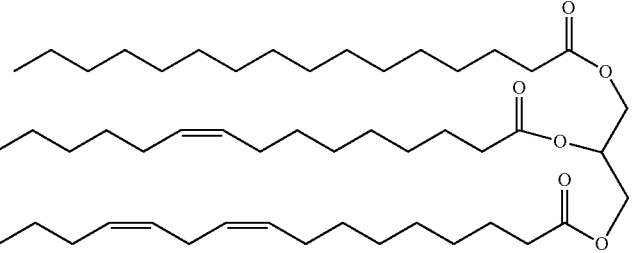 |
| POO | 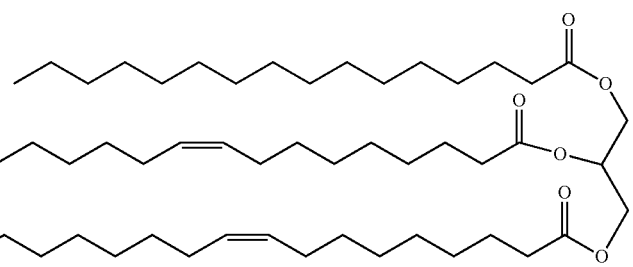 |
| POD | 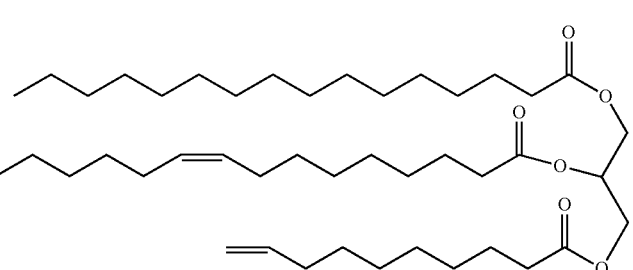 |
| PODd | 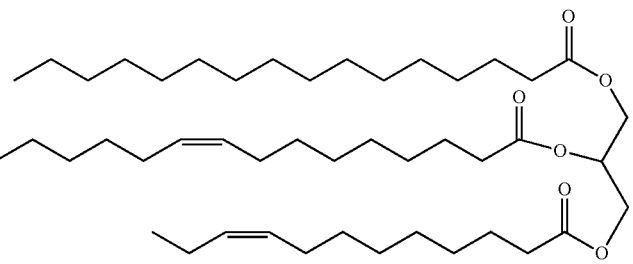 |
| SOO | 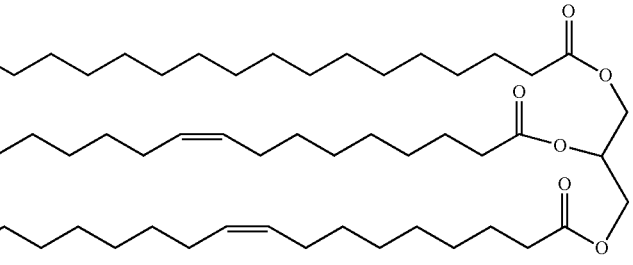 |

TABLE 3b-continued
Structures of potential TAGs in PMTAG
| Compound | Structure |
|---|---|
| SDD | 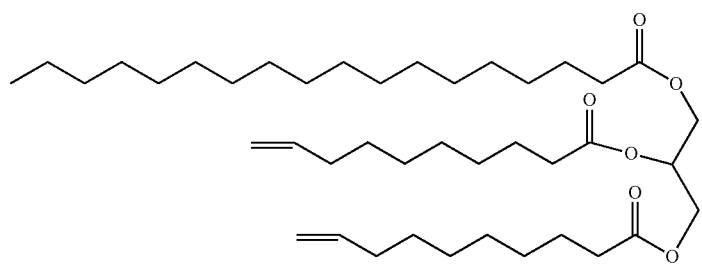 [SMILES: C=CCCCCCCCC(=O)OCC(COC(=O)CCCCCCCCCCCCCCCCC)OC(=O)CCCCCCCC=C] |
| SOD | 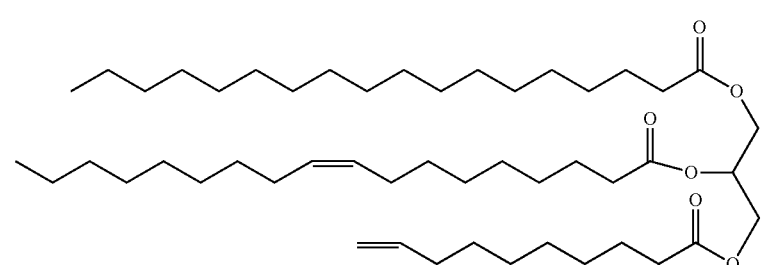 |
| SDDd | 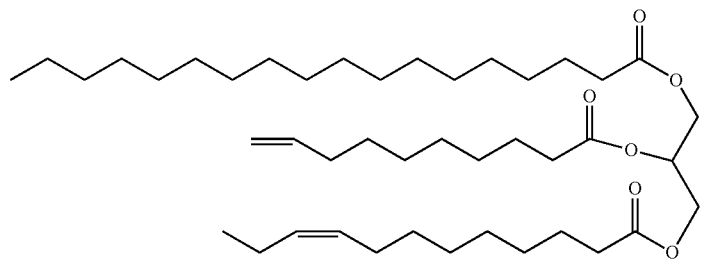 [SMILES: C=CCCCCCCCC(=O)OC(COC(=O)CCCCCCC/C=C\CC)COC(=O)CCCCCCCCCCCCCCCCC] |
| SODd | 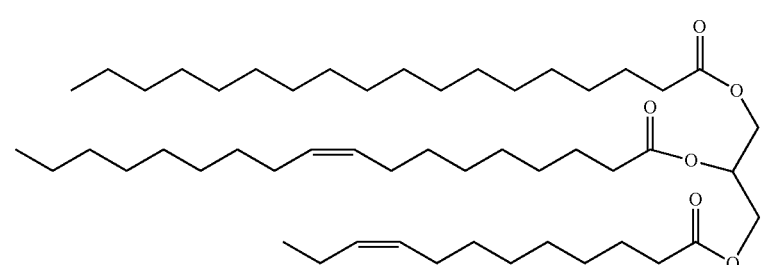 |
| SDdDd | 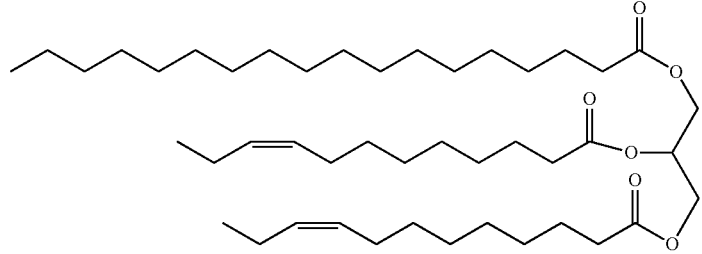 [SMILES: CC/C=C\CCCCCCCC(=O)OCC(COC(=O)CCCCCCCCCCCCCCCCC)OC(=O)CCCCCCC/C=C\CC] |

TABLE 3b-continued
Structures of potential TAGs in PMTAG
| Compound | Structure |
|---|---|
| PLP | 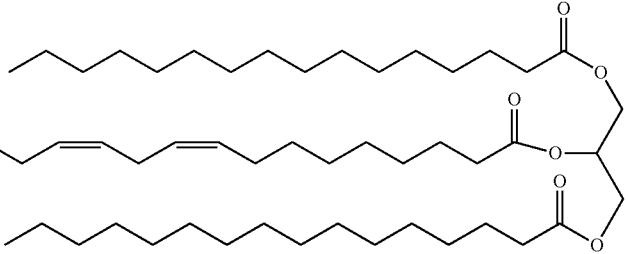 |
| PDP | 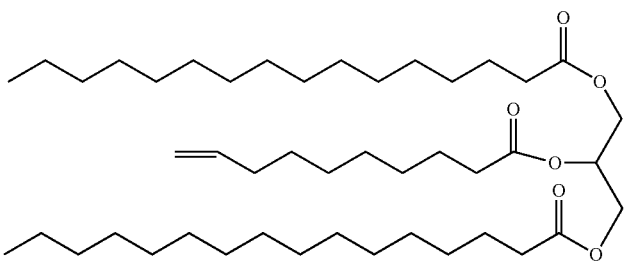 [SMILES: C=CCCCCCCCC(=O)OC(COC(=O)CCCCCCCCCCCCCCC)COC(=O)CCCCCCCCCCCCCCC] |
| PDdP | 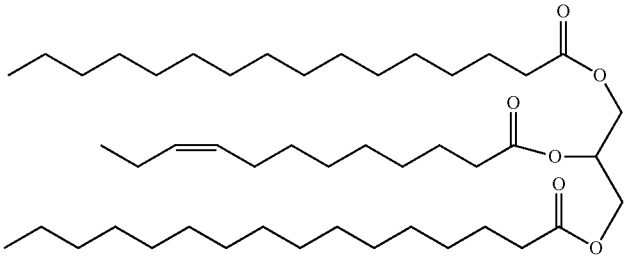 [SMILES: CC/C=C\CCCCCCCC(=O)OC(COC(=O)CCCCCCCCCCCCCCC)COC(=O)CCCCCCCCCCCCCCC] |
| POP | 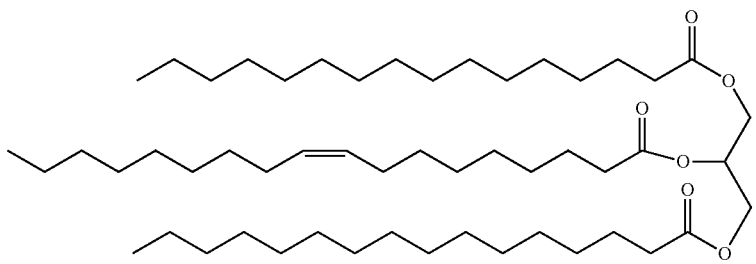 [SMILES: CCCCCCCC/C=C\CCCCCCCC(=O)OC(COC(=O)CCCCCCCCCCCCCCC)COC(=O)CCCCCCCCCCCCCCC] |
| POS | 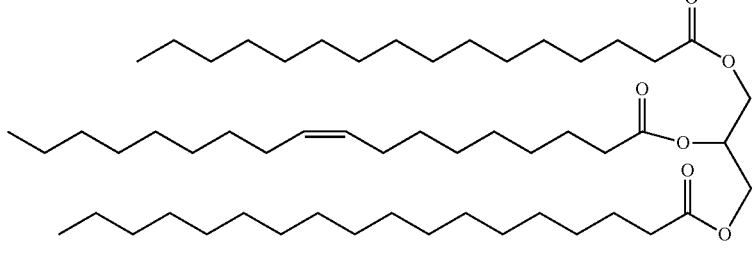 |

TABLE 3b-continued

Structures of potential TAGs in PMTAG

| Compound | Structure |
|---|---|
| PDS | |
| PDdS | |
| PPM | |
| PPP | |
| PPS | |

Fatty Acid and TAG Profile of PMTAG

The fatty acid profile of the PMTAG was obtained by GC. Fatty acid profile was also determined using $^1$H-NMR data. TAG profile of PMTAG was investigated using HPLC. Three pure TAGs, namely 3-(stearoyloxy) propane-1,2-diyl bis(dec-9-enoate), or DSS, 3-(dec-9-enoyloxy) propane-1,2-diyl distearate or DDS, and 1,2,3-triyl tris(dec-9-enoate) or DDD were synthesized and used as standards to help in the determination of the TAG profile of the PMTAG.

GC of PMTAG Results

TABLE 4

GC results of methylated PMTAG. UFA: unsaturated fatty acids; SFA: saturated fatty acids

| UFA | C10:1 | C12:1 | C12:1 | C12:1 | C13:2 | C15:1 | C15:2 | C15:2 | C18:1 | C18:1 | C18:2 |
|---|---|---|---|---|---|---|---|---|---|---|---|
| Wt. % | 17.52 | 0.28 | 9.13 | 2.04 | 0.91 | 0.58 | 0.22 | 0.29 | 2.97 | 2.80 | 0.17 |

| SFA | C12:0 | C14:0 | C16:0 | C18:0 | C20:0 | C21:0 | Others |
|---|---|---|---|---|---|---|---|
| Wt. % | 0.31 | 1.24 | 50.35 | 9.28 | 0.35 | 0.12 | 1.28 |

There are 36.9 wt % unsaturated fatty acids, which includes the double bond of C10:1 in a terminal position (n=0 in Scheme 4). The double bond with n≠0 contains trans- or/and cis-configurations. The GC detected less than 2 wt. % of polyunsaturated fatty acids and more than 60 wt. % saturated fatty acids. Note that the ratio of the trans-/cis-configuration depends on the reaction conditions, such as reaction temperature and catalyst.

HPLC of PMTAG Results

Figure 1:
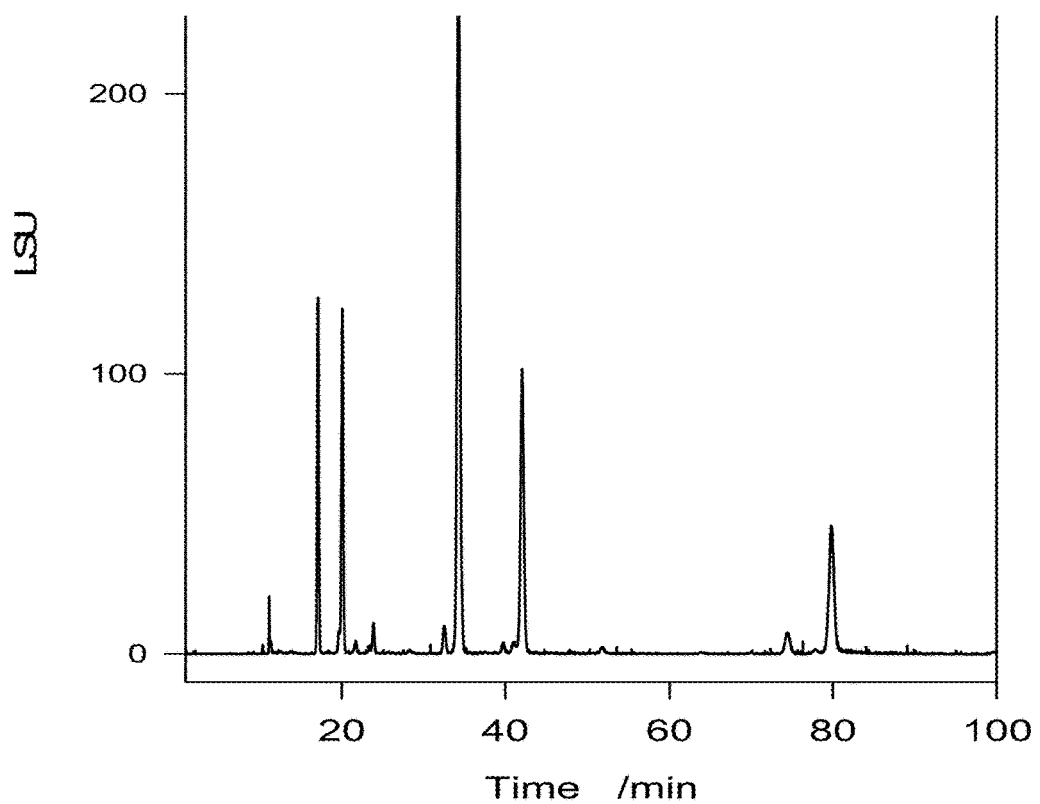
FIG. 1 depicts a HPLC of PMTAG.

The HPLC curve recorded using the slow method described in the analytical methods section is shown in FIG. 1. As shown, an excellent separation was obtained. The analysis of the HPLC of PMTAG was carried out with the help of pure synthesized TAGs (DDD, DSS and DDS) used as standards. The retention time of these standards were well matched with the related PMTAG fractions. The results of the analysis are reported in Table 5.

TABLE 5

HPLC analysis data of PMTAG

| Peak | Retention time (min) | Content (%) | Structure |
|---|---|---|---|
| 1 | 10.2 | 0.25 | DDD |
| 2 | 11.0 | 0.75 | — |
| 3 | 17.0 | 10.4 | — |
| 4 | 19.9 | 11.3 | DDS |
| 5 | 34.3 | 42.4 | — |
| 6 | 41.9 | 16.4 | — |
| 7 | 51.8 | <0.1 | DSS |
| 8 | 79.6 | 5.6% | — |

Figure 2A:
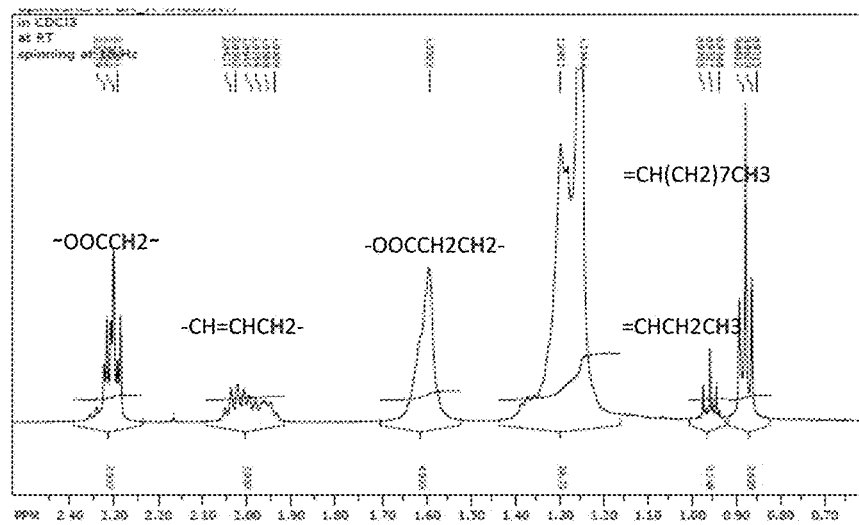
FIG. 2a depicts a $^1$H-NMR of PMTAG, with chemical shift range between δ 2.5 and 0.7 ppm.
Figure 2B:
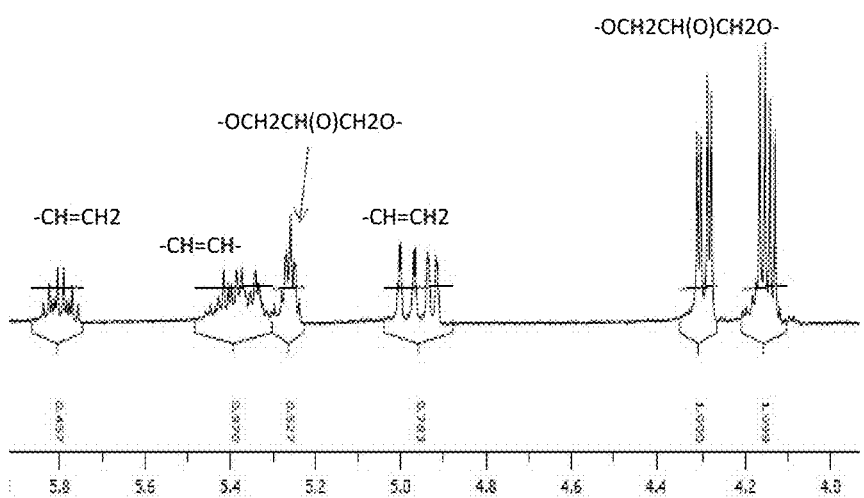
FIG. 2b depicts a $^1$H-NMR of PMTAG, with chemical shift range between δ 6.0 and 4.0 ppm.

$^1$H-NMR of PMTAG Results $^1$H-NMR spectra of PMTAG is shown in FIGS. 2a and 2b. The protons of the glycerol skeleton, —CH$_2$CH(O)CH$_2$— and —OCH$_2$CHCH$_2$O— are clearly present at δ 5.3-5.2 ppm and 4.4-4.1 ppm, respectively. Two kinds of double bonds were detected: (1) terminal double bond (n=0), —CH═CH$_2$ and —CH═CH$_2$ present at δ 5.8 ppm and 5.0 to 4.9 ppm, respectively, and the internal double bond (n≠0), —CH═CH— at δ 5.5 ppm to δ 5.3 ppm. The ester group —C(═O)CH$_2$— was present at δ 2.33-2.28 ppm, α-H to —CH═CH— at δ 2.03-1.98 ppm, and —C(═O)CH$_2$CH$_2$— at δ 1.60 ppm. Two kind of —CH$_3$ were detected, one with n=2 at 1.0-0.9 ppm and another with n=8 at 0.9-0.8 ppm. It should be noticed that polyunsaturated fatty acids were not detected by NMR as the chemical shift at 2.6 to 2.8 ppm, the signature $^1$H-NMR of the proton between two double bonds in a polyunsaturated fatty acid was not presented.

Due to the very low content of free fatty acid in the PMTAG material as indicated by the acid value (<1), the analysis was performed assuming that only TAG structures were present in the PMTAG. The fatty acid profile of PMTAG was calculated based on the relative area under the characteristic chemical shift peaks. The results are listed in Table 6.

TABLE 6

Fatty acid profile of PMTAG calculated based on the relative area under the characteristic NMR chemical shift peaks.

| Fatty Acids with: | Content (mol %) |
|---|---|
| —CH═CH2 | 24.9 |
| —CH═CHCH2CH3 | 15.8 |
| other non-terminal double bonds | 10.6-14.5 |
| Saturated fatty acid | 44.8-48.7 |

The possible structures of the PMTAG are presented in Scheme 4. These contain fatty acids with terminal double bonds, internal double bonds with n=2 or 8, as well as saturated fatty acids with m=11 to 20. PMTAG also contains saturated TAGs including PPP, PPM and PPS that exist in the starting natural oil (palm oil).

Scheme 4. Possible structures composing PMTAG.

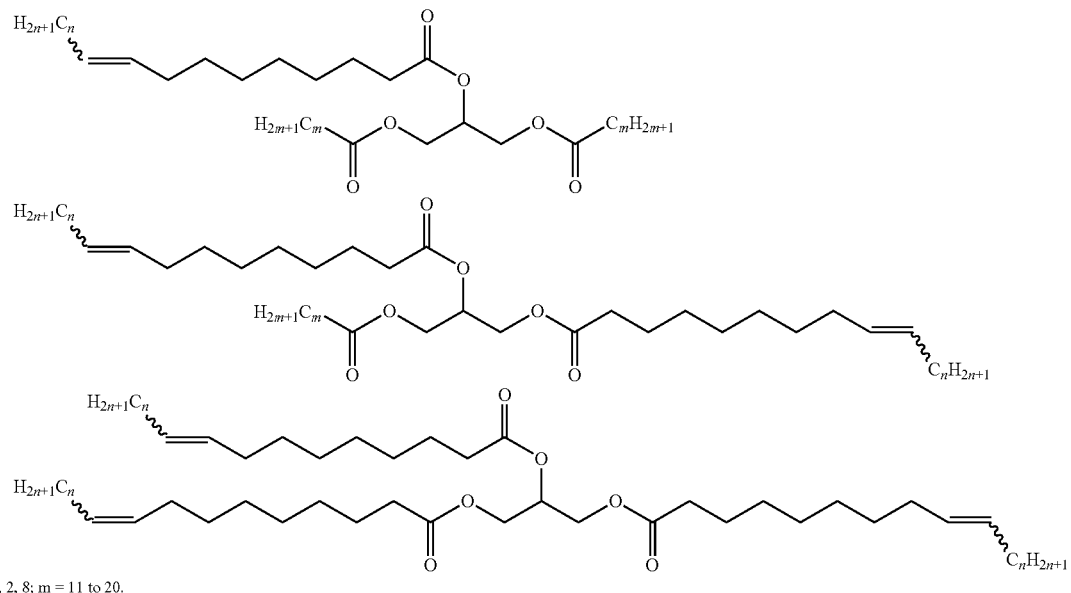

n = 0, 2, 8; m = 11 to 20.

Physical Properties of PMTAG
Thermal degradation of PMTAG

Figure 3:
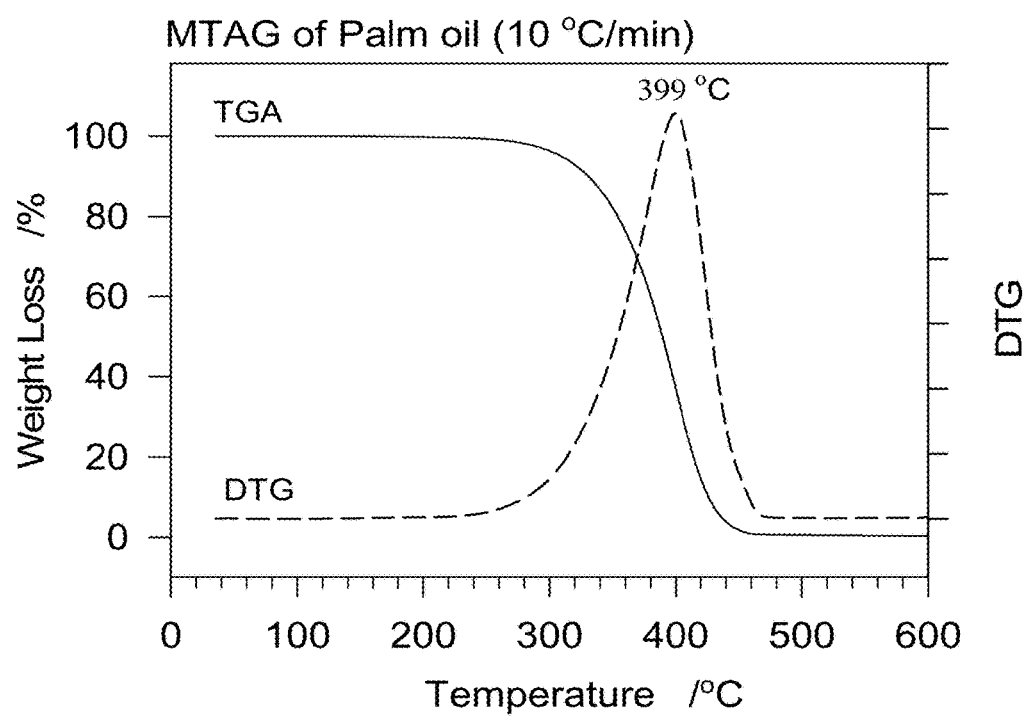
FIG. 3 depicts a TGA and DTG of PMTAG.

The TGA and DTG profiles of the PMTAG are shown in the FIG. 3. TGA and DTG reveal one-step decomposition mechanisms for the PMTAG, associated with the breakage of the ester bonds. The onset of degradation of PMTAG as measured by the temperature at 1%, 5% and 10% decomposition was 260.3, 309.0 and 330.5° C., respectively. The extrapolated onset temperature is 333° C. As can be seen from the TGA curve and more precisely from the DTG curve, the decomposition ends at 470° C. The DTG peak occurs at 399.3° C. Nearly 60 wt % of the PMTAG decomposed at this temperature. The data indicates a thermal stability relatively higher than common commercial vegetable oils, such as olive, canola, sunflower and soybean oils, for which first DTG peaks as low as 325° C. have been detected.

Crystallization and Melting Behavior of PMTAG

The DSC thermograms obtained on cooling PMTAG at 5.0, 1.0 and 0.1° C./min and the thermograms obtained by subsequent heating at 5° C./min are presented in FIGS. 4a and 4b, respectively. The exothermic peaks presented in the cooling cycles became sharper and more defined as cooling rate was decreased. Three exotherms can be observed for the lowest cooling rate. The crystallization peak showing above room temperature (exotherm at ~32° C.) is associated with a high temperature fraction of the PMTAG, labelled PMTAG stearin, and the two crystallization peaks appearing below room temperature (exotherm at ~12° C.) and at sub-zero temperatures (exotherm at ~−11° C.) are associated with two lower temperature fractions of the PMTAG, labelled collectively PMTAG olein, similar to their palm oil counterparts. The first two fractions were dominantly present as indicated by their relative enthalpy of crystallization of 28.5 J/g and 60.1 J/g (15% and 32% of the total enthalpy, respectively).

At least six endotherm and two resolved exotherms were observed in the DSC heating thermograms of PMTAG outlining that the material is polymorphic. Although not apparent in the DSC heating thermogram obtained at 0.1° C./min, the last endotherm (at ~41° C., FIG. 4b) is indicative of a phase that was recrystallized during the heating process and subsequently melted. The recorded enthalpy of heating, calculated from the area of the endotherms (109.7 J/g), was much lower than the total enthalpy of crystallization (186.1 J/g), indicating a competition of exothermic and endothermic events during heating that is the result of recrystallization mediated by melt.

The endotherms observed below 30° C. are associated with the melting of PMTAG olein and the endotherms observed above are associated with the melting of PMTAG stearin. As shown in FIG. 4b, the melting of the PMTAG olein and PMTAG stearin were not fully resolved, indicating that a dry fractionation is only possible by using very slow cooling.

Solid Fat Content of PMTAG

Solid Fat Content (SFC) versus temperature profiles of PMTAG during cooling (5° C./min) and heating (5° C./min) are shown in FIGS. 5a and 5b, respectively. As can be seen in FIG. 5a, the SFC cooling curve presented three segments indicative of a three-step solidification process. The first SFC segment can be associated with PMTAG stearin and the two others to PMTAG olein, similar to the exothermic events observed in the DSC.

Microstructure of PMTAG Evolution

The microstructural analysis was performed in order to determine the microstructure size, shape, development kinetics and final network formation. The development of the microstructure was followed while the sample was cooling at 5° C./min.

FIGS. 6a-6f highlight the development of the microstructure of the PMTAG during cooling at 5° C./min. Crystallization initiated at ~26.1±0.5° C. with very small crystals of average size 20±5 μm. The same type of crystals developed from 26° C. to 14° C. Crystal development was relatively fast. From 14 to 5° C. no development was observed. Secondary nucleation initiated at ~5.0±0.5° C. and several small fibril-like crystals developed at this temperature and continued to develop below 0° C. The different modes of crystallization indicated by both DSC and SFC are reflected in the microstructure development as different types of microstructure evolved following secondary nucleation.

The microstructure analysis also supports that the 5° C./min rate does not allow a microstructure suitable for fractionation to be developed. Higher cooling rates may lead to the formation of very small microstructures, a situation that is maintained by PMTAG, as evidenced by FIGS. 6e-6f.

Flow Behavior and Viscosity of PMTAG

FIGS. 7A and 7B show the flow behavior of MTAG of Palm Oil. Shear rate-shear stress curves of MTAG of Palm Oil obtained at different temperatures are displayed in FIGS. 7a and 7b. FIG. 8 shows the viscosity versus temperature curves obtained during cooling of PMTAG at 3° C./min and 1° C./min. The application of the Herschel-Bulkley equation (Eq. 1) to share rate-shear stress data obtained for the PMTAG at temperatures between 40° C. and 90° C. (R2>0.9999) generated power index values (n) all approximately equal to unity, indicating Newtonian behavior. Fits to the Herschel-Bulkley (eq. 1) model are included in FIG. 7a. The data collected at 30° C. and below (FIG. 7b), indicated that the sample started crystallizing at this temperature, in good correspondence with DSC. The flow behavior observed for PMTAG is very similar to that of vegetable oils.

The viscosity versus temperature of PMTAG obtained using the ramp procedure in the range of temperatures where it was in the liquid state presented the exponential behavior of liquid hydrocarbons.

PMTAG Green Polyols

Synthesis of Green Polyols from PMTAG

The synthesis of the Green (solvent free) Polyol from the MTAG of palm oil (which may be referred to herein as "PMTAG Green Polyol") involves epoxidation and subsequent hydroxylation of a MTAG of palm oil. Four different batches of PMTAG Green Polyol were prepared (B1 to B4-Polyol) by adjusting reaction parameters during epoxidation, and a fifth PMTAG Green Polyol is also reported in Table 7.

Any peroxyacid may be used in the epoxidation reaction, and this reaction will convert a portion of or all of the double bonds present in the PMTAG to epoxide groups. Peroxyacids (peracids) are acyl hydroperoxides and are most commonly produced by the acid-catalyzed esterification of hydrogen peroxide. Any suitable peroxyacid may be used in the epoxidation reaction. Examples of hydroperoxides that may be used include, but are not limited to: hydrogen peroxide, tert-butylhydroperoxide, triphenylsilylhydroperoxide, cumylhydroperoxide, trifluoroperoxyacetic acid, benzyloxyperoxyformic acid, 3,5-dinitroperoxybenzoic acid, and m-chloroperoxybenzoic acid. The peroxyacids may be formed in-situ by reacting a hydroperoxide with the corresponding acid, such as formic or acetic acid. Other organic peracids may also be used, such as benzoyl peroxide, and potassium persulfate.

Subsequent to the epoxidation reaction, the reaction product may be neutralized. A neutralizing agent may be added to neutralize any remaining acidic components in the reaction product. Suitable neutralizing agents include weak bases, metal bicarbonates, or ion-exchange resins. Non-limiting examples of neutralizing agents that may be used include ammonia, calcium carbonate, sodium bicarbonate, magnesium carbonate, amines, and resin, as well as aqueous solutions of neutralizing agents. Subsequent to the neutralization, commonly used drying agents may be utilized. Such drying agents include inorganic salts (e.g. calcium chloride, calcium sulfate, magnesium sulfate, sodium sulfate, and potassium carbonate).

After the preparation of the epoxidized PMTAG, the next step is to ring-open at least a portion of the epoxide groups via a hydroxylation step. In the present effort, all of the epoxide groups were opened. The hydroxylation step includes reacting the oxirane ring of the epoxide in the presence of an acid catalyst in order to hydrolyze the oxirane ring to a dihydroxy intermediate. The acid catalyst may be an acid such as sulfuric, pyrosulfuric, perchloric, nitric, halosulfonic acids such as fluorosulfonic, chlorosulfonic or trifluoromethane sulfonic, methane sulfonic acid, ethane sulfonic acid, ethane disulfonic acid, benzene sulfonic acid, or the benzene disulfonic, toluene sulfonic, naphthalene sulfonic or naphthalene disulfonic acids, and perchloric acid. As needed, subsequent washing steps may be utilized, and suitable drying agents (e.g., inorganic salts) may be used.

General Materials for Green Polyol Synthesis from PMTAG

Formic acid (88 wt %) and hydrogen peroxide solution (30 wt %) were purchased from Sigma-Aldrich, and perchloride acid (70%) from Fisher Scientific.

Solvent Free Procedure of synthesis of Green Polyol from PMTAG

PMTAG Green Polyol was prepared from PMTAG in a two-step reaction: epoxidation by formic acid (or acetic acid) and $H_2O_2$, followed by a hydroxylation using $HClO_4$ as a catalyst, as described in Scheme 5. Five batches of PMTAG Green Polyol were prepared using different reaction conditions. The epoxidation conditions were adjusted in order to optimize the reaction and manage the amount of formic acid that can be attached to the polyol. The reaction conditions and data for making the different batches of green polyols are listed in Table 7.

Depending on the temperature and time of the reaction, resulting PMTAG Green Polyol contained varying amounts of formic acid units attached to fatty acid chain at the position of some epoxide rings, and varying amounts of unreacted terminal double bonds. The amount of formic acid and of unreacted terminal double bonds were controlled by the reaction temperature and reaction time. Epoxidation reactions were performed at temperatures between room temperature (25° C.) and 100° C. during periods of time between 3 and 16 hours, followed by hydroxylation reactions at 80 to 85° C. for 8 to 16 hours, yielded 0 to 0.63 formic acid unit/polyol molecular, and 0 to 50% unreacted terminal double bonds left.

Scheme 5.
Synthesis of PMTAG Green Polyol (without solvent).

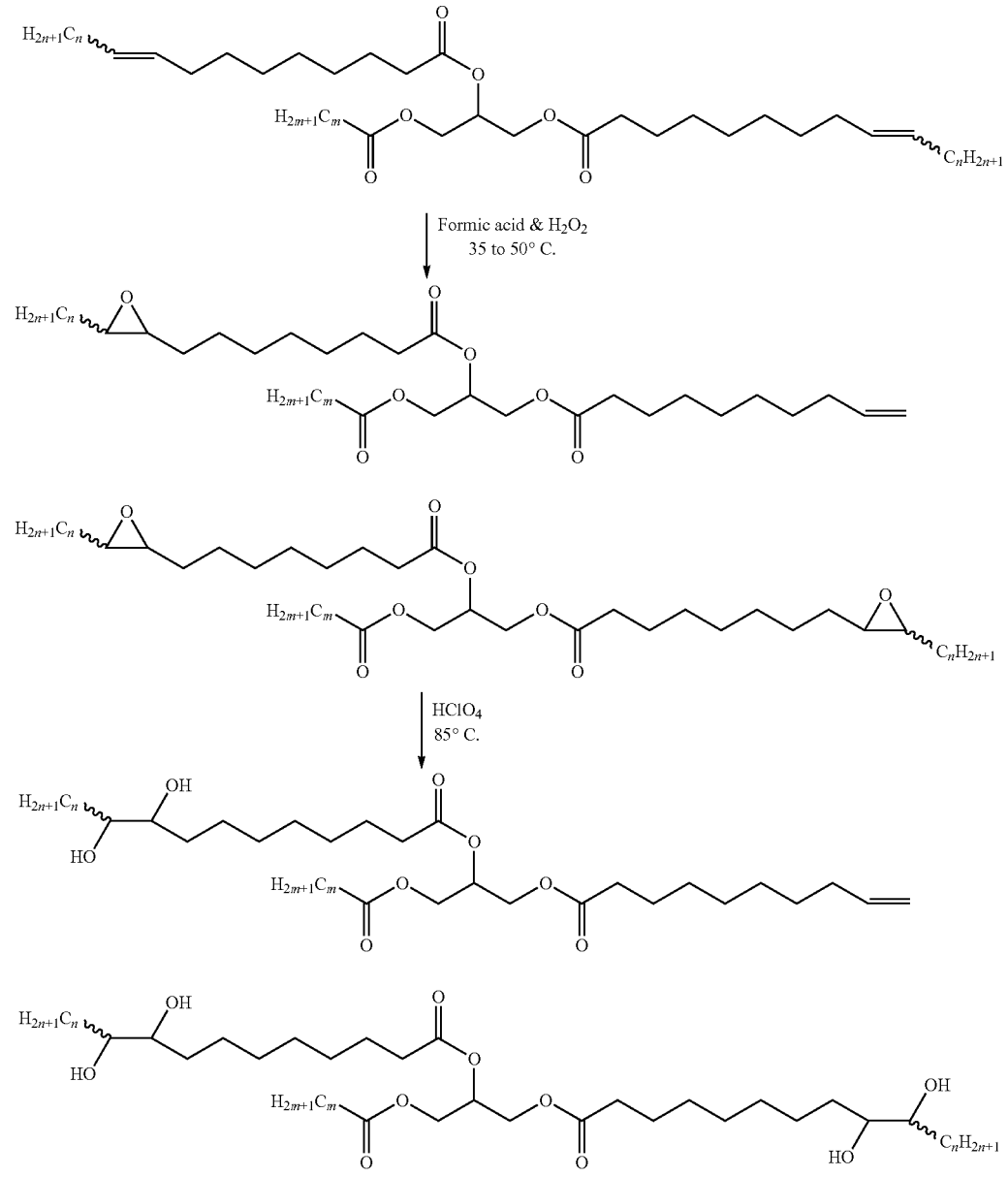

n = 0, 2, 8; m = 11 to 20

Epoxidation Procedure 2 kg PMTAG was added into 2 kg formic acid (88%) in a reactor at 30 to 60° C. (optimal: 30 to 35° C.), and then 2.8 L hydrogen peroxide (30%) was added to the reactor slowly (addition rate: ~1 L/h) with good stirring to control the reaction temperature between room temperature to 100° C. (optimal to limit the amount of attached formic acid amount: under 50° C.). The reaction continued for 3 to 16 hours, and then the reaction mixture was washed with 2 L water, 1 L 5% NaHCO$_3$ and 2×2 L water sequentially. The mixture was used for the next step (hydroxylation) directly. The different reaction conditions and their results are listed in Table 7A.

Hydroxylation 2 kg PMTAG epoxide obtained from the epoxidation (see epoxidation reactions described above) was added into 10 L water, and then 140 g HClO$_4$ (70%) was added to the reactor. The reaction mixture was heated to 85° C. for 16 h. The reaction was stay still. Two layers (organic layer and water layer) was separated. The water layer was deposal. The organic layer was washed with 2 L water, 1 L 5% NaHCO$_3$ and 2×2 L water sequentially, and then dried on rotary evaporator. The different reaction conditions are listed in Table 7.

TABLE 7

The reaction conditions and the data for obtained PMTAG Green Polyols

| Batch# | Epoxidation | Hydroxylation | OH value mg KOH/g | Acid value mg KOH/g | Comments |
|---|---|---|---|---|---|
| 1[a] | IT: 50° C.; HT: 65° C.; FT: 48° C.; AT: ~3 h, RT: 45° C. for 16 h and then 48° C. for 12 h | 85° C., RT: 16 h | 113 | 5 | Formic acid attached |
| 2[a] | IT: 40° C.; HT: 49° C.; FT: 48° C.; AT: RT: 16 h | 85° C., RT: 16 h | 117 | 1.3 | Very little formic acid attached |
| 3[b] | IT: 25° C.; HT: 95° C.; FT: 45° C.; AT: ~3 h; RT: 16 h | 85° C., RT: 16 h | 83 | 1.3 | Formic acid attached was not detected |
| 4[c] | IT: 25° C.; HT: 95° C.; FT: 25° C.; AT: ~3 h; RT: 16 h | 85° C., RT: 16 h | 119 | 1.3 | Formic acid attached was not detected |
| 5[d] | IT: 60° C., HT: >100° C. RT: <3 h | — | 140 | 4 | 0.63 Formic acid/polyol |

IT: initial temperature; HT: highest temperature; FT: final temperature; AT: $H_2O_2$ addition time; RT: reaction time
[a]Using circulator with cooling system to cool and heat the reactor
[b]Using circulator without cooling system to cool and heat the reactor. The reaction at 95° C. was less than 10 min
[c]Using city water to cool and heat the reactor.
[d]The polyol is prepared in one-pot reaction. The polyol was obtained in epoxidation step. No hydroxylation step was carried out.
Note:
1) In epoxidation reaction: Formic acid/$H_2O_2$/PMTAG = 1/1.4/1. (Formic acid: 88%; $H_2O_2$: 30%)
2) In hydroxylation reaction: PMTAG/$H_2O$/perchloric acid = 1/5/0.05
3) ~20-30% terminal double bond was left based on NMR.

Analytical Methods for PMTAG Green Polyols

The PMTAG Green Polyols were analyzed using different techniques. These techniques can be broken down into: (i) chemistry characterization techniques, including OH value, acid value, nuclear magnetic resonance (NMR), and high pressure liquid chromatography (HPLC); and (ii) physical characterization methods, including thermogravimetric analysis (TGA), differential scanning calorimetry (DSC), and rheology.

Chemistry Characterization Techniques for PMTAG Green Polyols

OH and acid values of the PMTAG Green Polyol were determined according to ASTM S957-86 and ASTM D4662-03, respectively. Iodine value was determined according to ASTM D5768-02.

$^1$H-NMR spectra were recorded in $CDCl_3$ on a Varian Unity-INOVA at 499.695 MHz. $^1$H chemical shifts are internally referenced to $CDCl_3$ (7.26 ppm). All spectra were obtained using an 8.6 μs pulse with 4 transients collected in 16 202 points. Datasets were zero-filled to 64 000 points, and a line broadening of 0.4 Hz was applied prior to Fourier transforming the sets. The spectra were processed using ACD Labs NMR Processor, version 12.01.

HPLC analysis was performed on a Waters Alliance (Milford, Mass.) e2695 HPLC system fitted with a Waters ELSD 2424 evaporative light scattering detector. The HPLC system was equipped with an inline degasser, a pump, and an autosampler. The ELSD nitrogen flow was set at 25 psi with nebulization and drifting tube maintained at 12° C. and 55° C., respectively. Gain was set at 500. All solvents were HPLC grade and obtained from VWR International, Mississauga, ON. The analysis was performed on a Betasil Diol column (250 mm×4.0 mm, 5.0 μm). The temperature of the column was maintained at 50° C. The mobile phase was started with heptane: ethyl acetate (90:10)v run for 1 min at a flow rate of 1 mL/min and in a Gradient mode, then was changed to heptane: ethyl acetate (67:33) in 55 min and then the ratio of ethyl acetate was increased to 100% in 20 min and held for 10 min. 5 mg/ml (w/v) solution of crude sample in chloroform was filtered through single step filter vial, and 4 μL of sample was passed through the diol column by normal phase in gradient mode. Waters Empower Version 2 software was used for data collection and data analysis. Purity of eluted samples was determined using the relative peak area.

Physical Characterization Techniques for PMTAG Green Polyols

TGA was carried out on a TGA Q500 (TA Instruments, DE, USA) equipped with a TGA heat exchanger (P/N 953160.901). Approximately 8.0-15.0 mg of sample was loaded into the open TGA platinum pan. The sample was heated from 25 to 600° C. under dry nitrogen at a constant rate of 10° C./min. The "TA Universal Analysis" software was used to analyze the TGA curves.

DSC measurements of the PMTAG Green Polyol were run on a Q200 model (TA Instruments, New Castle, Del.) under a nitrogen flow of 50 mL/min. Samples between 3.5 and 6.5 (±0.1) mg were run in standard mode in hermetically sealed aluminum DSC pans. The sample was equilibrated at 90° C. for 10 min to erase thermal memory, and then cooled at 5.0° C./min to −90° C. where it was held isothermally for 5 min, and subsequently reheated at a constant rate of 5.0° C./min to 90° C. The "TA Universal Analysis" software was used to analyze the DSC thermograms and extract the peak characteristics. Characteristics of non-resolved peaks were obtained using the first and second derivatives of the differential heat flow.

A temperature-controlled Rheometer (AR2000ex, TA Instruments, DE, USA) was used to measure the viscosity and flow property of the PMTAG Green Polyol using a 40 mm 2° steel geometry. Temperature control was achieved by a Peltier attachment with an accuracy of 0.1° C. Shear Stress was measured at each temperature by varying the shear rate from 1 to 1200 $s^{-1}$. Measurements were taken at 10° C. intervals from high temperature (~100° C.) to 10° C. below the DSC onset of crystallization temperature of each sample.

Viscosities of samples were measured using a constant shear rate (200 s$^{-1}$) during cooling of the sample at constant rate (1.0 and 3.0° C./min) from the melting point down to the crystallization point. Data points were collected at intervals of 1° C. The viscosity obtained in this manner was in very good agreement with the viscosity determined from the shear rate/share stress curve.

Results of Synthesis of Green Polyols from PMTAG

The epoxy of PMTAG from batch 1, 2, 3 and 4 were analyzed with $^1$H-NMR and their resulting polyols were analyzed with $^1$H-NMR and HPLC. The iodine, hydroxyl and acid values of the different PMTAG Green Polyols were also measured prior to polymerization.

$^1$H-NMR Results of Epoxidized PMTAG

The $^1$H-NMR of epoxy of PMTAG from batch 1, 2, 3 and 4 (Epoxy B1-, B2-, B3- and B4-PMTAG, respectively) are shown in FIGS. 9a, b, c and d, respectively.

The chemical shift at 2.85 ppm, related to non-terminal epoxy ring, and the chemical shift at 2.7 to 2.4 ppm, related to terminal epoxy ring, appeared in the epoxidized PMTAG of all the batches, indicating that the epoxidation reaction was successful. However, although the chemical shift at 5.4 ppm, characteristic of double bonds, disappeared, those at 5.8, and 5.0 ppm were still showing indicating that the terminal double bonds were not all completely converted into epoxides. The amount of remaining terminal double bonds as estimated by $^1$H-NMR for each batch is listed in Table 8. Note that remaining terminal double bonds (%) was calculated as the ratio of remaining terminal double-bonds in PMTAG epoxide to the terminal double bonds in PMTAG.

The chemical shift at δ 8 ppm that is related to formic acid, for and indicating that formic acid unit was attached on the backbone of epoxide were presented in epoxidized B1- and B2-PMTAG but not in epoxidized B3- and B4-PMTAG. The number of formic acid units per TAG epoxide as estimated by $^1$H-NMR for each batch is listed in Table 8.

TABLE 8

Amount of remaining terminal double bonds[1] and number of formic acid units per TAG epoxide as estimated by $^1$H-NMR for each batch of epoxidized PMTAG.

| Batch | remaining terminal double bonds (%) | formic acid units per TAG |
|---|---|---|
| B1 | 18 | 0.12 |
| B2 | 30 | 0.16 |
| B3 | 30 | No formic acid attached |
| B4 | 26 | No formic acid attached |

[1]Remaining terminal double bonds (%) was calculated as the ratio of remaining terminal double-bonds in PMTAG epoxide to the terminal double bonds in PMTAG.

Iodine, Hydroxyl and Acid Values of Green Polyols from PMTAG

Iodine value, acid value and OH number of the polyols obtained from the different batches are listed in Table 9. The produced PMTAG Green polyols presented relatively lower OH number than the PMTAG polyols prepared with standard methods that use solvents.

TABLE 9

Acid value and OH number of PMTAG Green Polyols.

| Batch | Iodine Value | OH value (g/100 g) | Acid value (mg KOH/g) |
|---|---|---|---|
| B1 | 5 | 113 | 5 |
| B2 | 7 | 117 | 1.3 |
| B3 | 9 | 83 | 1.3 |
| B4 | 8 | 119 | 1.3 |

$^1$H-NMR Results of PMTAG Green Polyols

The $^1$H-NMR of green polyols from the different batches (B1-4) are shown in FIGS. 10a-d, respectively. The related $^1$H-NMR chemical shifts, δ, in CDCl$_3$ are listed in Table 10.

The spectra of all the green polyols presented the chemical shifts at 3.8-3.4 ppm related to protons neighbored by —OH, and did not present the chemical shifts at 2.8-2.4 ppm that are related to epoxy rings, indicating that the hydroxylation reaction was complete. However, similar to the epoxidized PMTAG, the chemical shift at 5.8 ppm characteristic of terminal double bond —CH═CH$_2$, and 5.0-4.9 ppm, characteristic of terminal double —CH═CH$_2$, were still showing, indicating that the epoxidation of the terminal double bonds was not complete. The amount of remaining terminal double bonds as estimated by $^1$H-NMR for each batch is listed in Table 11. Note that remaining terminal double bonds (%) was calculated as the ratio of remaining terminal double-bonds in Green Polyol to the terminal double bonds in PMTAG.

The chemical shift at δ 8 ppm that is related to formic acid proton, and indicating that formic acid unit was attached on the backbone of epoxide were presented in B1-, and B2-PMTAG Green Polyols but not in B3- and B4-PMTAG epoxidized Green Polyols, similarly to their starting epoxides. The number of formic acid units per TAG polyol as estimated by $^1$H-NMR for each batch is listed in Table 11.

The protons of a glycerol skeleton, —CH$_2$CH(O)CH$_2$— and —OCH$_2$CH(O)CH$_2$O— were presented at δ 5.3-5.2 ppm and 4.4-4.1 ppm, respectively; —C(═O)CH$_2$— at δ 2.33-2.28 ppm; and —C(═O)CH$_2$CH$_2$— at δ 1.60 ppm in the $^1$H-NMR spectra of all the polyols. The peak area of chemical shifts at 4.4-4.2 ppm and at 4.2 to 4.0 ppm are equal, suggesting that hydrolysis of the TAGs was avoided.

TABLE 10

$^1$H-NMR chemical shifts, δ, of B1-, B2-, B3- and B4-PMTAG Green Polyols

| Polyol from Batch | $^1$H-NMR Chemical shifts, δ, in CDCl$_3$ (ppm) |
|---|---|
| B1 | 8.2 (br) 5.2 (br), 5.0-4.8 (dd), 4.4-4.2 (dd), 4.2-4.0 (dd), 3.8-3.2 (br), 2.4-2.2 (dd), 1.6-1.2 (br), 1.0 (t), 0.8 (t) |
| B2 | 8.2(br) 5.8 (D2), 5.2 (br), 5.0-4.8 (dd), 4.4-4.2 (dd), 4.2-4.0 (dd), 3.8-3.2 (br), 2.4-2.2 (dd), 1.6-1.2 (br), 1.0 (t), 0.8 (t) |
| B3 | 5.2 (br), 5.0-4.8 (dd) 4.4-4.2 (dd), 4.2-4.0 (dd), 3.8-3.2 (br), 2.4-2.2 (dd), 1.6-1.2 (br), 1.0 (t), 0.8 (t) |
| B4 | 5.2 (br), 5.0-4.8 (dd) 4.4-4.2 (dd), 4.2-4.0 (dd), 3.8-3.2 (br), 2.4-2.2 (dd), 1.6-1.2 (br), 1.0 (t), 0.8 (t) |

TABLE 11

Amount of remaining terminal double bonds[1] and number of formic acid units per TAG polyol as estimated by $^1$H-NMR for each batch of PMTAG Green Polyol.

| Batch | Remaining double bonds | formic acid units per TAG |
|---|---|---|
| B1 | 18% | 0.14 |
| B2 | 30% | 0.10 |
| B3 | 30% | No formic acid |
| B4 | 26% | No formic acid |

[1]Remaining terminal double bonds (%) was calculated as the ratio of remaining terminal double-bonds in Green Polyol to the terminal double bonds in PMTAG.

HPLC of PMTAG Green Polyol Results

Figure 12A:
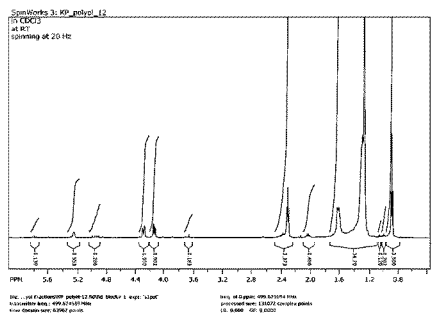
Figure 12B:
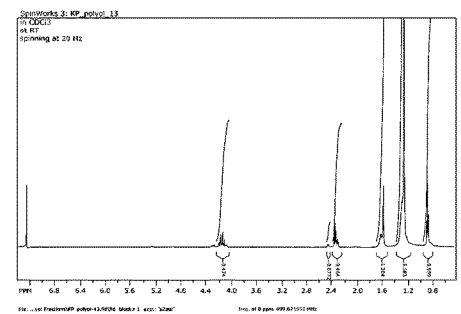
Figure 12C:
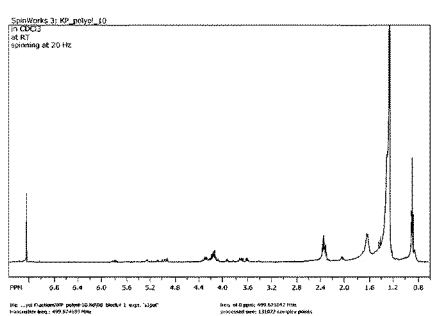
Figure 12D:
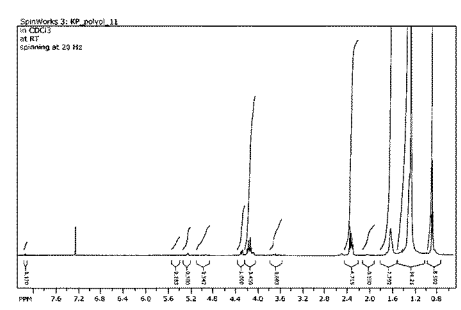
Figure 12E:
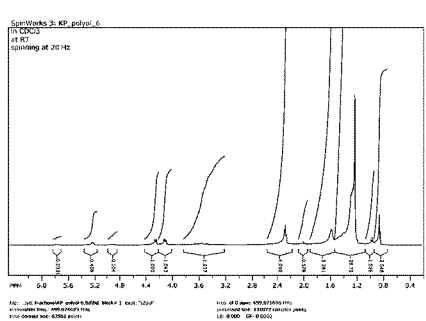
Figure 12F:
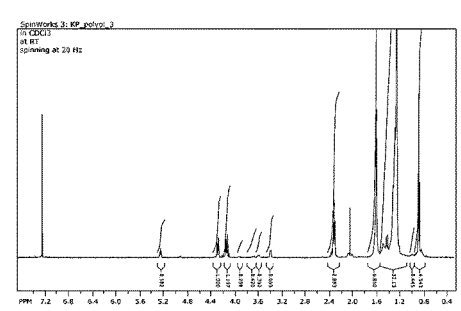
Figure 12G:
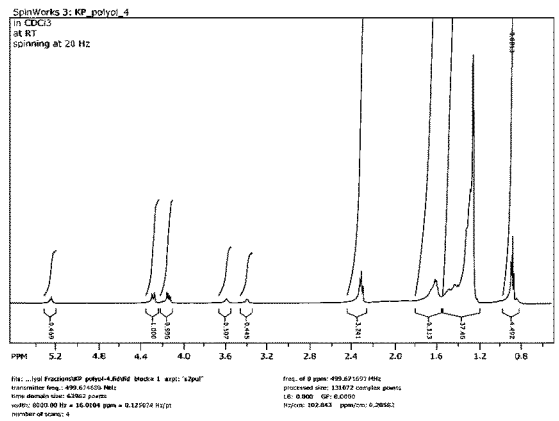
Figure 12H:
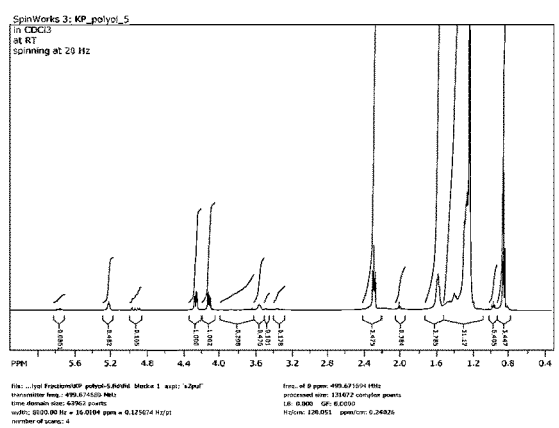
Figure 12I:
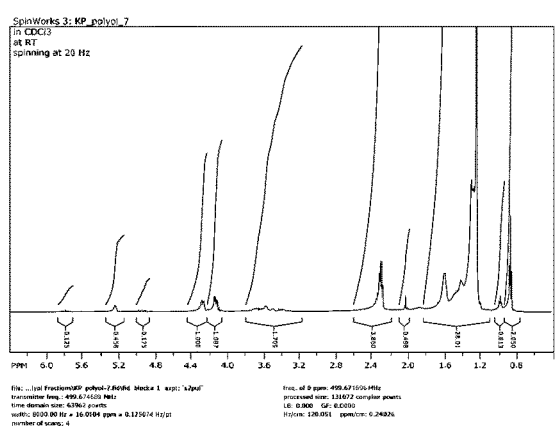

HPLC was run for the polyol of Batch 4. Its HPLC curve is shown in FIG. 12a. HPLC of the polyol obtained from PMTAG via the conventional route (PMTAG Polyol) is shown in FIG. 12b for comparison purposes. Corresponding data are listed in Table 12.

TABLE 12

HPLC Retention Time (RT, min) of B4-Polyol and PMTAG Polyol.

| | B4-Polyol | | PMTAG Polyol | |
|---|---|---|---|---|
| Peak | RT | A % | RT | A % |
| 1 | 2.8 | 72.15 | 2.4 | 0.90 |
| 2 | 3.1 | 1.16 | 2.8 | 42.17 |
| 3 | 6.9 | 0.70 | 7.2 | 0.67 |
| 4 | 10.0 | 0.58 | 9.8 | 0.18 |
| 5 | 14.8 | 1.16 | 10.5 | 0.08 |
| 6 | 15.7 | 4.04 | 15.7 | 5.07 |
| 7 | 16.7 | 1.21 | 16.6 | 1.66 |
| 8 | 18.3 | 1.20 | 17.6 | 0.30 |
| 9 | 19.7 | 9.64 | 19.4 | 0.94 |
| 10 | | | 20.9 | 14.04 |
| 11 | | | 22.3 | 0.95 |
| 12 | 29.4 | 6.84 | 30.8 | 3.05 |
| 13 | 31.2 | 1.32 | 31.4 | 25.58 |
| | | | 33.2 | 2.99 |
| | | | 35.6 | 0.96 |
| | | | 40.4 | 0.45 |

A % = relative peak area (%);
RT: Retention time (min)

As seen in Table 12, the HPLC retention time at 4 to 8 min is related to PMTAG itself, at 8 to 10 min is related to hydrolyzed products, at 10 to 21 min to diols of PMTAG, and those higher than 21 min are related to tetrols of PMTAG.

Compositional Analysis of PMTAG Green Polyols

The actual composition of the PMTAG Green Polyols was determined with the help of $^1$H-NMR and HPLC analyses of fractions of PMTAG Green Polyol obtained by column chromatography of B4-Polyol. The polyol of Batch 4 was chosen to be analyzed in detail because the conversion of its double bonds was highest and did not have any attached formic acid. Furthermore, it presented the highest OH value and low acid value. B4-Polyol was fractionated with column chromatography. Nine different fractions were obtained (labelled F1 to F9). These fractions were characterized with $^1$H NMR and HPLC. Column chromatography data, HPLC and H NMR data are provided in Table 13. $^1$H NMR spectra of the column chromatography fractions are presented in FIGS. 12A-12I (F1 to F9). HPLC curves of the column chromatography fractions are presented in FIGS. 13A-13E (F1 to F9).

TABLE 13

Column chromatography data of B4-Polyol, and HPLC and $^1$H NMR data of the fractions.

| Fraction | EA: Hx | RT | $^1$H-NMR chemical shift | Potential structures |
|---|---|---|---|---|
| F1 | 1:10 | 4-8 | 5.8 (m, 0.28H), 5.2 (m, 1H), 5.0 (dd, 0.56), 4.3 (dd, 2H), 4.1 (dd, 2H), 2.4 (t, 6H), 2.0 (m, 1H), 1.6 (m), 1.4-1.2 (m), 1.0 (t, 0.8H), 0.8 (t, 7H) | TAG structure<br>No polyols<br>Contains $FA_1$, $FA_2$, and $FA_3$ |
| F2 | 1:10 | 7.25 | 4.2-4 (m, 0.47H), 2.3 (m, 0.46 H), 1.4-1.2 (m), 1.6 (m), 0.8 (m, 1H) | Not a TAG structure<br>Hydroxylated products, with $FA_3$<br>No $FA_1$ or $FA_2$ |
| F3 | 1:10 | 8-10 | 5.8 (m), 5.2 (m) 4.8 (m) 4.4-4.0 (m), 2.4 (m), 2.0 (m), 1.6 (m), 1.4-1.2 (m), 0.8 (t) | Not a TAG structure.<br>Hydroxylated products, containing $FA_3$ and $FA_1$<br>No $FA_2$ |
| F4 | 1:10 | 9.2 | 5.4 (m, 0.28H), 5.3 (m, 0.5H), 5.0-4.8 (m, 0.54), 4.4-4.2 (dd, 1H), 4.2-4.0 (m, 1.4H), 3.8-3.6 (m, 0.68H), 2.4 (m, 4.7H), 2.0 (m, 0.5H), 1.6 (m, 7.7H), 1.4-1.2 (m), 1.0 (t, 0.8H), 0.8 (t, 8.5H) | Not a TAG structure<br>Hydroxylated products, with $FA_3$ and $FA_1$<br>No $FA_2$ |
| F5 | 1:8 | 10.2 | 5.8 (m, 0.20H), 5.2 (m, 1H), 5.0 (dd, 0.4), 4.3 (dd, 2H), 4.1 (dd, 2H), 3.6-3.2 (m, 2H) 2.4 (t, 6H), 2.0 (m, 1H), 1.6 (m), 1.4-1.2 (m), 1.0 (t, 1.8H), 0.8 (t, 4.5H) | TAGs structure,<br>Diols with $FA_2$ and $FA_3$<br>Contains $FA_1$ |

TABLE 13-continued

Column chromatography data of B4-Polyol, and HPLC and $^1$H NMR data of the fractions.

| Fraction | EA: Hx | RT | $^1$H-NMR chemical shift | Potential structures |
|---|---|---|---|---|
| F6 | 1:8 | 15.2 | 5.2 (m, 1H), 4.3 (dd, 2H), 4.1 (dd, 2H), 3.6-3.2 (m) 2.4 (t, 6H), 1.6 (m), 1.4-1.2 (m), 0.8 (t, 9H) | Diols, including diol from $FA_3$ No $FA_1$ and $FA_2$ |
| F7 | 1:8 | 15.5 | 5.2 (m, 1H), 4.3 (dd, 2H), 4.1 (dd, 2H), 3.6-3.2 (m) 2.4 (t, 6H), 1.6 (m), 1.4-1.2 (m), 0.8 (t, 9H) | Diols from $FA_3$ |
| F8 | 1:6 | 17.2-21.2 | 5.8 (m, 0.20H), 5.2 (m, 1H), 5.0 (dd, 0.4), 4.3 (dd, 2H), 4.1 (dd, 2H), 3.6-3.2 (m,) 2.4 (t, 6H), 2.0 (m), 1.6 (m), 1.4-1.2 (m), 1.0 (t, 0.8H), 0.8 (t, 6.6H) | Diols From $FA_1$, $FA_2$ and $FA_3$. Contains $FA_1$ |
| F9 | 1:6 | 30.1 | 5.8 (m, 0.2H), 5.2 (m, 1H), 5.0 (dd, 0.4H), 4.3 (dd, 2H), 4.1 (dd, 2H), 3.6-3.2 (m, 3.4H) 2.4 (t, 6H), 1.6 (m), 1.4-1.2 (m), 1.0 (t, 1.6H), 0.8 (t, 4H) | Tetrols |

EA: Hx: ratio of ethyl acetate and hexanes, the solvents used for column chromatography.
RT: HPLC Retention time (min);
$FA_1$: Fatty acids with terminal double bonds, n = 0;
$FA_2$: Fatty acid with n = 3;
$FA_3$: Fatty acid with n = 9 (Scheme 6).

$^1$H NMR of F1, and F5 to F9 revealed the presence of a TAG glycerol backbone structure whereas, F2 to F4 did not. F2 to F4 presented a hydrolyzed TAG structure instead, indicating that they were the hydrolyzed by-product formed during the hydroxylation reaction. Additionally, unreacted terminal double bonds but not internal double bonds were detected in almost all the fractions. No —OH group related chemical shift (at 3.6-3.2 ppm) was detected in $^1$H NMR of F1. One can safely affirm that F1 is a TAG structure. OH related chemical shift (at 3.6-3.2 ppm) appeared for F5 to F9 indicating that these fractions contain the desired PMTAG polyol structure.

In the NMR of all the PMTAG Green polyols, the protons of the glycerol skeleton, —$CH_2CH(O)CH_2$— and —$OCH_2CH(O)CH_2O$— were presented at δ 5.3-5.2 ppm and 4.4-4.1 ppm, respectively; —C(=O)$CH_2$— at δ 2.33-2.28 ppm; —C(=O)$CH_2CH_2$— at δ 1.60 ppm; and the proton neighbored by —OH appeared at 3.8-3.4 ppm. There were two types of —$CH_3$, one with n=2 present at δ=1.0-0.9 ppm and another with n=8 at 0.9-0.8 ppm.

Structure of PMTAG Green Polyol

The HPLC results indicate that the green polyols produced are composed of the same fractions, but with a different content for each fraction. The retention time of the polyol fractions are listed in Table 13. The suggested structures of PMTAG Green Polyol based on HPLC and $^1$H-NMR are shown in Scheme 6.

These structures can be directly related to the theoretical structures of PMTAG Polyols based on the TAG composition of PMTAG. Non functionalized TAG structure was appeared at retention time 4-8 min; the hydrolyzed byproducts were observed at 7.2 to 9.2 min. PMTAG diols with long fatty acid chain and short fatty acid chain appeared at 10 to 21 min. PMTAG tetrols with long and short fatty acid chains got eluted at 30.1 min.

Scheme 6.
Possible structures in PMTAG Green Polyol; n = 0, 2 or 8; m = 11 to 20, R = OH or OCH(=O).
The positions of R and OH are interchangeable.

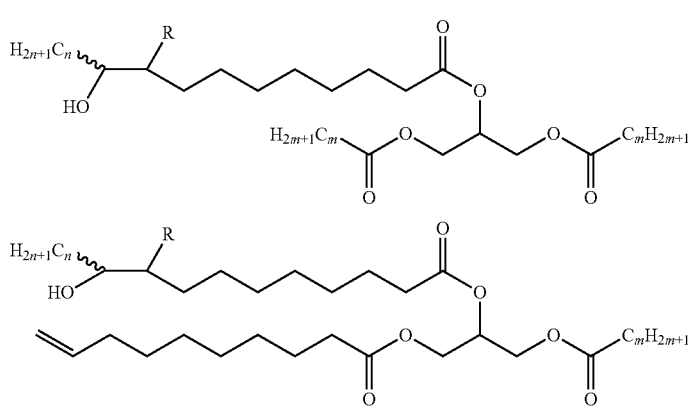

-continued

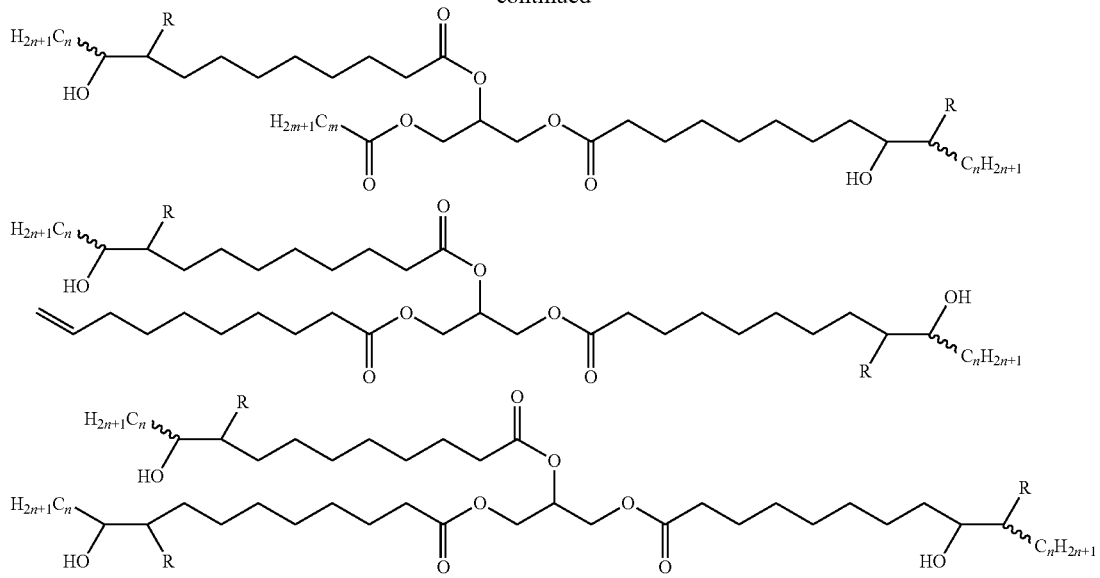

Physical Properties of PMTAG Green Polyols
Thermogravimetric Analysis of PMTAG Green Polyols The TGA and DTG profiles of B1-, B2-, B3- and B4-PMTAG Polyols are shown in FIGS. 13a-d, respectively. The corresponding data (extrapolated onset and offset temperatures of degradation, temperature of degradation measured at 1, 5 and 10% decomposition, and the DTG peak temperatures) are provided in Table 14. For comparison purposes, the DTG curves of the polyols made from the four batches are presented in FIG. 13e.

The TGA and DTG data indicate that polyols synthesized using green route undergo degradation mechanisms similar to the polyols made from the PMTAG itself. The DTG curves presented a very weak peak at ~170 to 240° C. followed by a large peak at 375-400° C. ($T_{D1}$ and $T_D$, respectively, in FIGS. 13A-E) indicating two steps of degradation. The first step involved ~1 to 3% weight loss only. The second DTG peak (where ~50-67% weight loss was recorded), is associated with the breakage of the ester bonds, the dominant mechanism of degradation that was also observed in the TGA of the PMTAG starting material.

PMTAG Green Polyols (B1-B4) presented very similar thermal stabilities except B1-Polyol, which showed an extra decomposition step at 184° C. due to its high acid value.
Crystallization and Melting Behavior of PMTAG Green Polyols The crystallization and heating profiles (both at 5° C./min) of PMTAG Green Polyols are shown in FIGS. 16a and 16b, respectively. The corresponding thermal data are listed in Table 15.

The onset temperature of crystallization (~26° C. to ~30° C.) and offset temperature of melting (~46 to 50° C.) indicated that the PMTAG Green Polyols were not liquid at ambient temperature. Three well-defined peaks were observed in the cooling thermograms of B2-PMTAG Green Polyol (P, P1 and P2 in FIG. 14A2) and two peak in the others (P1 and P2 in FIG. 14A4). These peaks indicate that the polyols contained a high (P and P1) and a low (P2) crystallizing portions. The occurrence of P in B2-PMTAG Green Polyol only, indicated the presence of high crystallizing components that were not present in the other green polyols.

The heating thermogram of the PMTAG Green Polyols displayed two groups of endothermic events (G1 and G2 in FIG. 14B5), both constituted of prominent and shoulder peaks. G1 and G2 are associated with the melting of the low and high melting portion of the polyols, respectively. Note that the heating thermograms of the PMTAG Green Polyols did not display any exotherm, suggesting that polymorphic transformations mediated by melt did not occur.

TABLE 14

TGA and DTG data of PMTAG Green Polyols. $T_{1\%}^d$, $T_{5\%}^d$, $T_{10\%}^d$: Temperature of degradation at 1, 5 and 10% weight loss, respectively; $T_{Di}$: DTG peak temperatures; $T_{on}$ and $T_{off}$: extrapolated onset and offset temperatures of degradation, respectively.

| | Temperature (° C.) | | | | | | | | Weight loss (%) at | | | |
|---|---|---|---|---|---|---|---|---|---|---|---|---|
| Batch | $T_{1\%}^d$ | $T_{5\%}^d$ | $T_{10\%}^d$ | $T_{on}$ | $T_{D1}$ | $T_{D2}$ | $T_{D3}$ | $T_{off}$ | $T_{on}$ | $T_{D1}$ | $T_{D2}$ | $T_{D3}$ |
| B1 | 131 | 185 | 233 | 185 | 184 | 394 | 445 | 460 | 5 | 5 | 63 | 97 |
| B2 | 207 | 277 | 301 | 277 | 372 | 447 | — | 472 | 5 | 54 | 96 | — |
| B3 | 181 | 296 | 322 | 296 | 380 | 447 | — | 460 | 5 | 55 | 98 | — |
| B4 | 207 | 288 | 310 | 288 | 382 | 447 | — | 468 | 5 | 60 | 97 | — |

TABLE 15

Thermal data of LF-PMTAG Polyols obtained on cooling and heating (both at 5° C./min). Onset ($T_{on}$), offset ($T_{off}$), and peak temperatures ($T_{1-3}$), Enthalpy of crystallization ($\Delta H_C$), and Enthalpy of melting ($\Delta H_M$).
<sup>a</sup>Shoulder peak

| Cooling | $T_{on}$ | Temperature (° C.) | | | | | Enthalpy (J/g) |
| --- | --- | --- | --- | --- | --- | --- | --- |
| | | $T_1$ | $T_2$ | $T_3$ | $T_4$ | $T_{off}$ | $\Delta H_C$ |
| B1 | 26.00 | 24.45 | 18.10 | 12.94 | −6.26 | −25.70 | 88.88 |
| B2 | 30.08 | 28.88 | 26.37 | 18.94 | 12.24 | −4.29 | 79.31 |
| B3 | 26.77 | 24.66 | 17.26 | 11.48 | — | −4.30 | 73.59 |
| B4 | 28.61 | 26.00 | 12.13 | — | — | −4.69 | 84.08 |

| Heating | $T_{on}$ | Temperature (° C.) | | | | | | Enthalpy (J/g) |
| --- | --- | --- | --- | --- | --- | --- | --- | --- |
| | | $T_1^a$ | $T_2$ | $T_3$ | $T_4$ | $T_5^a$ | $T_{off}$ | $\Delta H_M$ |
| B1 | −5.79 | 43.97 | 32.46 | 24.65 | 18.82 | — | 46.46 | 86.98 |
| B2 | −1.36 | 42.55 | 38.64 | 32.26 | 24.89 | 21.70 | 48.08 | 99.99 |
| B3 | −1.24 | 43.95 | 32.51 | 24.41 | 20.97 | — | 48.25 | 91.87 |
| B4 | 1.52 | 43.39 | 32.34 | 22.40 | — | — | 49.52 | 91.57 |

Solid Fat Content of PMTAG Green Polyols

Solid Fat Content (SFC) versus temperature curves on cooling (5° C./min) and heating (5° C./min) of PMTAG Green Polyol (B4-Polyol) are shown in FIGS. 15a and 15b, respectively. Extrapolated induction and offset temperatures as determined by SFC during cooling and heating are listed in Table 16. As can be seen in FIG. 15a, the SFC cooling curve of B4-Polyol presented two segments indicative of a two-step solidification process. The SFC heating curve of the polyol mirrored the SFC cooling curve, with also two identifiable segments (segments 1 and 2 in FIG. 15b). These SFC data indicate the presence of high and low melting temperature components in the polyols.

TABLE 16

Extrapolated induction and offset temperatures ($T_{ind}$, $T_s$, respectively) of PMTAG Green Polyols as determined by SFC

| Temperature (° C.) | Cooling | | Heating |
| --- | --- | --- | --- |
| | $T_{ind}$ | $T_s$ | |
| B4 | 36.5 | −3.5 | −1.5 | 47.7 |

Flow Behavior and Viscosity of PMTAG Green Polyols

FIGS. 16A-16D show shear rate-shear stress curves obtained at different temperatures for B4-Polyol. Fits to the Herschel-Bulkley (Eq. 1) model are included in the figure. FIGS. 17A-17D show the viscosity versus temperature curves for B4-Polyol obtained during cooling at 1° C./min.

The power index values (n) obtained for the PMTAG Green Polyols at temperatures above the onset temperature of crystallization ($T_{on}$) were approximately equal to 1, indicating a Newtonian behavior in the whole range of the used shear rates. The data collected below $T_{on}$ (not shown) indicated that the sample has crystallized.

The viscosity versus temperature of PMTAG Green Polyols obtained using the ramp procedure presented the exponential behavior of liquid hydrocarbons.

Polyurethane Foams from PMTAG Green Polyols

Polyurethane Foam Polymerization

Polyurethanes are one of the most versatile polymeric materials with regards to both processing methods and mechanical properties. The proper selection of reactants enables a wide range of polyurethanes (PU) elastomers, sheets, foams etc. Polyurethane foams are cross-linked structures that may be prepared based on a polymerization addition reaction between organic isocyanates and polyols, as shown in Scheme 7 below. Such a reaction may also be commonly referred to as a gelation reaction.

Scheme 7. Formation of urethane linkage between isocyanate group and OH group

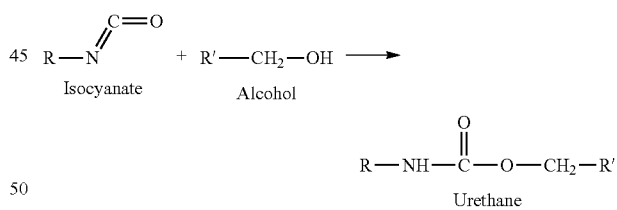

A polyurethane is a polymer composed of a chain of organic units joined by the carbamate or urethane link. Polyurethane polymers may be formed by reacting one or more monomers having at least two isocyanate functional groups with at least one other monomer having at least two isocyanate-reactive groups, e.g., functional groups that are reactive towards the isocyanate function. The isocyanate ("NCO") functional group is highly reactive and is able to react with many other chemical functional groups. In order for a functional group to be reactive to an isocyanate functional group, the group may have at least one hydrogen atom, which is reactive to an isocyanate functional group. A polymerization reaction is presented in Scheme 8, using a hexol structure as an example.

Scheme 8. Preparation of cross linked polyurethane from MDI and PMTAG Green Polyols. Hexol structure is used as an example.

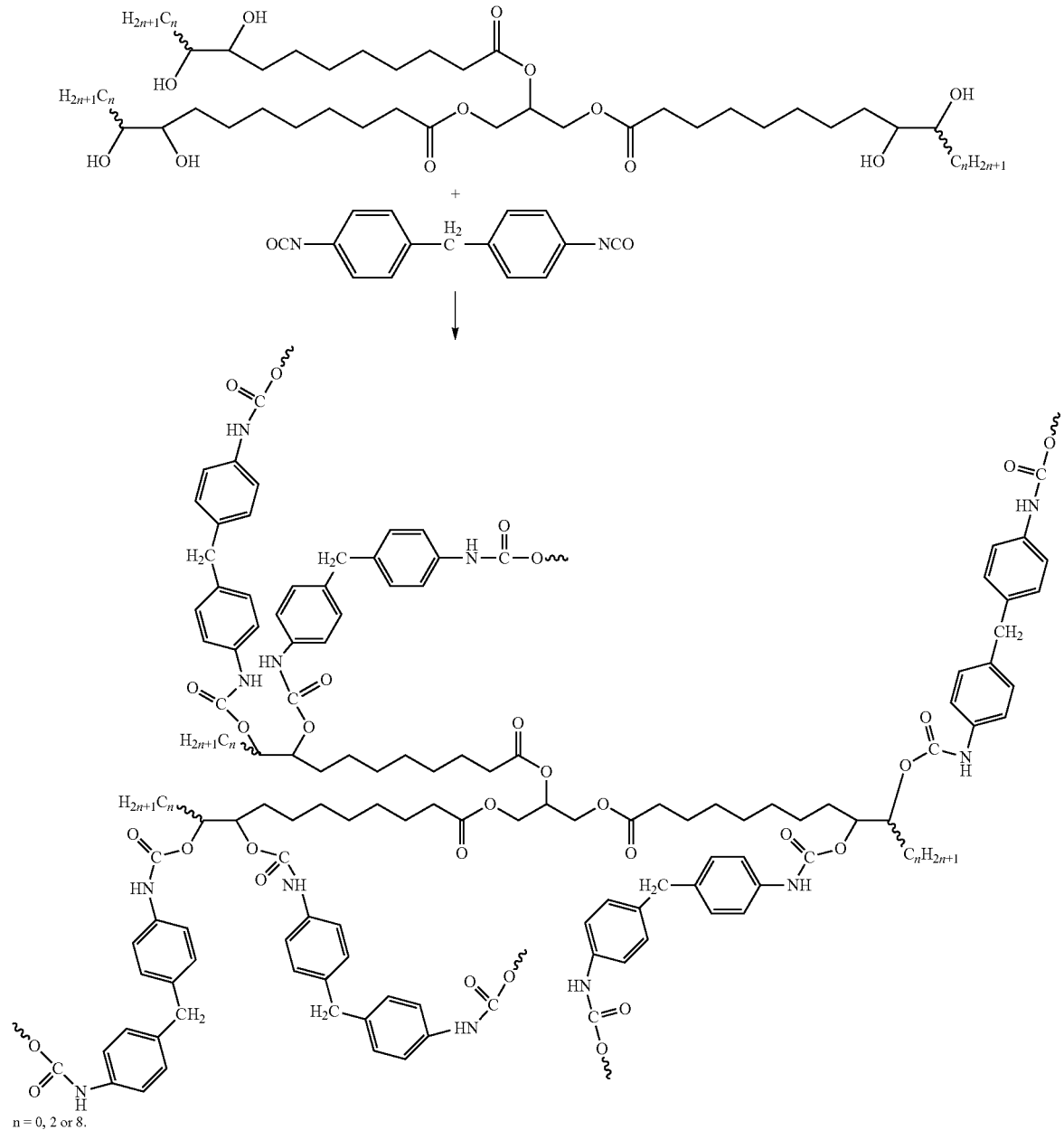

n = 0, 2 or 8.

In addition to organic isocyanates and polyols, foam formulations often include one or more of the following non-limiting components: cross-linking components, blowing agents, cell stabilizer components, and catalysts. In some embodiments, the polyurethane foam may be a flexible foam or a rigid foam.

Organic Isocyanates

The polyurethane foams are derived from an organic isocyanate compound. In order to form large linear polyurethane chains, di-functional or polyfunctional isocyanates are utilized. Suitable polyisocyanates are commercially available from companies such as, but not limited to, Sigma Aldrich Chemical Company, Bayer Materials Science, BASF Corporation, The Dow Chemical Company, and Huntsman Chemical Company. The polyisocyanates may have a formula $R(NCO)_n$, where n is between 1 to 10, and wherein R is between 2 and 40 carbon atoms, and wherein R contains at least one aliphatic, cyclic, alicyclic, aromatic, branched, aliphatic- and alicyclic-substituted aromatic, aromatic-substituted aliphatic and alicyclic group. Examples of polyisocyanates include, but are not limited to, diphenylmethane-4,4'-diisocyanate (MDI), which may either be crude or distilled; toluene-2,4-diisocyanate (TDI); toluene-2,6-diisocyanate (TDI); methylene bis(4-cyclohexylisocyanate ($H_{12}$MDI); 3-isocyanatomethyl-3,5,5-trimethyl-cyclohexyl isocyanate (IPDI); 1,6-hexane diisocyanate (HDI); naphthalene-1,5-diisocyanate (NDI); 1,3- and 1,4-phenylenediisocyanate; triphenylmethane-4,4',4''-triisocyanate;

polyphenyl-polymethylenepolyisocyanate (PMDI); m-xylene diisocyanate (XDI); 1,4-cyclohexyl diisocyanate (CHDI); isophorone diisocyanate; isomers and mixtures or combinations thereof.

Polyols

The polyols used in the foams described herein are metathesized triacylglycerol (MTAG) based polyols derived from natural oils, including palm oil. The synthesis of the PMTAG Green Polyol was described earlier, and involves epoxidation and subsequent hydroxylation of a PMTAG derived from a natural oil, such as palm oil.

Cross-Linking Components and Chain Extenders

Cross-linking components or chain extenders may be used if needed in preparation of polyurethane foams. Suitable cross-linking components include, but are not limited to, low-molecular weight compounds containing at least two moieties selected from hydroxyl groups, primary amino groups, secondary amino groups, and other active hydrogen-containing groups that are reactive with an isocyanate group. Crosslinking agents include, for example, polyhydric alcohols (especially trihydric alcohols, such as glycerol and trimethylolpropane), polyamines, and combinations thereof. Non-limiting examples of polyamine crosslinking agents include diethyltoluenediamine, chlorodiaminobenzene, diethanolamine, diisopropanolamine, triethanolamine, tripropanolamine, 1,6-hexanediamine, and combinations thereof. Diamine crosslinking agents may include twelve carbon atoms or fewer, more commonly seven or fewer. Other cross-linking agents include various tetrols, such as erythritol and pentaerythritol, pentols, hexols, such as dipentaerythritol and sorbitol, as well as alkyl glucosides, carbohydrates, polyhydroxy fatty acid esters such as castor oil and polyoxy alkylated derivatives of poly-functional compounds having three or more reactive hydrogen atoms, such as, for example, the reaction product of trimethylolpropane, glycerol, 1,2,6-hexanetriol, sorbitol and other polyols with ethylene oxide, propylene oxide, or other alkylene epoxides or mixtures thereof, e.g., mixtures of ethylene and propylene oxides.

Non-limiting examples of chain extenders include, but are not limited to, compounds having hydroxyl or amino functional group, such as glycols, amines, diols, and water. Specific non-limiting examples of chain extenders include ethylene glycol, diethylene glycol, propylene glycol, dipropylene glycol, 1,4-butanediol, 1,3-butanediol, 1,5-pentanediol, neopentyl glycol, 1,6-hexanediol, 1,10-decanediol, 1,12-dodecanediol, ethoxylated hydroquinone, 1,4-cyclohexanediol, N-methylethanolamine, N-methylisopropanolamine, 4-aminocyclohexanol, 1,2-diaminoethane, 2,4-toluenediamine, or any mixture thereof.

Catalyst

The catalyst component can affect the reaction rate and can exert influence on the open celled structures and the physical properties of the foam. The proper selection of catalyst (or catalysts) appropriately balance the competing interests of the blowing and polymerization reactions. A correct balance is needed due to the possibility of foam collapse if the blow reaction proceeds relatively fast. On the other hand, if the gelation reaction overtakes the blow reaction, foams with closed cells might result and this might lead to foam shrinkage or "pruning." Catalyzing a polyurethane foam, therefore, involves choosing a catalyst package in such a way that the gas produced becomes sufficiently entrapped in the polymer. The reacting polymer, in turn, has sufficient strength throughout the foaming process to maintain its structural integrity without collapse, shrinkage, or splitting.

The catalyst component is selected from the group consisting of tertiary amines, organometallic derivatives or salts of, bismuth, tin, iron, antimony, cobalt, thorium, aluminum, zinc, nickel, cerium, molybdenum, vanadium, copper, manganese and zirconium, metal hydroxides and metal carboxylates. Tertiary amines may include, but are not limited to, triethylamine, triethylenediamine, N,N,N',N'-tetramethylethylenediamine, N,N,N',N'-tetraethylethylenediamine, N-methylmorpholine, N-ethylmorpholine, N,N,N',N'-tetramethylguanidine, N,N,N',N'-tetramethyl-1,3-butanediamine, N,N-dimethylethanolamine, N,N-diethylethanolamine. Suitable organometallic derivatives include di-n-butyl tin bis(mercaptoacetic acid isooctyl ester), dimethyl tin dilaurate, dibutyl tin dilaurate, dibutyl tin sulfide, stannous octoate, lead octoate, and ferric acetylacetonate. Metal hydroxides may include sodium hydroxide and metal carboxylates may include potassium acetate, sodium acetate or potassium 2-ethylhexanoate.

Blowing Agents

Polyurethane foam production may be aided by the inclusion of a blowing agent to produce voids in the polyurethane matrix during polymerization. The blowing agent promotes the release of a blowing gas that forms cell voids in the polyurethane foam. The blowing agent may be a physical blowing agent or a chemical blowing agent. The physical blowing agent can be a gas or liquid, and does not chemically react with the polyisocyanate composition. The liquid physical blowing agent may evaporate into a gas when heated, and may return to a liquid when cooled. The physical blowing agent may reduce the thermal conductivity of the polyurethane foam. Suitable physical blowing agents may include liquid carbon dioxide, acetone, and combinations thereof. Certain physical blowing agents may have a zero ozone depletion potential. Chemical blowing agents refers to blowing agents that chemically react with the polyisocyanate composition.

Suitable blowing agents may also include compounds with low boiling points that are vaporized during the exothermic polymerization reaction. Such blowing agents may be inert or have low reactivity, and therefore it is likely that they will not decompose or react during the polymerization reaction. Examples of blowing agents include, but are not limited to, water, carbon dioxide, nitrogen gas, acetone, and low-boiling hydrocarbons such as cyclopentane, isopentane, n-pentane, and their mixtures. Previously, blowing agents such as chlorofluorocarbons (CFCs), hydrofluorocarbons (HFCs), hydrochlorofluorocarbons (HCFCs), fluoroolefins (FOs), chlorofluoroolefins (CFOs), hydrofluoroolefins (HFOs), and hydrochlorfluoroolefins (HCFOs), were used, though such agents are not as environmentally friendly. Other suitable blowing agents include water that reacts with isocyanate to produce a gas, carbamic acid, and amine, as shown below in Scheme 9.

Scheme 9. Blowing reaction during the polymerization process

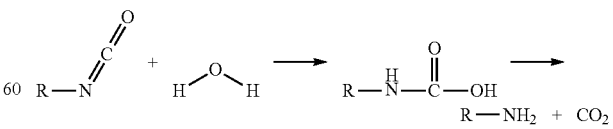

Cell Stabilizers

Cell stabilizers may include, for example, silicone surfactants or anionic surfactants. Examples of suitable silicone surfactants include, but are not limited to, polyalkylsiloxanes, polyoxyalkylene polyol-modified dimethylpolysiloxanes, alkylene glycol-modified dimethylpolysiloxanes, or any combination thereof. Suitable anionic surfactants include, but are not limited to, salts of fatty acids, salts of sulfuric acid esters, salts of phosphoric acid esters, salts of sulfonic acids, and combinations of any of these. Such surfactants provide a variety of functions, reducing surface tension, emulsifying incompatible ingredients, promoting bubble nucleation during mixing, stabilization of the cell walls during foam expansion, and reducing the defoaming effect of any solids added. Of these functions, a key function is the stabilization of the cell walls, without which the foam would behave like a viscous boiling liquid.

Additional Additives

If desired, the polyurethane foams can have incorporated, at an appropriate stage of preparation, additives such as pigments, fillers, lubricants, antioxidants, fire retardants, mold release agents, synthetic rubbers and the like which are commonly used in conjunction with polyurethane foams.

Flexible and Rigid Foam Embodiments

In some embodiments, the polyurethane foam may be a flexible foam, where such composition includes (i) at least one polyol composition derived from a natural oil based metathesized triacylglycerols component; (ii) at least one polyisocyanate component, wherein the ratio of hydroxy groups in said at least one polyol to isocyanate groups in said at least one polyisocyanate component is less than 1; (iii) at least one blowing agent; (iv) at least one cell stabilizer component; and (v) at least one catalyst component; wherein the composition has a wide density range, which can be between about 85 kgm$^{-3}$ and 260 kgm$^{-3}$, but can in some instances be much wider. The flexible foam can have a wide density range, and in some embodiments, the range can be between 85 kgm$^{-3}$ and 260 kgm$^{-3}$ In such flexible foam compositions, the relative amounts of each particular component may be tailored to the particular needs of an end user, as understood by a person skilled in the art. In some instances, the relative amounts of each component, or the ratios related thereto, may be greater or lesser than those presented herein, as understood by a person skilled in the art In other embodiments, the polyurethane foam may be a rigid foam, where the composition includes (i) at least one polyol derived from a natural oil based metathesized triacylglycerols component; (ii) at least one polyisocyanate component, wherein the ratio of hydroxy groups in said at least one polyol to isocyanate groups in said at least one polyisocyanate component is less than 1; (iii) at least one cross-linking component (iv) at least one blowing agent; (v) at least one cell stabilizer component; and (vi) at least one catalyst component; wherein the composition has a wide density range, which can be between about 85 kgm$^{-3}$ and 260 kgm$^{-3}$, but can in some instances be much wider. The rigid foam can have a wide density range, and in some embodiments, the range can be between 85 kgm$^{-3}$ and 260 kgm$^{-3}$ In such rigid foam compositions, the relative amounts of each particular component may be tailored to the particular needs of an end user, as understood by a person skilled in the art. In some instances, the relative amounts of each component, or the ratios related thereto, may be greater or lesser than those presented herein, as understood by a person skilled in the art Analytical Methods for PMTAG Green Polyol Foam Analysis The PMTAG Green Polyol foam was analyzed using different techniques. These techniques can be broken down into: (i) chemistry characterization techniques, including NCO value and Fourier Transform infrared spectroscopy (FTIR); and (ii) physical characterization methods, including thermogravimetric analysis (TGA), differential scanning calorimetry (DSC), scanning electron microscopy (SEM) and compressive test.

Chemistry Characterization Techniques of PMTAG Green Polyol Foam

The amount of reactive NCO (% NCO) for diisocyanates was determined by titration with dibutylamine (DBA). MDI (2±0.3 g) was weighed into 250 ml conical flasks. 2N DBA solution (20 ml) was pipetted to dissolve MDI. The mixture was allowed to boil at 150° C. until the vapor condensate was at an inch above the fluid line. The flasks were cooled to RT and rinsed with methanol to collect all the products. 1 ml of 0.04% bromophenol blue indicator was then added and titrated against 1N HCl until the color changes from blue to yellow. A blank titration using DBA was also done.

The equivalent weight (EW) of the MDI is given by Eq. 2:

$$EW = \frac{W \times 1000}{(V_1 - V_2) \times N} \qquad \text{Eq. 2}$$

where W is the weight of MDI in g, $V_1$ and $V_2$ are the volume of HCl for the blank and MDI samples, respectively. N is the concentration of HCl. The NCO content (%) is given by Eq. 3:

$$\% \text{ NCO content} = \frac{42}{EW} \times 100 \qquad \text{Eq. 3}$$

FTIR spectra were obtained using a Thermo Scientific Nicolet 380 FT-IR spectrometer (Thermo Electron Scientific Instruments, LLC, USA) equipped with a PIKE MIRacle™ attenuated total reflectance (ATR) system (PIKE Technologies, Madison, Wis., USA.). Foam samples were loaded onto the ATR crystal area and held in place by a pressure arm, and sample spectra were acquired over a scanning range of 400-4000 cm$^{-1}$ for 32 repeated scans at a spectral resolution of 4 cm$^{-1}$.

Physical Characterization Techniques of PMTAG Green Polyol Foam

TGA was carried out on a TGA Q500 (TA Instruments, DE, USA) equipped with a TGA heat exchanger (P/N 953160.901). Approximately 8.0-15.0 mg of sample was loaded in the open TGA platinum pan. The sample was heated from 25 to 600° C. under dry nitrogen at a constant rate of 10° C./min.

DSC measurements were run on a Q200 model (TA Instruments, New Castle, Del.) under a nitrogen flow of 50 mL/min. PMTAG Green Polyol Foam samples between 3.0 and 6.0 (±0.1) mg were run in hermetically sealed aluminum DSC pans. In order to obtain a better resolution of the glass transition, PMTAG Green Polyol foams were investigated using modulated DSC following ASTM E1356-03 standard. The sample was first equilibrated at −90° C. and heated to 150° C. at a constant rate of 5.0° C./min (first heating cycle), held at 150° C. for 1 min and then cooled down to −90° C. with a cooling rate of 5° C./min, and subsequently reheated to 150° C. at the same rate (second heating cycle). Modulation amplitude and period were 1° C. and 60 s, respectively. The "TA Universal Analysis" software was used to analyze the DSC thermograms.

A scanning electron microscope (SEM), model Tescan Vega II, was used under standard operating conditions (10 keV beam) to examine the pore structure of the foams. A sub-sample of approximately 2 cm×2 cm and 0.5 cm thick was cut from the center of each sample. The sample was coated with a thin layer of carbon (~30 nm thick) using an Emitech K950X turbo evaporator to provide electrical conductivity in the SEM chamber and prevent the buildup of electrons on the surface of the sample. All images were acquired using a secondary electron detector to show the surface features of the samples.

The compressive strength of the foams was measured at room temperature using a texture analyzer (Texture Technologies Corp, NJ, USA). Samples were prepared in cylindrical Teflon molds of 60-mm diameter and 36-mm long. The cross head speed was 3.54 mm/min with a load cell of 500 kgf or 750 kgf. The load for the rigid foams was applied until the foam was compressed to approximately 80% of its original thickness, and compressive strengths were calculated based on the 5, 6, 10 and 15% deformations. The load for the flexible foams was applied until the foam was compressed to approximately 35% of its original thickness, and compressive strengths were calculated based on 10, 25 and 50% deformation.

Synthesis of Foams from PMTAG Green Polyol

Rigid and flexible polyurethane foams of different densities were obtained using appropriate recipe formulations. The amount of each component of the polymerization mixture was based on 100 parts by weight of total polyol. The amount of MDI was taken based on the isocyanate index 1.2. All the ingredients, except MDI, were weighed into a beaker and MDI was added to the beaker using a syringe, and then mechanically mixed vigorously for ~20 s. At the end of the mixing period, mixed materials were added into a cylindrical Teflon mold (60 mm diameter and 35 mm long), which was previously greased with silicone release agent and sealed with a hand tightened clamp. The sample was cured for four (4) days at 40° C. and post cured for one (1) day at room temperature.

Rigid Foam formulation was determined based on a total hydroxyl value of 450 mg KOH/g according to teachings known in the art. Table 17 presents the formulation recipe used to prepare the rigid and flexible foams. Note that in the case of rigid foams, around 18-20 parts of glycerin were added into the reaction mixture in order to reach the targeted hydroxyl value of 450 mg KOH/g. Flexible Foam formulation was based on a total hydroxyl value of the PMTAG Green polyol (Table 9) according to teachings known in the art. In the case flexible foams, no glycerin was added into the reaction mixture, and the catalyst amount was fixed to 0.5 parts for proper control of the polymerization reaction.

TABLE 17

Formulation Recipes for Rigid and Flexible Foams

| Ingredient | | Rigid Foams Parts | Flexible Foams Parts |
|---|---|---|---|
| PMTAG Green Polyol | | 100 | 100 |
| OH: NCO ratio | | 1:1.2 | 1:1.2 |
| Glycerin | B1 | 18.4 | |
| | B2 | 18.2 | 0 |
| | B3 | 20.1 | 0 |
| | B4 | 18.1 | 0 |
| Water | | 2 | 2 |
| Surfactant | | 2 | 2 |
| Catalyst | | 1 | 0.5 |
| Co-catalyst | | 1 | 0.5 |

TABLE 17-continued

Formulation Recipes for Rigid and Flexible Foams

| | Rigid Foams | Flexible Foams |
|---|---|---|
| Mixing Temperature (° C.) | 40 | 40 |
| Oven Temperature (° C.) | 40 | 40 |

Polymerization Conditions and Foams Produced

General Materials

The hydroxyl value (OH value) and acid value of the PMTAG Green Polyols that were used to prepare the foams are listed in Table 9. There were no free fatty acids detected by $^1$H-NMR. There was also no signal that can be associated with the loss of free fatty acids in the TGA of the PMTAG Green Polyols. The acid value reported in Table 9 was probably due to the hydrolysis of polyol during the actual titration, which uses strong base as the titrant, with the result that the actual titration causes hydrolysis.

Foams Produced from PMTAG Green Polyols

One rigid foam was prepared from each batch of PMTAG Green Polyols. The nomenclature and density of the foams are listed in Table 18. SEM micrographs of the rigid and flexible foams are presented in FIGS. 18A-18B and FIGS. 19A-19B, respectively.

TABLE 18

Nomenclature and density of the rigid and flexible foams prepared from the different batches of PMTAG Green polyol

| Green Polyol | rigid foam | | flexible foam | |
|---|---|---|---|---|
| | Compressive measurement | | | |
| | | Density (kgm$^{-3}$) | | Density (kgm$^{-3}$) |
| B1 | B1-RF168 | 168 | B1-FF165 | 165 |
| B2 | B2-RF161 | 161 | B2-FF166 | 166 |
| B3 | B3-RF145 | 145 | B3-FF162 | 162 |
| B4 | B4-RF166 | 166 | B4-FF153 | 153 |
| | SEM analysis | | | |
| | | Density (kgm$^{-3}$) | | Density (kgm$^{-3}$) |
| B4 | B4-RF140 | 140 | B4-FF160 | 160 |

FTIR of PMTAG Green Polyol Foams

FTIR spectra of rigid and flexible PMTAG Green Polyol Foams are shown in FIGS. 20A and 20B. Table 19 lists the characteristic vibrations of the foams. The broad absorption band observed at 3300-3400 cm$^{-1}$ in the foam is characteristic of NH group associated with the urethane linkage. The $CH_2$ stretching vibration is clearly visible at 2800-3000 cm$^{-1}$ region in the spectra. The band centered at 1700 cm$^{-1}$ is characteristic of C=O, which demonstrates the formation of urethane linkages. The band at 1744 cm$^{-1}$ is attributed to the C=O stretching of the ester groups. The overlapping peaks between 1710 and 1735 cm$^{-1}$ suggest the formation of urea, isocyanurate and free urethane in the PMTAG Green Polyol foams. The sharp band at 1150-1160 cm$^{-1}$ and 1108-1110 cm$^{-1}$ are the O—C—C and C—C(=O)—O stretching bands, respectively, of the ester groups. The band at 1030-1050 cm$^{-1}$ is due to $CH_2$ bend.

TABLE 19

FTIR data of PMTAG Green Polyol foams

| Moiety | Wavelengths (cm$^{-1}$) |
|---|---|
| H-bonded and free N-H groups | 3300-3400 |
| Free NCO | 2270 |
| Urea | 1717 |
| Isocyanurate | 1710 |
| Free Urethane | 1735 |

Physical Properties of PMTAG Green Polyol Foams
Thermal Stability of PMTAG Green Polyol Foams The thermal stability of the PMTAG Green Polyol foams was determined by TGA. DTG curves of rigid and flexible PMTAG Green Polyol foams are shown in FIGS. 21a-d and 22a-d, respectively. The corresponding data (extrapolated onset and offset temperatures of degradation, temperature of degradation measured at 1, 5 and 10% decomposition, and the DTG peak temperatures) are provided in Table 20.

The initial step of decomposition indicated by the DTG peak at ~300° C. with a total weight loss of ~12-17% is due to the degradation of urethane linkages, which involves dissociations to the isocyanate and the alcohol, amines and olefins or to secondary amines. The second decomposition step in the range of temperature between 330 and 430° C. and indicated by the DTG peak at ~360-370° C. with a total weight loss of 65-80%, was due to degradation of the ester groups.

TABLE 20

TGA and DTG data of PMTAG Green Polyol foams. $T_{1\%}^d$, $T_{5\%}^d$, $T_{10\%}^d$; Temperature of degradation at 1, 5 and 10% weight loss, respectively; $T_{Di}$: DTG peak temperatures; $T_{on}$ and $T_{off}$: extrapolated onset and offset temperatures of degradation, respectively

| | Temperature (° C.) | | | | | | | | | Weight loss (%) at | | | | |
|---|---|---|---|---|---|---|---|---|---|---|---|---|---|---|
| Rigid Foams | | | | | | | | | | | | | | |
| | $T_{1\%}^d$ | $T_{5\%}^d$ | $T_{10\%}^d$ | $T_{on}$ | $T_{D1}$ | $T_{D2}$ | $T_{D3}$ | $T_{D4}$ | $T_{off}$ | $T_{on}$ | $T_{D1}$ | $T_{D2}$ | $T_{D3}$ | $T_{D4}$ |
| B1 | 181 | 257 | 275 | 257 | 292 | 361 | 462 | — | 496 | 5 | 17 | 41 | 72 | — |
| B2 | 170 | 251 | 269 | 251 | 281 | 364 | 411 | 446 | 494 | 5 | 17 | 41 | 56 | 64 |
| B3 | 192 | 260 | 276 | 260 | 293 | 367 | 427 | 466 | 470 | 5 | 17 | 43 | 63 | 72 |
| B4 | 186 | 259 | 277 | 259 | 295 | 364 | 421 | 456 | 489 | 5 | 17 | 40 | 58 | 66 |
| Flexible Foams | | | | | | | | | | | | | | |
| | $T_{1\%}^d$ | $T_{5\%}^d$ | $T_{10\%}^d$ | $T_{on}$ | $T_{D1}$ | $T_{D2}$ | $T_{D3}$ | $T_{D4}$ | $T_{off}$ | $T_{on}$ | $T_{D1}$ | $T_{D2}$ | $T_{D3}$ | $T_{D4}$ |
| B1 | 194 | 261 | 286 | 261 | 300 | 364 | 425 | 457 | 493 | 5 | 15 | 40 | 64 | 74 |
| B2 | 185 | 258 | 280 | 258 | 287 | 362 | 403 | 451 | 492 | 5 | 12 | 39 | 55 | 68 |
| B3 | 210 | 267 | 290 | 267 | 299 | 370 | 426 | 459 | 487 | 5 | 13 | 43 | 67 | 77 |
| B4 | 221 | 270 | 293 | 270 | 301 | 368 | 427 | 460 | 495 | 5 | 12 | 41 | 65 | 73 |

Thermal Transition Behavior of PMTAG Green Polyol Foams

Curves obtained from the modulated DSC during the second heating cycle of the rigid and flexible PMTAG Green Polyol foams are shown in FIGS. 23a-d and 24a-d, respectively. Table 21 lists the glass transition temperature ($T_g$) of the foams produced. Note that the glass transition as detected by DSC was broad but discernible.

TABLE 21

Glass transition temperature ($T_g$, ° C.) of PMTAG Green Polyol foams (2$^{nd}$ heating).

| Rigid Foams | | | Flexible Foams | | |
|---|---|---|---|---|---|
| B1-RF168 | −10.2 | 50.3 | B1-FF165 | −10.2 | 32.8 | 51.4 |
| B2-RF161 | −9.4 | 48.3 | B2-FF166 | −9.9 | 32.7 | 48.3 |
| B3-RF145 | −13.9 | 49.6 | B3-FF145 | −9.6 | 34.6 | 49.4 |
| B4-RF166 | −11.3 | 49.1 | B4-FF153 | −11.8 | — | 43.9 |

Compressive Strength of Rigid PMTAG Green Polyol Foams

The strength of the foams were characterized by the compressive stress-strain measurements. Stress strain curves of the rigid PMTAG Green Polyol foams are shown in FIG. 25a-d. The compressive strength values at 5, 10% deformation for the rigid foams are listed in Table 22.

TABLE 22

Compressive strength of rigid PMTAG Green Polyol foams at 5, 6, 10 and 15% deformation

| Compressive Strength (MPa) | Density | Compressive strength (MPa) | | |
|---|---|---|---|---|
| @ Strain (%) | (kg/m$^3$) | 5 | 6 | 10 |
| B1-RF168 | 168 | 0.48 | 0.54 | 0.71 |
| B2-RF161 | 161 | 0.84 | 0.90 | 0.91 |
| B3-RF145 | 145 | 0.68 | 0.79 | 0.94 |
| B4-RF166 | 166 | 0.55 | 0.72 | 1.05 |

The compressive strength was highly dependent on the cellular structure of the foam. In the case of the rigid PMTAG Green Polyol foams, the high mechanical strength of the foams was due to compact and closed cells as shown in FIGS. 20A-20B and 21A-21D. The cell density of rigid PMTAG Green Polyol foam and flexible PMTAG Green Polyol foam from the SEM micrographs is ~11 and 7 cell/mm$^2$, respectively. The elongation of the cells were due to the direction of rise and the boundaries caused by the walls of the cylindrical mold.

Compressive Strength of Flexible PMTAG Green Polyol Foams

Stress strain curves of the flexible PMTAG Green Polyol foams are shown in FIG. 26a-d. Table 23 lists the compressive strength at 10, 25 and 50% deformation of the flexible PMTAG Green Polyol foams. The compressive strength of the flexible B3-PMTAG Green Polyol foam was lesser than all other batches of polyol flexible foam. This may be due to the lower hydroxyl value of the B3-polyol.

FIGS. 27a-d show the percentage of recovery of flexible PMTAG Green Polyol foams as a function of time. Table 24 lists the recovery values after 48 hours. Note that flexible Green PMTAG Polyol foams recovered ~90% of their initial thickness after 1 hour.

TABLE 23

Compressive strength values at 10, 25 and 50% deformation of flexible PMTAG Green Polyol Foams

| Compressive Strength (MPa) | Density | Compressive strength (MPa) | | |
|---|---|---|---|---|
| @ Strain (%) | (kg/m³) | 10 | 25 | 50 |
| B1-FF165 | 165 | 0.37 | 0.35 | 0.42 |
| B2-FF166 | 166 | 0.51 | 0.59 | 0.85 |
| B3-FF162 | 162 | 0.21 | 0.30 | 0.42 |
| B4-FF153 | 153 | 0.33 | 0.38 | 0.56 |

TABLE 24

Recovery (%) values of flexible PMTAG Green Polyol foams after 48 hours

| Foam | Density (kg/m³) | Recovery (%) |
|---|---|---|
| B1-FF165 | 165 | 88 |
| B2-FF166 | 166 | 97 |
| B3-FF162 | 162 | 94 |
| B4-FF153 | 153 | 92 |

The foregoing detailed description and accompanying figures have been provided by way of explanation and illustration, and are not intended to limit the scope of the invention. Many variations in the present embodiments illustrated herein will be apparent to one of ordinary skill in the art, and remain within the scope of the invention and their equivalents. The skilled person in the art will recognize many variations that are within the spirit of the invention and scope of any current or future claims.

The invention claimed is:

1. A composition comprising a polyol wherein the polyol has the following structure:

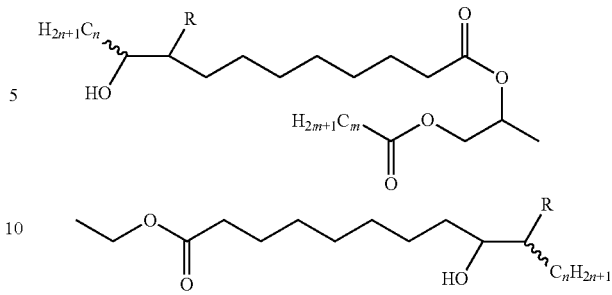

wherein:
n=1, 2, 3, 4, 5, 6, 7, 8, 9, 10, 11, or 12,
m=11 to 20, and
R=OH or OCH(=O),
wherein the positions of adjacent R and OH groups are interchangeable, and wherein the composition is prepared by a process comprising:
i) metathesizing a natural oil to obtain metathesized triacylglycerides; and
ii) subjecting the metathesized triacylglycerides to epoxidation at a reaction temperature less than 50° C. and subsequent hydroxylation and/or hydroformylation in water.

2. The composition of claim 1, wherein the composition further comprises the following structure:

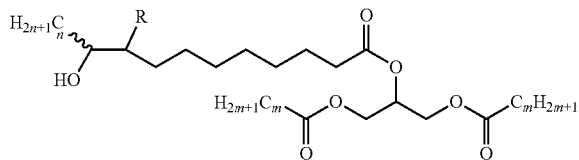

wherein:
n=2 or 8,
m=11 to 20,
R=OH or OCH(=O), and
wherein the positions of R and OH are interchangeable.

3. The composition of claim 1 wherein the composition further comprises the following structure

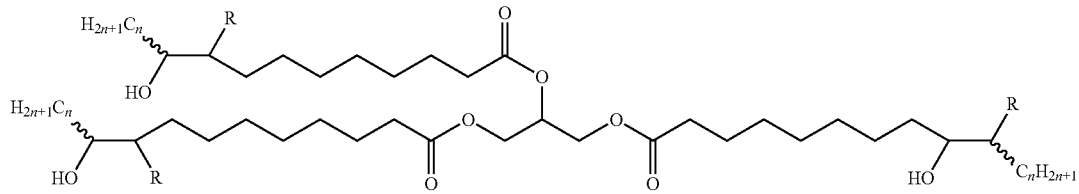

wherein:
n=2 or 8,
m=11 to 20,
R=OH or OCH(=O), and
wherein the positions of R and OH are interchangeable.

4. The composition of claim 1, wherein n is 2 or 8.

5. A flexible polyurethane foam prepared from a blend composition comprising:
(i) the polyol composition of claim 1;
(ii) at least one polyisocyanate component, wherein the ratio of hydroxy groups in the polyol composition to isocyanate groups in the at least one polyisocyanate component is less than 1;

(iii) at least one blowing agent;
(iv) at least one cell stabilizer component; and
(v) at least one catalyst component.

6. The flexible polyurethane foam of claim 5, wherein the at least one polyisocyanate component comprises the formula R(NCO)$_n$, wherein n is 1 to 10, and wherein R is 2 to 40 carbon atoms, and wherein R contains at least one aliphatic, cyclic, alicyclic, aromatic, branched, aliphatic- and alicyclic-substituted aromatic, or aromatic-substituted aliphatic and alicyclic group.

7. The flexible polyurethane foam of claim 5, wherein:
(i) the blowing agent is selected from the group consisting of water, carbon dioxide, nitrogen gas, chlorofluorocarbons (CFCs), hydrofluorocarbons (HFCs), hydrochlorofluorocarbons (HCFCs), fluoroolefins (FOs), chlorofluoroolefins (CFOs), hydrofluoroolefins (HFOs), hydrochlorfluoroolefins (HCFOs), acetone, and low-boiling hydrocarbons;
(ii) the cell stabilizer component comprises a silicone surfactant or an anionic surfactant; and
(iii) the catalyst component is selected from the group consisting of tertiary amines, organometallic derivatives or salts of bismuth, tin, iron, antimony, cobalt, thorium, aluminum, zinc, nickel, cerium, molybdenum, vanadium, copper, manganese and zirconium, metal carboxylates, metal hydroxides, and phosphines.

8. The flexible polyurethane foam of claim 5, wherein the foam exhibits a compressive strength at 10% to 50% deformation of 0.21 MPa to 0.85 MPa.

9. The flexible polyurethane foam of claim 5, wherein the thermal stability of the foam is represented by an initial decomposition at 287° C. to 300° C.

10. The flexible polyurethane foam of claim 5, wherein the thermal transition behavior of the foam is represented by a glass transition temperature of −13.9° C. to 50.3° C.

11. The flexible polyurethane foam of claim 5, wherein:
(i) the polyol composition is present in the blend composition in an amount of 100 parts by weight;
(ii) the ratio of hydroxy groups in the polyol composition to isocyanate groups in the at least one polyisocyanate component is 1:1.2;
(iii) the at least one blowing agent is present in the blend composition in an amount of 2 parts by weight;
(iv) the at least one cell stabilizer component is present in the blend composition in an amount of 2 parts by weight; and
(v) the at least one catalyst component is present in the blend composition in an amount of 0.5 parts by weight.

12. A rigid polyurethane foam prepared from a blend composition comprising:
(i) the polyol composition of claim 1;
(ii) at least one polyisocyanate component, wherein the ratio of hydroxy groups in the polyol composition to isocyanate groups in the at least one polyisocyanate component is less than 1;
(iii) at least one blowing agent;
(iv) at least one cell stabilizer component;
(v) at least one cross-linking agent; and
(vi) at least one catalyst component.

13. The rigid polyurethane foam of claim 12, wherein the at least one polyisocyanate component comprises the formula R(NCO)$_n$, wherein n is 1 to 10, and wherein R is 2 to 40 carbon atoms, and wherein R contains at least one aliphatic, cyclic, alicyclic, aromatic, branched, aliphatic- and alicyclic-substituted aromatic, or aromatic-substituted aliphatic and alicyclic group.

14. The rigid polyurethane foam of claim 12, wherein:
(i) the blowing agent is selected from the group consisting of water, carbon dioxide, nitrogen gas, chlorofluorocarbons (CFCs), hydrofluorocarbons (HFCs), hydrochlorofluorocarbons (HCFCs), fluoroolefins (FOs), chlorofluoroolefins (CFOs), hydrofluoroolefins (HFOs), hydrochlorfluoroolefins (HCFOs), acetone, and low-boiling hydrocarbons;
(ii) the cell stabilizer component comprises a silicone surfactant or an anionic surfactant;
(iii) the catalyst component is selected from the group consisting of tertiary amines, organometallic derivatives or salts of bismuth, tin, iron, antimony, cobalt, thorium, aluminum, zinc, nickel, cerium, molybdenum, vanadium, copper, manganese and zirconium, metal carboxylates, metal hydroxides, and phosphines; and
(iv) the cross-linking agent is selected from the group consisting of glycerin, diethanol amine, triethanol amine, trimethylol propane and D-sorbitol.

15. The rigid polyurethane foam of claim 12, wherein the foam exhibits a compressive strength at 5% to 10% deformation of 0.48 MPa to 1.05 MPa.

16. The rigid polyurethane foam of claim 12, wherein the thermal stability of the foam is represented by an initial decomposition at 281° C. to 299° C.

17. The rigid polyurethane foam of claim 12, wherein:
(i) the polyol composition is present in the blend composition in an amount of 100 parts by weight;
(ii) the ratio of hydroxy groups in the polyol composition to isocyanate groups in the at least one polyisocyanate component is 1:1.2;
(iii) the at least one cross-linking agent is present in the blend composition in an amount of 18.1 to 20.1 parts by weight;
(iv) the at least one blowing agent is present in the blend composition in an amount of 2 parts by weight;
(v) the at least one cell stabilizer component is present in the blend composition in an amount of 2 parts by weight; and
(vi) the at least one catalyst component is present in the blend composition in an amount of 2 parts by weight.

* * * * *